(12) United States Patent
Katsuyama

(10) Patent No.: US 7,268,919 B2
(45) Date of Patent: Sep. 11, 2007

(54) IMAGE DATA PROCESSING APPARATUS, METHOD, AND PROGRAM THAT DIFFUSES GRADATION ERROR FOR EACH PIXEL IN TARGET BLOCK

(75) Inventor: Kimito Katsuyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 928 days.

(21) Appl. No.: 10/346,985

(22) Filed: Jan. 15, 2003

(65) Prior Publication Data

US 2003/0164964 A1 Sep. 4, 2003

(30) Foreign Application Priority Data

| Jan. 17, 2002 | (JP) | ............................ 2002-009042 |
| Jan. 17, 2002 | (JP) | ............................ 2002-009043 |
| Jan. 17, 2002 | (JP) | ............................ 2002-009044 |
| Apr. 18, 2002 | (JP) | ............................ 2002-116108 |

(51) Int. Cl.
*G06K 15/00* (2006.01)

(52) U.S. Cl. ...................... 358/3.03; 358/1.9; 358/3.04; 358/3.05; 358/3.06; 358/521; 358/534; 382/252

(58) Field of Classification Search ............... 358/3.03, 358/1.9, 3.04, 3.05, 3.06, 521, 534; 382/252
See application file for complete search history.

(56) References Cited

U.S. PATENT DOCUMENTS

| 4,595,948 A | * | 6/1986 | Itoh et al. ..................... 358/500 |
| 4,654,721 A | * | 3/1987 | Goertzel et al. ............ 358/3.04 |
| 5,008,950 A | * | 4/1991 | Katayama et al. .......... 382/270 |
| 5,535,019 A | * | 7/1996 | Eschbach .................... 358/3.03 |
| 5,583,661 A | * | 12/1996 | Kurita et al. ............... 358/3.03 |

(Continued)

FOREIGN PATENT DOCUMENTS

EP 0 382 580 8/1990

(Continued)

OTHER PUBLICATIONS

Abstract of Japanese Patent Publication No. 09-130606, Pub. Date: May 16, 1997, Patent Abstracts of Japan.

(Continued)

*Primary Examiner*—Twyler Lamb
*Assistant Examiner*—Jacky X. Zheng
(74) *Attorney, Agent, or Firm*—Martine Penilla & Gencarella, LLP

(57) ABSTRACT

There has been a demand to accelerate image data conversion through the use of the error diffusion method. To convert image data, it is determined whether a specified block process condition is satisfied on the basis of a gradation value for each pixel in a target block. When the block process condition is true, a process is performed to diffuse a gradation error for the entire target block and convert image data for pixels in the target block at a time. Even when the block process condition is false, it is determined whether to form a dot in the target block. When it is determined that no dot should be formed, a process is performed to diffuse a gradation error for the entire target block to the unconverted pixels in another block and convert image data for pixels in the target block.

15 Claims, 34 Drawing Sheets

U.S. PATENT DOCUMENTS

| | | | |
|---|---|---|---|
| 6,760,127 B1 * | 7/2004 | Shin et al. | 358/3.03 |
| 6,778,299 B2 * | 8/2004 | Lin et al. | 358/3.03 |
| 2001/0021041 A1 * | 9/2001 | Suzuki | 358/458 |

FOREIGN PATENT DOCUMENTS

| | | |
|---|---|---|
| EP | 0 444 290 | 9/1991 |
| EP | 0 561 417 | 9/1993 |
| EP | 0 602 854 | 6/1994 |
| EP | 0 735 741 | 10/1996 |
| EP | 1 195 981 | 4/2002 |
| JP | 09-130606 | 5/1997 |
| JP | 09-254424 | 9/1997 |
| JP | 09-290533 | 11/1997 |
| JP | 11-069164 | 3/1999 |

OTHER PUBLICATIONS

Abstract of Japanese Patent Publication No. 09-254424, Pub. Date: Sep. 30, 1997, Patent Abstracts of Japan.

Abstract of Japanese Patent Publication No. 09-290533, Pub. Date: Nov. 11, 1997, Patent Abstracts of Japan.

Abstract of Japanese Patent Publication No. 11-069164, Pub. Date: Mar. 9, 1999, Patent Abstracts of Japan.

* cited by examiner

FIG. 17
Gradation value and diffusion error
(based on threshold value 150)
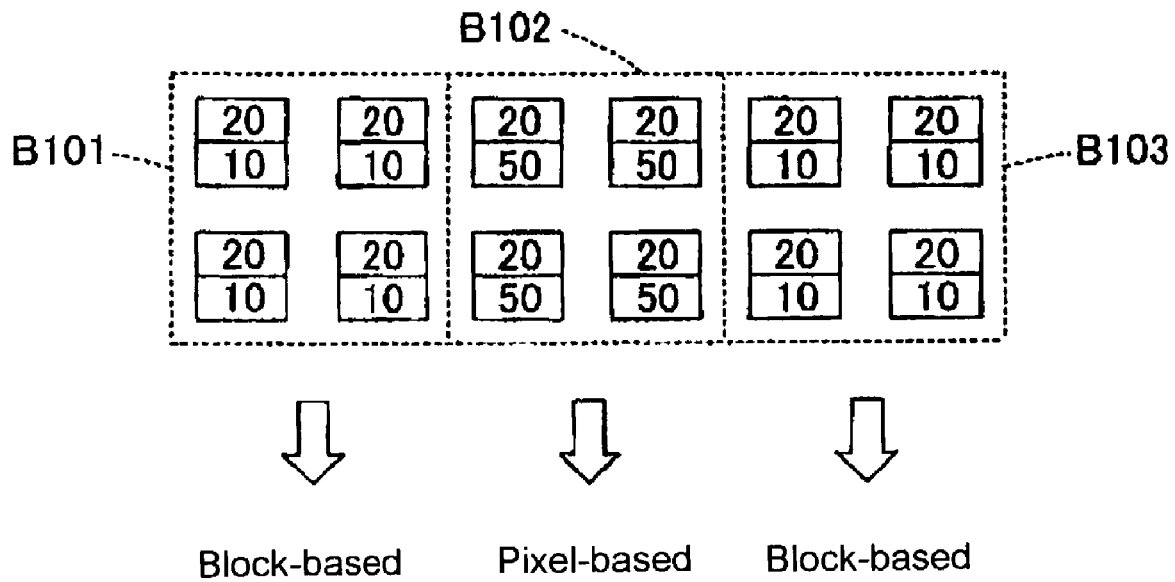
Gradation value only (based on threshold value 100)
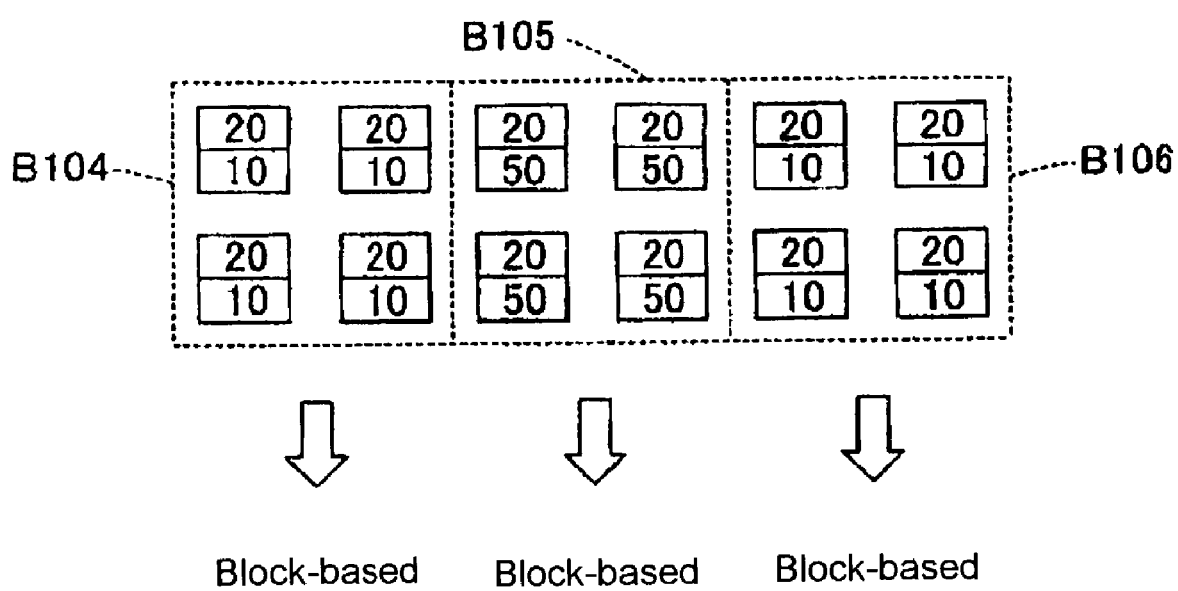

FIG. 29

Low resolution threshold value table T1

| Ultra-high quality mode | d10,d20 | d10,d20 |
|---|---|---|
| High quality mode | d11,d21 | d11',d21' |
| Normal mode | d12,d22 | d12',d22' |
| High speed mode | d13,d23 | d13',d23' |

(For yellow)

High resolution threshold value table T2

| Ultra-high quality mode | d10,d30,d40,d20 |
|---|---|
| High quality mode | d10,d31,d41,d20 |
| Normal mode | d10,d32,d42,d20 |
| High speed mode | d10,d33,d43,d20 |

Ultra-high resolution threshold value table T3

| Ultra-high quality mode | d10,d30,d50,d60,d40,d20 |
|---|---|
| High quality mode | d10,d30,d51,d61,d40,d20 |
| Normal mode | d10,d30,d52,d62,d40,d20 |
| High speed mode | d10,d30,d53,d63,d40,d20 |

FIG. 33

720 × 360dpi

| Average gradation value | Process partition | |
|---|---|---|
| $0 \leq x \leq d10 \sim d13$ | 4 pixels | (Block process condition satisfied) |
| $d10 \sim d13 < x \leq d20 \sim d23$ | 1 pixel | |
| $d20 \sim d23 < x \leq 255$ | 4 pixels | (Block process condition satisfied) |

1440 × 720dpi

| Average gradation value | Process partition | |
|---|---|---|
| $0 \leq x \leq d10$ | 16 pixels | (Block process condition satisfied) |
| $d10 < x \leq d30 \sim d33$ | 4 pixels | (Another block process condition satisfied) |
| $d30 \sim d33 < x \leq d40 \sim d43$ | 1 pixel | |
| $d40 \sim d43 < x \leq d20$ | 4 pixels | (Another block process condition satisfied) |
| $d20 < x \leq 255$ | 16 pixels | (Block process condition satisfied) |

2880 × 1440dpi

| Average gradation value | Process partition | |
|---|---|---|
| $0 \leq x \leq d10$ | 64 pixels | (Block process condition satisfied) |
| $d10 < x \leq d30$ | 16 pixels | (Another block process condition satisfied) |
| $d30 < x \leq d50 \sim d53$ | 4 pixels | |
| $d50 \sim d53 < x \leq d60 \sim d63$ | 1 pixel | |
| $d60 \sim d63 < x \leq d40$ | 4 pixels | (Another block process condition satisfied) |
| $d40 < x \leq d20$ | 16 pixels | |
| $d20 < x \leq 255$ | 64 pixels | (Block process condition satisfied) |

IMAGE DATA PROCESSING APPARATUS, METHOD, AND PROGRAM THAT DIFFUSES GRADATION ERROR FOR EACH PIXEL IN TARGET BLOCK

BACKGROUND OF THE INVENTION

1. Field of the Invention

The present invention relates to an image data processing apparatus, an image data processing method, and an image data processing program.

2. Description of Related Art

Conventionally, an image print process inputs image data generated from an image represented in multiple gradations of dot matrix pixels. The error diffusion method is used to diffuse a gradation error of each pixel to an unconverted pixel and convert the image into image data represented by presence or absence of dot formation corresponding to each pixel. The error diffusion method ensures good image quality because of no errors, but requires processing time for calculating and distributing errors. To solve this, a blocking process is performed on the basis of a block comprising 2×2 pixels. The blocking process diffuses a gradation error for the entire target block to unconverted pixels in another block and converts image data corresponding to pixels in the target block at a time. The blocking process can speed up conversion of image data. Compared to the pixel-based conversion, however, the blocking process decreases the image resolution and degrades the image quality.

There is an area that provides high image brightness and is capable of maintaining high image quality after a block-based conversion process. Such area is defined as satisfying a given block process condition. It is determined whether or not to satisfy the block process condition based on gradation values and the like for all pixels in the target block. When it is determined that the block process condition is true, a process is performed to convert image data for pixels in the target block at a time. When it is determined that the block process condition is false, a process is performed to unconditionally convert image data for respective pixels in the target block. As a result, a dot is formed in units of blocks only in such an image data area that provides a very small density for forming dots, hardly presents degradation of the resolution, and is capable of maintaining the high image quality. The high quality is maintained by speeding up the conversion of image data to a certain extent.

There has been a demand for the above-mentioned prior art to further speed up the conversion of image data.

According to the prior art, different dot patterns are formed depending on whether an area is subject to the block-based process or the pixel-based process. An unintended design may result.

Further, according to the prior art, high resolution printing requires the block-based image data conversion in units of 2×2 pixels. This is seemingly a smaller processing unit than that for low resolution printing. The processing speed is not fully accelerated.

Since the prior art unconditionally determines block process conditions, it has been impossible to print images by increasing the processing speed even if the image printing does not require high quality. As a result, it has been felt to spend more time than needed until an image printout is produced. Accordingly, there has been a demand for accelerating the image data conversion and fast creating an image printout.

SUMMARY OF THE INVENTION

The present invention has been made in consideration of the foregoing. It is therefore an object of the present invention to provide an image data processing apparatus, an image data processing method, and an image data processing program capable of further accelerating conversion from image data generated from an image represented in multiple gradations of dot matrix pixels into image data represented by presence or absence of dot formation through the use of the error diffusion method.

In order to achieve the above-mentioned object, the present invention uses a block process determination unit which collects a specified number of neighboring pixels to form a block and determines whether or not to satisfy a given condition based on a gradation value of each pixel in a target block for image data conversion. When determining that the block process condition is true, the first conversion unit, based on gradation values and diffused gradation errors for respective pixels in the target block, diffuses a gradation error for the entire target block to unconverted pixels outside the target block and converts image data corresponding to the pixels in the target block at a time. In other words, the image data is converted in units of blocks.

If the block process determination unit determines that the block process condition is false, a second conversion unit determines whether or not to form a dot in the target block based on the gradation values and the diffused gradation errors for the pixels in the target block. If it is determined that a dot is to be formed in the target block, the second conversion unit performs the following for each pixel partition that is formed by grouping pixels in the target block. That is to say, based on the gradation values and the diffused gradation errors for the pixels, the second conversion unit diffuses gradation errors in the pixel partition to the other unconverted pixels and converts image data corresponding to the pixels in the target block. In other words, the image data is converted in units of pixels smaller than blocks. If it is determined that no dot is to be formed in the target block, the second conversion unit diffuses the gradation error for the entire target block to the unconverted pixels outside the target block and converts the image data corresponding to the pixels in the target block based on the gradation values for the pixels in the target block and the gradation errors. In this case, the image data is converted in units of blocks.

When no dot is to be formed in the target block, the error diffusion method can be used to convert image data in units of blocks even if the above-mentioned block process condition is false. When no dot is to be formed in the block, high image quality can be maintained even if image data is converted in units of blocks. This is because the same gradation error is diffused outside the target block and no dot is formed in any case. Accordingly, it becomes possible to further accelerate the conversion of image data generated from an image represented in multiple gradations of dot matrix pixels into image data represented by presence or absence of dot formation through the use of the error diffusion method.

As mentioned above, it is possible to further accelerate the conversion of image data generated from an image represented in multiple gradations of dot matrix pixels into image data represented by presence or absence of dot formation through the use of the error diffusion method.

When it is determined that a dot is to be formed in the target block, the second conversion unit may be configured to diffuse the gradation errors for the pixels to the other unconverted pixels and convert the image data corresponding to the pixels in the target block based on the gradation values and the diffused gradation errors for the pixels in the target block. That is to say, when an example of the second conversion unit is available and it is determined that a dot is to be formed in the target block, image data is converted through simple processing in units of pixels. Consequently, a simple configuration can be used to further accelerate the conversion of image data generated from an image represented in multiple gradations of dot matrix pixels into image data represented by presence or absence of dot formation through the use of the error diffusion method.

Of course, the present invention is applicable to the use of not only one pixel as mentioned above, but also a plurality of pixels to partition the target block. The pixel partition may evenly or unevenly divide pixels in the target block.

Image data before conversion just needs to be generated from an image represented in multiple gradations of dot matrix pixels. That image data may be color image data comprising a plurality of color data or monochrome image data comprising single color data. The image data can have various gradations such as 256 gradations expressed in 8 bits and 100 gradations not expressed in 2 to the nth power, for example. When the error diffusion method is used to form dots from the image data, it may be preferable to use two values or to use a value greater than 2 to form large, medium, and small dots, for example.

As an example, the second conversion unit may be configured to determine whether or not to form a dot in the target block based on the sum of the gradation values and the diffused gradation errors for the pixels in the target block. Since this configuration allows gradation errors to be considered into the target block, it is possible to accurately determine whether or not form a dot.

In order to determine whether or not to form a dot in the target block, the second conversion unit maybe configured to determine not to form a dot in the target block when the sum of the gradation values and the diffused gradation errors for the pixels in the target block is smaller than or equal to a specified reference value for dot formation. No dot is formed in a block when a smaller gradation value causes a smaller dot formation density. A dot is formed in units of blocks only in an area where the dot formation density is so small as to make degradation of the resolution inconspicuous. It is possible to speed up the conversion without degrading the image quality.

The first conversion unit may determine not to form a dot in the target block when the sum of the gradation values and the diffused gradation errors for the pixels in the target block is smaller than or equal to a specified reference value for dot formation. The second conversion unit may determine not to form a dot in the target block when the sum of the gradation values and the diffused gradation errors for the pixels in the target block is smaller than or equal to the specified reference value for dot formation. Accordingly, the first and second conversion unit can determine whether or not to form a dot in the target block by using the common dot formation reference value.

The second conversion unit determines whether or not to form a dot in the target block only if needed. Therefore, the second conversion unit may be configured to determine whether or not to form a dot in the target block based on the gradation values and the diffused gradation errors for the pixels in the target block only when the sum of gradation values for the pixels in the target block is smaller than or equal to a specified pixel-partition-specific process reference value. When a smaller gradation value causes a smaller dot formation density, a dot is formed in an area where each pixel has a relatively large gradation value. In such an area, image data is converted in units of pixels smaller than blocks without needing to determine dot formation, making it possible to further improve the processing speed.

The block process determination unit just needs to determine whether or not to satisfy a block process condition based on the gradation values for the pixels in the target block. More particularly, the block process determination unit may be configured to determine that the block process condition is true when the sum of the gradation values and the diffused gradation errors for the pixels in the target block is smaller than or equal to a reference value for block processing.

Of course, the same concept can be applied to an area having a large dot formation density in which area a dot can be formed for almost all pixels in the target block.

It may be preferable to apply different weights to rates of diffusion to unconverted pixels according to situations where the present invention is applicable.

The above-mentioned block is capable of various configurations and just needs to be a collection of a specified number of neighboring pixels. The block is not limited to 2×2 pixels and may comprise, for example, 3×3 pixels, 2×4 pixels, 1×4 pixels, and the like.

When an area shows a relatively small gradation value for image data, the block process condition may not be satisfied and a dot may be formed in the target block. In such a case, the same effects can be obtained in such a configuration that does not perform the above-mentioned conversion in units of blocks.

The same applies to an area that shows a relatively large gradation value for image data.

That is to say, the block process condition may not be satisfied when the error diffusion method is used to convert image data. In such a case, image data is converted in units of blocks when no dot is formed in the target block.

According to another mode of the present invention, the block process determination unit identifies a block by collecting a specified number of neighboring pixels and determines whether or not to satisfy the block process condition only based on gradation values for the pixels in the target block that is used to convert image data. When it is determined that the block process condition is true, the first conversion unit, based on the gradation values and the diffused gradation errors for the pixels in the target block, diffuses a gradation error for the entire target block to unconverted pixels outside the target block and converts image data corresponding to the pixels in the target block at a time. In other words, the image data is converted in units of blocks. When the block process determination unit determines that the block process condition is false, the second conversion unit can diffuse gradation errors in the pixel partition to the other unconverted pixels and convert image data corresponding to the pixels in the target block for each pixel partition formed by grouping pixels in the target block based on the gradation values and the diffused gradation errors for the pixels. In other words, the image data is converted in units of pixels smaller than blocks.

Depending on the size of a gradation error diffused into the target block, the image data conversion maintains the unit of processing, i.e., in units of blocks or pixels smaller than blocks. This prevents occurrence of an unintended design caused by the fact that the conversion is performed in units of blocks or pixels smaller than blocks. In addition, the block-based conversion is not performed in an area that requires conversion in units of pixels smaller than blocks. Accordingly, the image quality does not degrade. The conversion is not performed in units of pixels smaller than blocks in an area that can maintain the high image quality even after conversion in units of blocks. This ensures the processing speed. Consequently, it is possible to fast obtain an image with much higher quality after the conversion of image data generated from an image represented in multiple gradations of dot matrix pixels into image data represented by presence or absence of dot formation through the use of the error diffusion method.

When the above-mentioned block process determination unit determines that the block process condition is false, the second conversion unit may be configured to be able to diffuse the gradation errors for the pixels to the other unconverted pixels and convert the image data corresponding to the pixels in the target block based on the gradation values and the diffused gradation errors for the pixels in the target block. That is to say, when an example of the second conversion unit is available and the block process condition is false, image data is converted through simple processing in units of pixels. Consequently, a simple configuration can be used to fast obtain an image with much higher quality after the conversion of image data generated from an image represented in multiple gradations of dot matrix pixels into image data represented by presence or absence of dot formation through the use of the error diffusion method.

As mentioned above, it is possible to fast obtain an image with much higher quality after the conversion into image data represented by presence or absence of dot formation through the use of the error diffusion method.

According to still another mode of the present invention, a resolution acquisition unit obtains an image resolution output from an image output apparatus. According to the obtained resolution, a conversion unit identifies a conversion partition comprising one or more neighboring pixels. Based on gradation values and diffused gradation errors for pixels in a target conversion partition for image data conversion, the conversion unit diffuses a gradation error for the entire target conversion partition to unconverted pixels outside the conversion partition and converts the image data at a time. The image output apparatus then outputs an image based on the converted image data at the preset resolution.

When the image output apparatus outputs images, image data can be converted through the use of the conversion partition with a size appropriate to the resolution. This can accelerate the conversion at high resolution and efficiently convert image data.

The conversion partition may comprise not only a plurality of pixels for converting image data at a time, but also one pixel, to which case the present invention is also applicable. Further, it maybe preferable to convert image data by varying the number of pixels for the conversion partition.

As mentioned above, it is possible to efficiently perform conversion into image data represented by presence or absence of dot formation through the use of the error diffusion method.

It is possible to further improve the processing speed by maintaining the high image quality.

As a configuration example of using a block formed of two or more pixels as a conversion partition, the conversion unit comprises a block process determination unit, a first conversion unit, and a second conversion unit. The block process determination unit identifies a block by collecting two or more neighboring pixels in accordance with the resolution and determines whether or not to satisfy a specified block process condition based on gradation values for pixels in a target block to convert the image data. When the block process determination unit determines that the block process condition is true, the first conversion unit, based on the gradation values and the diffused gradation errors for pixels in the target block, diffuses a gradation error for the entire target block to unconverted pixels outside the target block and converts image data corresponding to the pixels in the target block at a time. When the block process determination unit determines that the block process condition is false, the second conversion unit can diffuse a gradation error for the pixel partition to the other unconverted pixels and convert image data for the pixels in the target block based on the gradation values and the diffused gradation errors for the pixels correspondingly to each pixel partition formed by grouping pixels in the target block.

That is to say, the block process determination unit identifies a block by collecting two or more neighboring pixels in accordance with the resolution and determines whether or not to satisfy a specified block process condition based on gradation values for pixels in the target block to convert the image data. When the block process determination unit determines that the block process condition is true, the first conversion unit, based on the gradation values and the diffused gradation errors for pixels in the target block, diffuses a gradation error for the entire target block to unconverted pixels outside the target block and converts image data corresponding to the pixels in the target block at a time. In other words, the image data is converted in units of blocks.

When the block process determination unit determines that the block process condition is false, the second conversion unit can diffuse a gradation error for the pixel partition to the other unconverted pixels and convert image data for the pixels in the target block based on the gradation values and the diffused gradation errors for the pixels correspondingly to each pixel partition formed by grouping pixels in the target block. In other words, the image data is converted in units of pixels smaller than blocks.

There is an area that can maintain high image quality even after image data is converted in units of blocks. When such area is defined as satisfying the block process condition, a dot is formed on a block basis only in an image data area that can maintain high image quality. Accordingly, it is possible to further accelerate the conversion by maintaining the high image quality.

When the block process determination unit determines that the block process condition is false, the second conversion unit may be configured to be able to diffuse the gradation errors for the pixels to the other unconverted pixels and convert the image data corresponding to the pixels in the target block based on the gradation values and the diffused gradation errors for the pixels in the target block. That is to say, when an example of the second conversion unit is available and the block process condition is false, image data is converted through simple processing in units of pixels. Consequently, a simple configuration can be used to further accelerating conversion by maintaining the high image quality.

Of course, the present invention is applicable to the use of not only one pixel as mentioned above, but also a plurality of pixels to partition the target block. The pixel partition may evenly or unevenly divide pixels in the target block.

The conversion unit just needs to use a conversion partition comprising a specified number of neighboring pixels corresponding to the resolution. As an example, the conversion unit may be configured to increase the number of pixels in the conversion partition as the resolution increases. Since the dot density increases as the resolution increases, the high image quality can be maintained despite an increase in the number of pixels for converting image data at a time. Accordingly, it is possible to accelerate the image data conversion by maintaining the high image quality.

In this case, the conversion unit may be configured to define the number of pixels in the conversion partition in proportional to the resolution. Since the configuration provides the same apparent resolution, the high image quality can be maintained.

The conversion unit may be configured so as to increase the number of pixels in the small block as the resolution increases. This makes it possible to provide a configuration example of forming a small block corresponding to the resolution and to fast obtain a high-quality image. In this case, the conversion unit may be configured to define the number of pixels in the conversion partition in proportional to the resolution. The high image quality can be maintained likewise.

The conversion partition can be defined variously. For example, the conversion unit may be configured to provide the conversion partition comprising n×n pixels, where n is a positive integer. That is to say, it is possible to provide an example of the simply configured conversion partition. The configuration may provide the small block comprising n'×n' pixels, where n' is a positive integer.

As another example, the conversion unit may be configured to use the conversion partition comprising pixels in a rectangular area corresponding to the aspect ratio of the resolution. Since the configuration provides the conversion partition with vertically and horizontally the same apparent size, it becomes possible to accelerate the image data conversion by maintaining the high image quality. Further, the small block may be configured to comprise pixels in a rectangular area corresponding to the aspect ratio of the resolution.

According to yet another mode of the present invention, a user of the image data processing apparatus can use an image quality setup unit to enter image quality setup information about the image quality of an image output from an image output apparatus. The conversion unit identifies a conversion partition comprising one or more neighboring pixels corresponding to the input image quality setup information. Based on the gradation values and the diffused gradation errors (hereafter referred to as diffusion errors) for the pixels in the target conversion partition to convert image data, the conversion unit converts the image data at a time by diffusing a gradation error for the entire target conversion partition to unconverted pixels outside the conversion partition. The image output apparatus then outputs an image based on the image data converted through the use of the error diffusion method in the conversion partition reflecting the image quality setup information.

When the image output apparatus outputs images, it becomes possible to perform an image data conversion process (hereafter also referred to simply as a conversion process) in the conversion partition having a size appropriate to the input image quality setup information. The error diffusion method can be used to efficiently convert image data. From a comprehensive viewpoint, converted image data can be fast obtained after many conversion processes according to various image quality settings.

It may be preferable to increase the number of pixels in the conversion partition in proportion to a higher speed indicated by the supplied image quality setup information. Consequently, the conversion partition becomes larger as the image quality setup information indicates a higher speed, accelerating the image data conversion.

When the image output apparatus outputs an image at a specified resolution, it may be preferable to provide a resolution acquisition unit for obtaining the resolution. The conversion unit may configure the conversion partition comprising one or more neighboring pixels in accordance with the resolution so that an area on the output image is smaller than or equal to the image as the obtained resolution increases. Since the conversion partition area on the output image does not increase as the resolution increases, the image quality at a high resolution ensures at least the highest image quality at a low resolution. As the resolution increases, the image data conversion takes a longer time. A user expects that the image quality at a high resolution should be higher than or equal to that at a low resolution. Consequently, there are no possibilities of a meaningless conversion process that degrades the image quality at a high resolution compared to that at a low resolution.

The conversion partition may comprise not only a plurality of pixels for converting image data at a time, but also one pixel, to which case the present invention is also applicable. Further, it may be preferable to convert image data by varying the number of pixels for the conversion partition. As an example, it may be preferable to provide the conversion unit with a determination unit, a first conversion unit, and a second conversion unit. Here, the determination unit forms a block by grouping two or more neighboring pixels and determines whether or not to satisfy a specified block process condition based on gradation values (hereafter also referred to as target block gradation values) for pixels in the target block to convert image data. When it is determined that the block process condition is true, the first conversion unit, converts image data (hereafter also referred to as target block image data) for pixels in the target block at a time while diffusing a gradation error for the entire target block to unconverted pixels outside the target block based on the pixel's gradation value and diffusion error. In other words, the image data is converted in units of blocks.

When it is determined that the block process condition is false, the second conversion unit can convert the image data for the target block while diffusing the gradation error for the pixel partition to the other unconverted pixels based on the pixel's gradation value and diffusion error correspondingly to each pixel partition formed by grouping pixels in the target block. In other words, the image data is converted in units of pixels smaller than blocks.

There is an area that can maintain high image quality even after image data is converted in units of blocks. When such area is defined as satisfying the block process condition, a dot is formed on a block basis only in an image data area that can maintain high image quality. Accordingly, it is possible to further accelerate the conversion without degrading the image quality. If a block is configured to comprise two or more pixels in accordance with the image quality setup information, the block can be properly sized in accordance with the image quality setup information, enabling a more efficient conversion process.

As mentioned above, it is possible to efficiently perform conversion into image data represented by presence or absence of dot formation through the use of error diffusion method. From a comprehensive viewpoint, converted image data can be fast obtained after many conversion processes.

Consequently, there are no possibilities of meaningless image data conversion. From a comprehensive viewpoint, converted image data can be more fast obtained after many conversion processes at various resolutions.

In addition, it is possible to further improve the processing speed by maintaining the high image quality.

BRIEF DESCRIPTION OF THE DRAWINGS

FIG. 17 schematically shows how to determine whether to convert image data in units of blocks or pixels;

FIG. 29 schematically shows structures of threshold value tables for different resolutions;

FIG. 33 shows the relationship between a threshold value and the number of pixels in a table form.

DETAILED DESCRIPTION OF THE PREFERRED EMBODIMENTS

(1) First Embodiment

Figure 1:
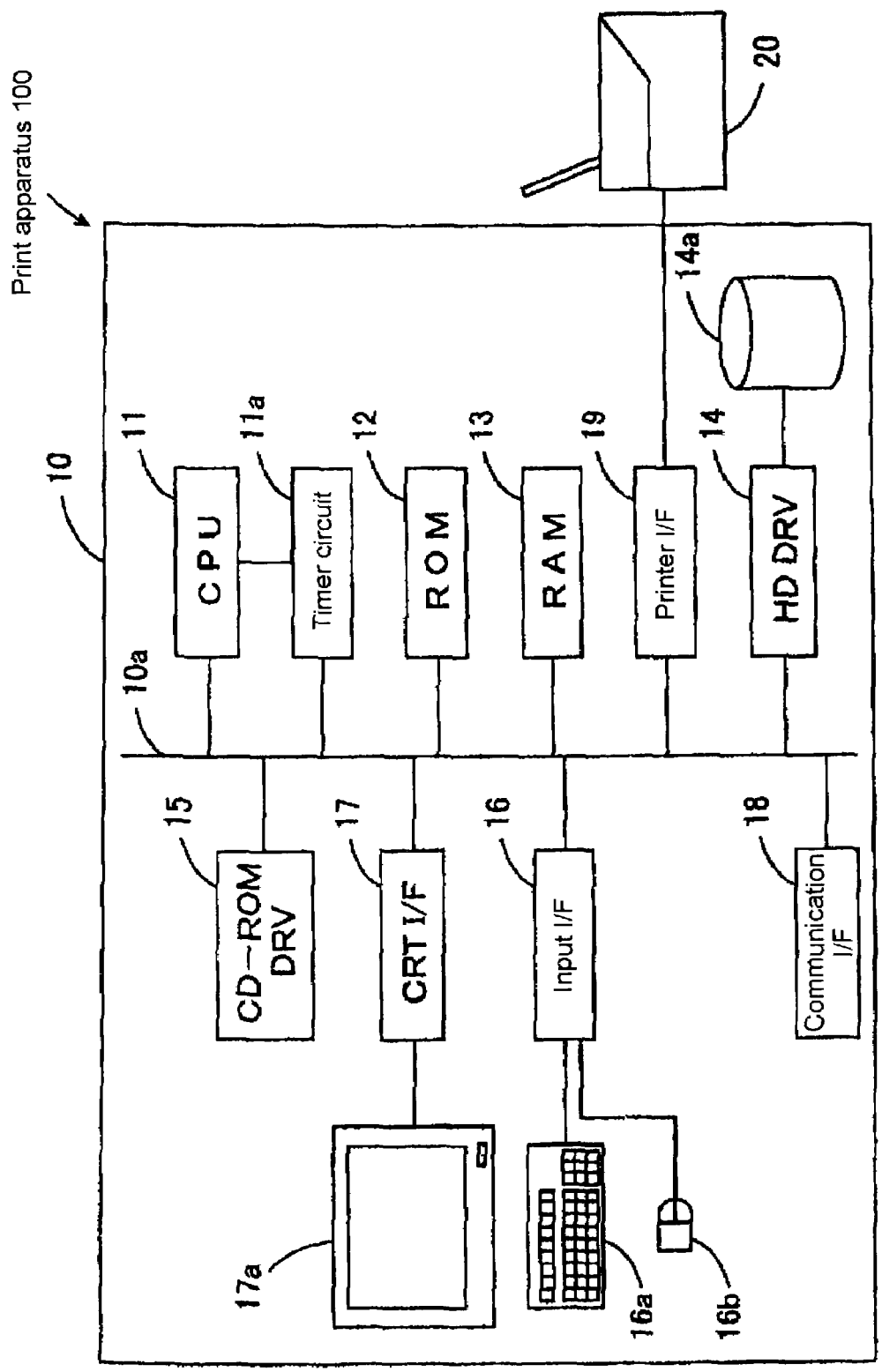
FIG. 1 is a schematic configuration diagram showing a print apparatus according to a first embodiment of the present invention, wherein the print apparatus comprises an image data processing apparatus and a printer.

FIG. 1 shows a schematic configuration of a print apparatus 100 according to a first embodiment of the present invention, wherein the print apparatus 100 comprises an image data processing apparatus and a printer. The print apparatus 100 comprises a personal computer (PC) 100 and a printer 20 capable of color printing.

A PC 10 has a CPU 11 working as the processing center. The CPU 11 controls the entire PC 10 via a system bus 10a. The system bus 10a connects with a timer circuit 11a, ROM 12, RAM 13, a hard disk drive 14, a CD-ROM drive 15, an input interface (input I/F) 16, a CRT interface (CRT I/F) 17, a communication interface (communication I/F) 18, a printer interface (printer I/F) 19, and the like.

A hard disk 14a connected to the hard disk drive 14 stores software such as an operating system (OS), an application program (APL) capable of creating document information and image information, and the like. During execution, the CPU 11 appropriately transfers the software to the RAM 13. The CPU 11 appropriately accesses the RAM 13 as a temporary work area to execute various programs.

The hard disk 14a storing an image data processing program according to the present invention is used as a medium storing the image data processing program. A recording medium capable of storing the image data processing program is not limited to the hard disk. For example, a CD-ROM or a flexible disk may be used. The software recorded on these recording media is read via the CD-ROM drive 15 or a flexible disk drive (not shown) and is installed on the hard disk 14a. Then, the CPU 11 reads the software into the RAM 13 to execute various processes. The present invention is not limited to the above-mentioned media and is also applicable to magnetic optical disks and semiconductor devices such as nonvolatile memory. Further, the communication I/F 18 such as a modem connected to the system bus 10a can be connected to the Internet and access a server storing various programs to download the image data processing program.

The printer 20 used for the embodiment is an ink jet printer. For ease of explanation, it is assumed that color printing uses four colors of ink such as cyan (C), magenta (M), yellow (Y), and black (K). Hereafter, ink colors are simply described as C, M, Y, and K in the specification and the drawings.

Figure 2:
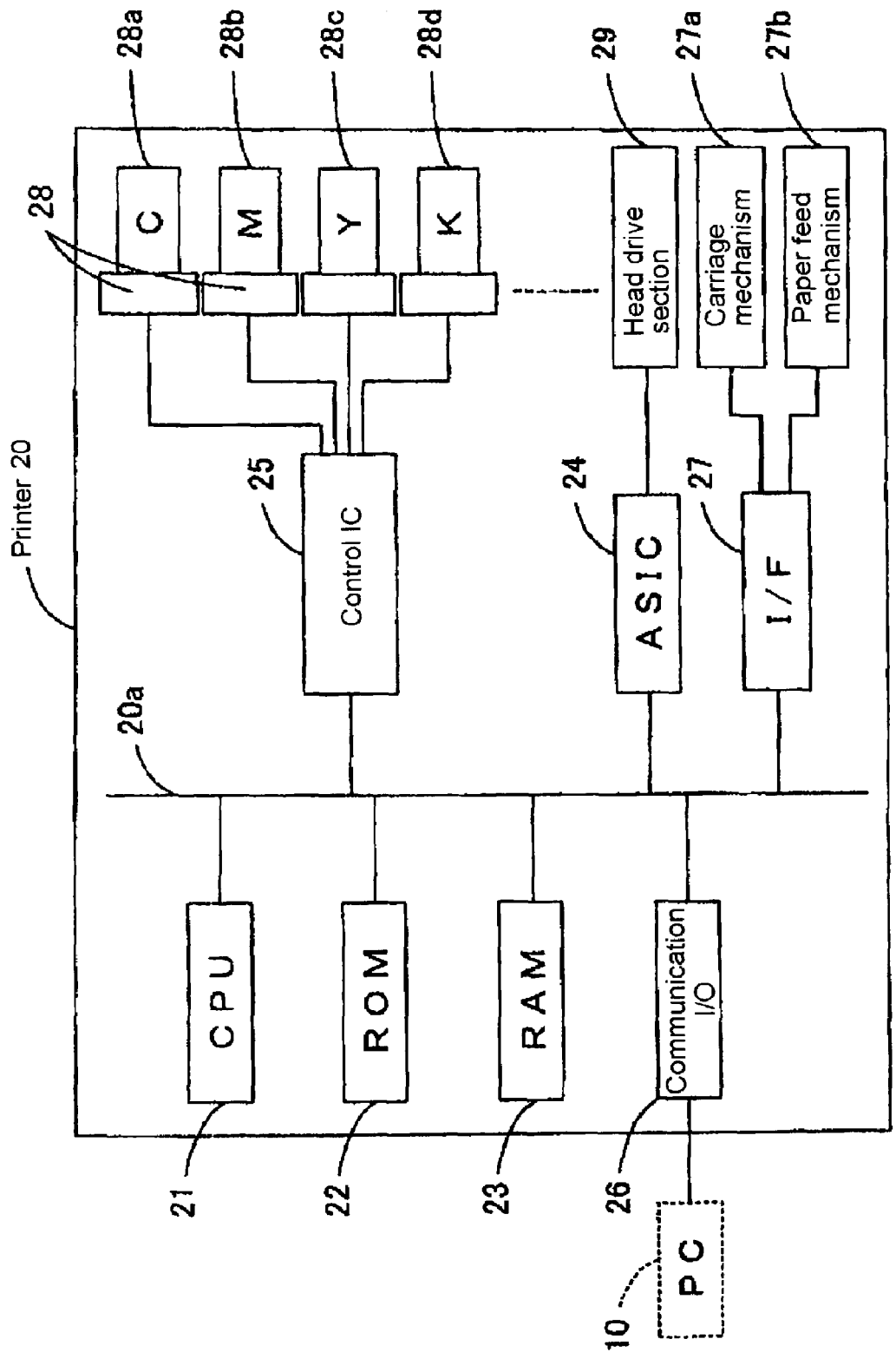
FIG. 2 is a block diagram of the printer in addition to a PC.

FIG. 2 shows a block configuration of the printer 20 as a print unit for printing an image based on converted image data. The PC 10 is diagrammed as well. A bus 20a in the printer 20 connects with a CPU 21, ROM 22, RAM 23, an ASIC 24, a control IC 25, a communication I/O 26, an interface (I/F) 27 for sending image data and drive signals, and the like. While using the RAM 23 as a work area, the CPU 21 controls each part in accordance with a program written in the ROM 22.

The printer 20 according to the embodiment is an ink jet printer that uses four colors of ink. Further, the printer 20 can represent a printer that uses six or seven colors of ink or a laser printer that uses a plurality of colors of toner.

On the basis of the above-mentioned hardware, the PC 10 executes the BIOS on which the OS and the APL are executed.

When an APL print function is executed, the printer driver operates and enables bidirectional communication with the printer 20 via the printer I/F 19. The printer driver receives image data from the APL via the OS, converts the image data into image data for output to the printer 20, and sends that image data as a print job to the printer 20. For this purpose, the OS is also provided with the GDI (Graphics Device Interface) and the like for implementing the graphic user interface function between the APL and the OS with respect to graphics.

Figure 3:
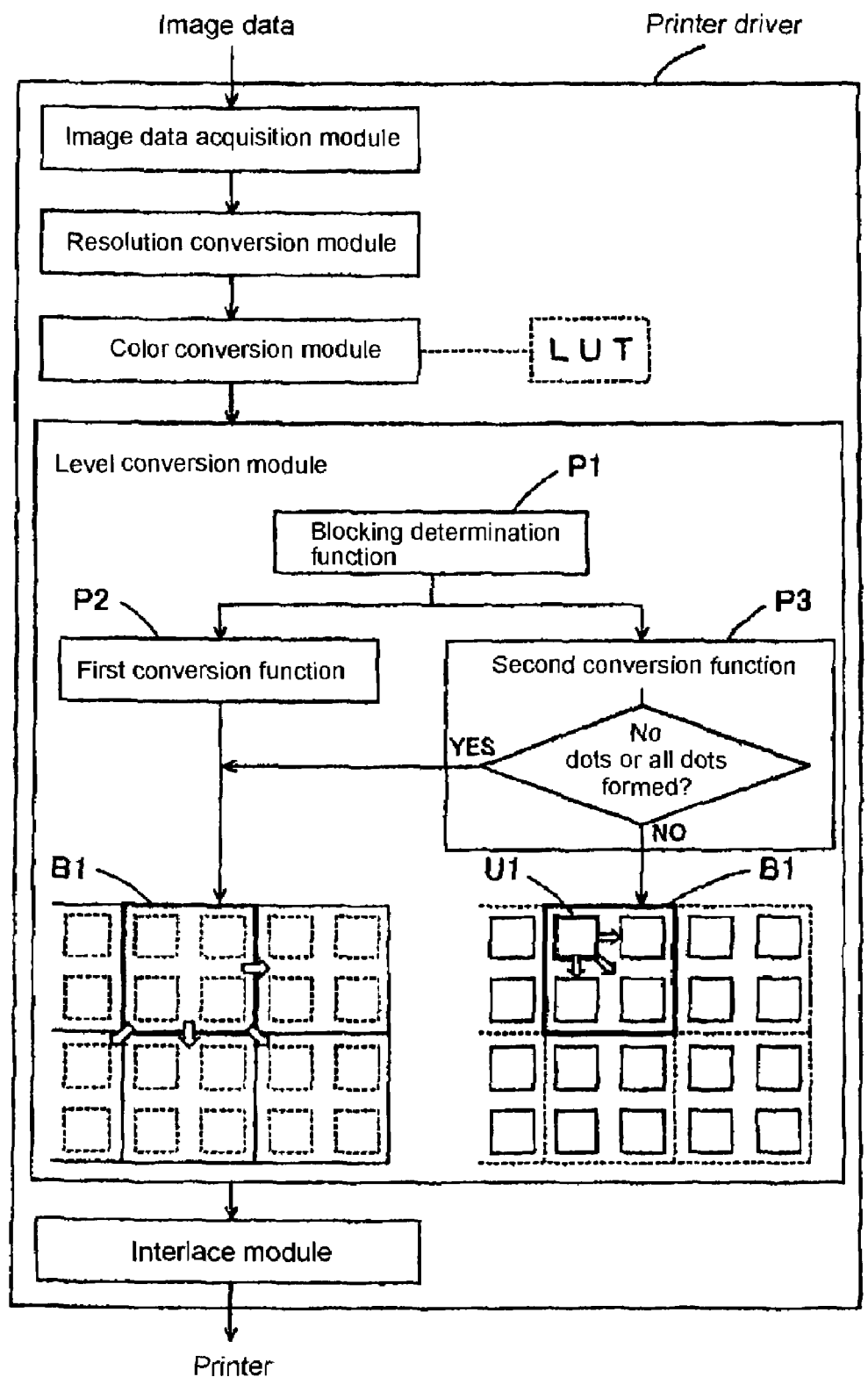
FIG. 3 schematically shows a printer driver configuration.

FIG. 3 schematically shows a configuration of the printer driver.

As shown in FIG. 3, the printer driver comprises an image data acquisition module, a resolution conversion module, a color conversion module, a gradation conversion module, an interlace module, and the like. The printer driver can convert image data with cooperative operations while implementing specified functions under control of a function control module (not shown). The image data processing program according to the present invention is included in the gradation conversion module.

The image data acquisition module obtains image data based on APL-created RGB from the GDI. The image data is generated from an image represented in multiple gradations of dot matrix pixels. Based on the image data, the resolution conversion module, the color conversion module, the gradation conversion module, and the interlace module perform a conversion process into image data for output to the printer 20 and send the converted image data to the printer 20. Based on the converted image data, the printer 20 forms dots of color ink on a printout medium to print a color image.

The image data processing program has a block process determination function P1, a first conversion function P2, and a second conversion function P3. The functions P1 through P3 work as the block process determination unit, the first conversion unit, and the second conversion unit, respectively.

The determination function P1 forms a block by grouping 2×2 neighboring pixels and determines whether or not to satisfy a specified block process condition based on gradation values for pixels in a target block to convert image data. If it is determined that the block process condition is true, the first conversion function P2 converts image data for pixels in a target block B1. If it is determined that the block process condition is false, the second conversion function P3 converts image data for pixels in the target block B1. Based on the gradation values and diffused gradation errors (hereafter referred to as diffusion errors) for pixels in the target block B1, the first conversion function P2 diffuses a gradation error for the entire target block B1 to unconverted pixels outside the target block B1 and converts the image data for pixels in the target block B1 at a time. That is to say, the first conversion function P2 converts image data in units of blocks.

On the other hand, the second conversion function P3 implements a conversion process in units of blocks when no dot is formed in the target block B1 or a dot is formed for all pixels in the target block B1. In the other cases, the second conversion function P3 implements a conversion process in units of pixels smaller than blocks without grouping pixels in the entire block. During a pixel-based conversion process, the second conversion function P3 diffuses gradation errors for pixels in the target block B1 to the other unconverted pixels correspondingly to each pixel therein based on the gradation values and the diffusion errors for pixels and converts the image data for pixels in the target block B1. In FIG. 3, the target block B1 contains a target pixel U1 that is enclosed in a thick line.

Figure 4:
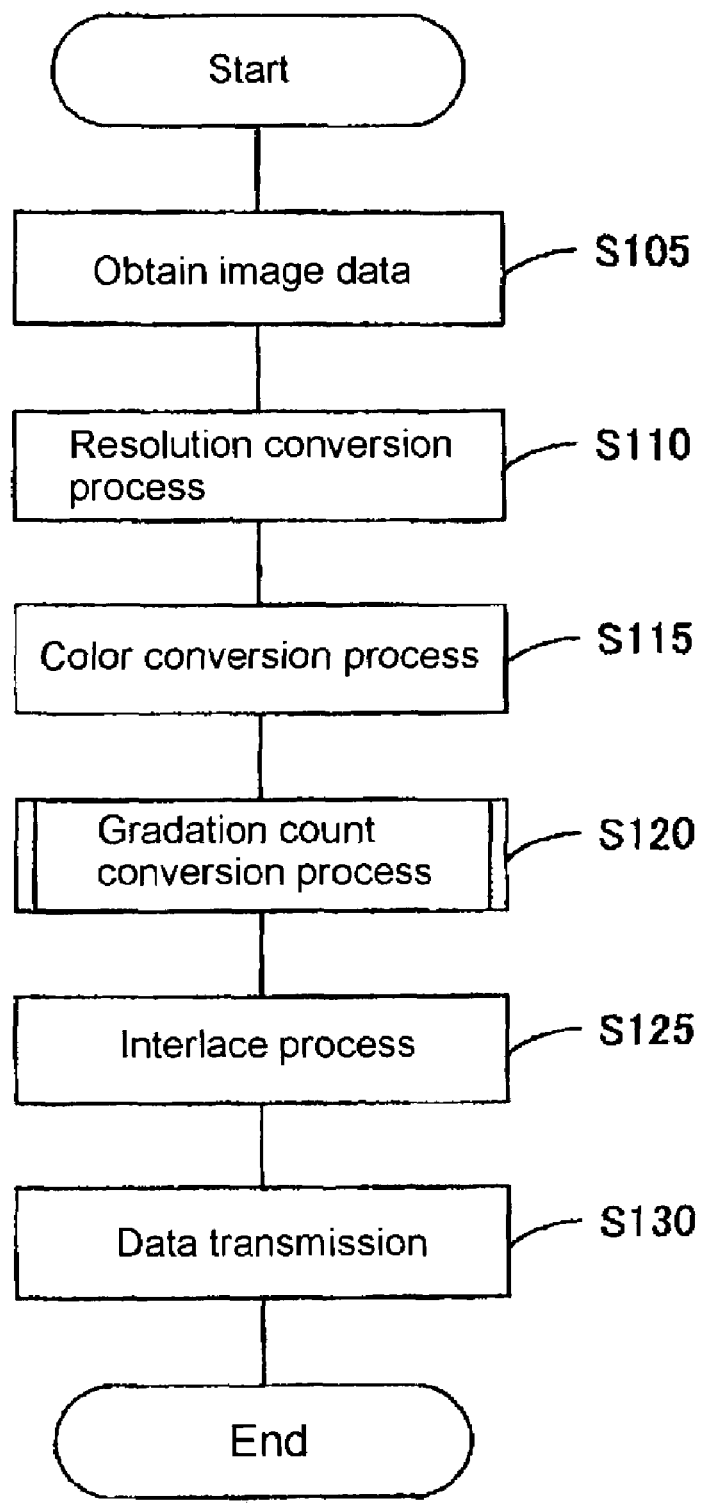
FIG. 4 is a flowchart showing a process the printer driver allows the PC to implement.

FIG. 4 is a flowchart showing processes the above-mentioned modules allow the PC 10 to perform. The CPU 11 of the PC 10 performs this flow of processes.

The APL has an APL-specific print function. When the APL-specific print function selects a print menu displayed on a display 17a, the printer driver operates the image data acquisition module to obtain RGB-based image data (step S105). The resolution conversion module performs a resolution conversion process to convert the resolution of the obtained image data into a resolution for printout on the printer 20 (step S110). Various gradations can be used for the image data with the converted resolution. The embodiment allocates 8 bits to each of RGB to provide 256 gradations from gradation value 0 to 255. Increasing the gradation value also increases each RGB component. Setting all RGB gradation values to 0 results in almost black. Setting all RGB gradation values to 255 forms no dot of color ink. When the obtained image data indicates a high resolution, the resolution is converted by deleting data at a specified rate, for example. When the obtained image data indicates a low resolution, the resolution is converted by interpolating the image data according to the linear interpolation, for example.

The color conversion module performs a color conversion process to convert the RGB-based image data into data corresponding to each of the CMYK color ink (step S115). The color conversion module then uses a color conversion table called the LUT (lookup table) to convert the image data. The LUT according to the present invention is a table that maintains correspondence between values for 256 RGB gradations and those equivalent to CMYK components. Based on an interpolation operation, the LUT provides a large amount of data corresponding to 17×17×17 lattice points, for example. The converted image data is also generated from an image represented in multiple gradations of dot matrix pixels. Increasing the gradation value also increases each CMYK component. Accordingly, increasing the gradation value also increases the density of dots formed on a printout medium.

The gradation conversion module performs a gradation count conversion process (step S120) to convert an image from the CMYK image data represented in dot matrix pixels to image data represented by presence or absence of dot formation. At this time, a so-called error diffusion method is used to diffuse a gradation error of each pixel to the other unconverted pixels to convert the image data.

While the CMYK image data is represented in 256 gradations, the printer 20 performs printing depending on whether or not to form a dot for each color ink. Data transmitted to the printer 20 must be represented in accordance with whether or not a dot is formed. According to the embodiment, the converted image data, when assigned with value 255, is configured to form a dot. The converted image data, when assigned with value 0, is configured not to form a dot. The gradation count conversion process is then performed to convert the image data into data represented by presence or absence of dot formation, i.e., 255 or 0. A block is configured to comprise 2×2 pixels in the image data. The gradation count conversion process is performed in units of blocks according to a specified process condition. The image data conversion is accelerated by maintaining the high image quality.

Thereafter, the interlace module performs an interlace process that sorts the image data represented by presence or absence of dot formation in consideration of a dot formation sequence for the printer 20 (step S125). Finally, the obtained image data is transmitted to the printer 20 (step S130) to complete the process flow. The printer 20 obtains the image data and drives a print head to form dots of color ink on a printout medium. As a result, the printer 20 prints a color image corresponding to the image data from the APL on the printout medium.

Figure 5:
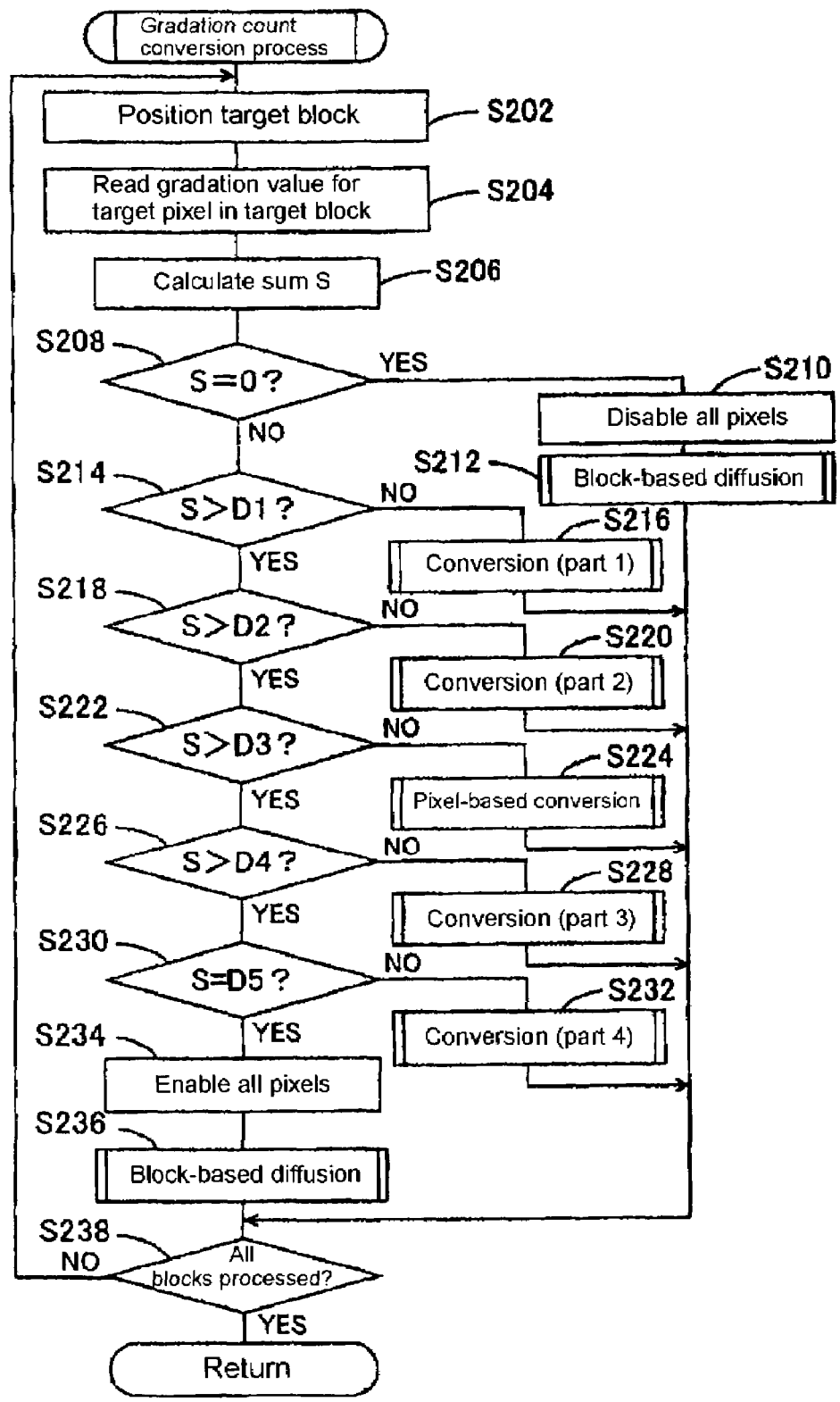
FIG. 5 is a flowchart showing a gradation count conversion process.

Referring now to a flowchart in FIG. 5, the following describes the gradation count conversion process the image data processing apparatus performs.

Figure 6:
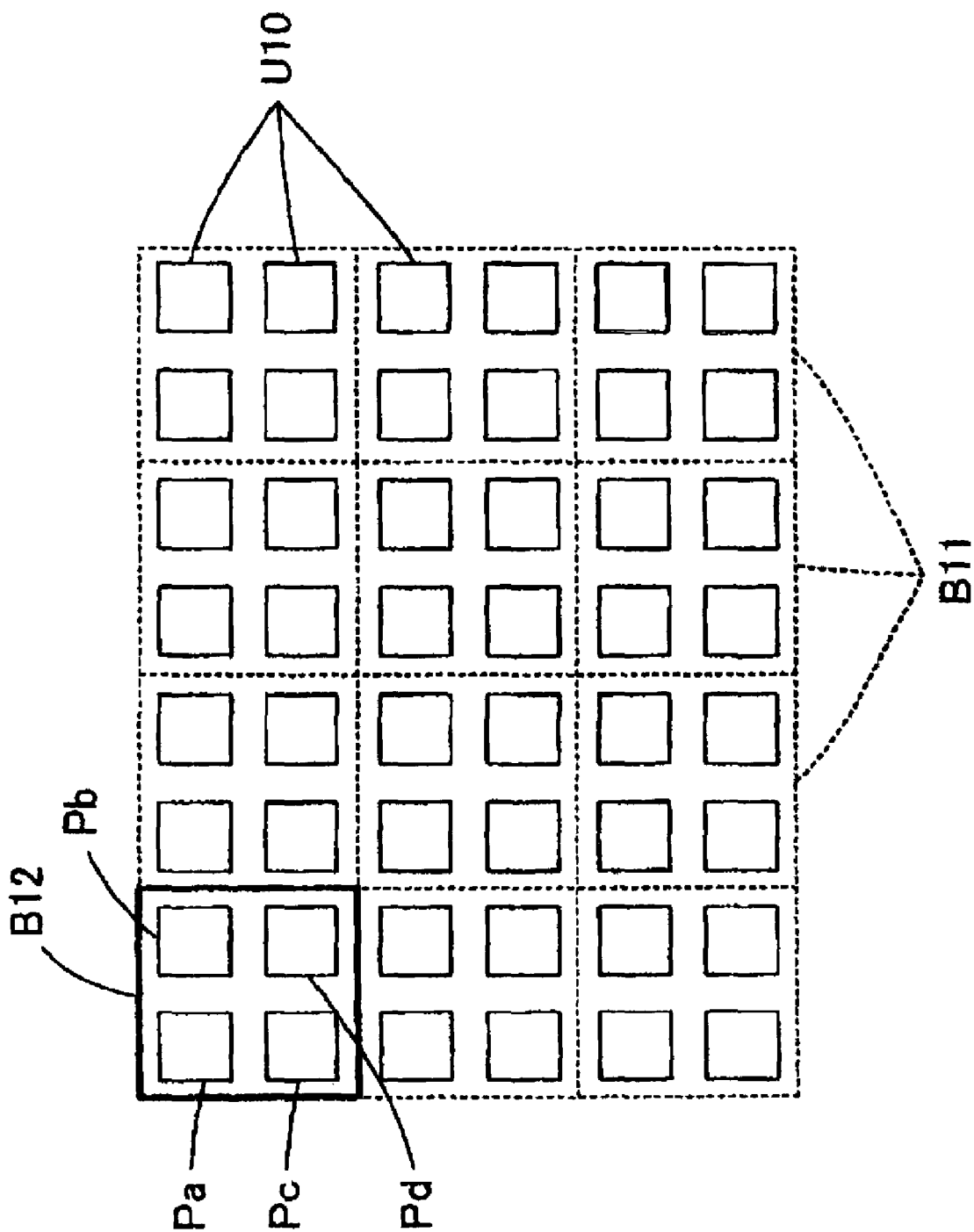
FIG. 6 schematically shows how to position a target block.

The process first forms a block by grouping 2×2 neighboring pixels and positions a target block for converting image data (step S202). FIG. 6 schematically shows how to position the target block. Image data before conversion is CMYK data generated from an image represented in 256 gradations with dot matrix pixels U10. In FIG. 6, each pixel U10 is shown in a small square. It is assumed that a vertical direction corresponds to the top and the bottom of the figure and a horizontal direction corresponds to the right and left thereof. According to the embodiment, one block B11 is assumed to comprise two pixels vertically and two pixels horizontally. In FIG. 6, the block B11 is indicated with a dotted line surrounding four pixels. The block B11 is used as a unit for converting image data. As shown with a thick line, any block B11 is defined as a target block B12. According to the embodiment, a sequence of image data conversion begins with the top left block B11 and sequentially proceeds to the top right block B11, then a row of blocks below, from the block B11 at the left end to the block B11 at the right end, then likewise a row of blocks below, from the block B11 at the left end to the block B11 at the right end, and so on. The sequence ends with the block B11 at the bottom right.

The gradation count conversion process takes place on the basis of the block 11B. In order to prevent the image quality from degrading, it is determined whether the target block B12 is positioned in a bright area, i.e., a highlighted area with high brightness in an image, in a dark area with low brightness, in an area with intermediate brightness, in an area between the highlighted area and the intermediate area, or in an area between the intermediate area and the dark area. The conversion process takes place in accordance with a determination result.

When the target block is positioned, the process reads the gradation value of each pixel in the target block (step S204). The gradation value is converted into the corresponding CMYK color and is stored in the RAM 13. That is to say, the process reads gradation values of four pixels for each of CMYK in the corresponding target block from the RAM 13. For ease of explanation, FIG. 6 depicts four pixels in the target block as Pa at the top left, Pb at the top right, Pc at the bottom left, and Pd at the bottom right.

Thereafter, the process calculates a sum S of the read gradation values (step S206). Let us assume that the pixels Pa, Pb, Pc, and Pd in the target block B12 are given gradation values Da, Db, Dc, and Dd, respectively. The sum S can be found by means of the following equation.

$$S=Da+Db+Dc+Dd \quad (1)$$

Actually, there is provided a gradation value corresponding to each pixel for each of CMYK. The sum S needs to be calculated for each of CMYK.

When the block comprises n pixels, the sums of gradation values can be calculated by means of the following general equation.

$$S=\Sigma(Di), \text{ where "i" is an integer from 1 to n.}$$

Based on the sum S of gradation values, the process determines whether or not the specified block process condition is true, against specified reference values D1 and D4. If it is determined that the block process condition is true, the process is configured to process image data in units of blocks.

If it is determined that the block process condition is false, the second conversion function P3 determines whether or not to form a dot in the target block or whether or not to form a dot for all pixels in the target block based on the gradation value of each pixel in the target block and the diffusion error. If no dot is to be formed in the target block or a dot is to be formed for all pixels in the target block, the process converts the image data in units of blocks. Otherwise, the process converts the image data in units of pixels. The embodiment further speeds up the image data conversion by maintaining the high image quality as follows. When it is determined that the block process condition is false, the process determines whether or not a specified block changeover condition or second block changeover condition is true on the basis of the sum S of gradation values with reference to a specified pixel-specific process reference value (reference value for each pixel partition process) D2 or a second pixel-specific process reference value (second pixel-partition-specific process reference value) D3. If it is determined that the block changeover condition or the second block changeover condition is true, the second conversion function P3 determines the dot formation to perform a process corresponding to a determination result.

After calculating the sum S of gradation values for each pixel in the target block, the process determines whether or not the sum S is 0 (step S208). This determination is made for each of CMYK. The same determination is performed at steps S214, S218, S222, S226, and S230. Since each pixel is capable of gradation values 0 to 255, the sum S becomes 0 when all gradation values are set to 0s for each pixel in the target block. Accordingly, the condition becomes true if all gradation values are set to 0s for each pixel in the target block with respect to each of CMYK. The process then advances to step S210. On the other hand, the condition becomes false if just one gradation value is set to 1 or greater for each pixel. The process then advances to step S214.

Figure 10:
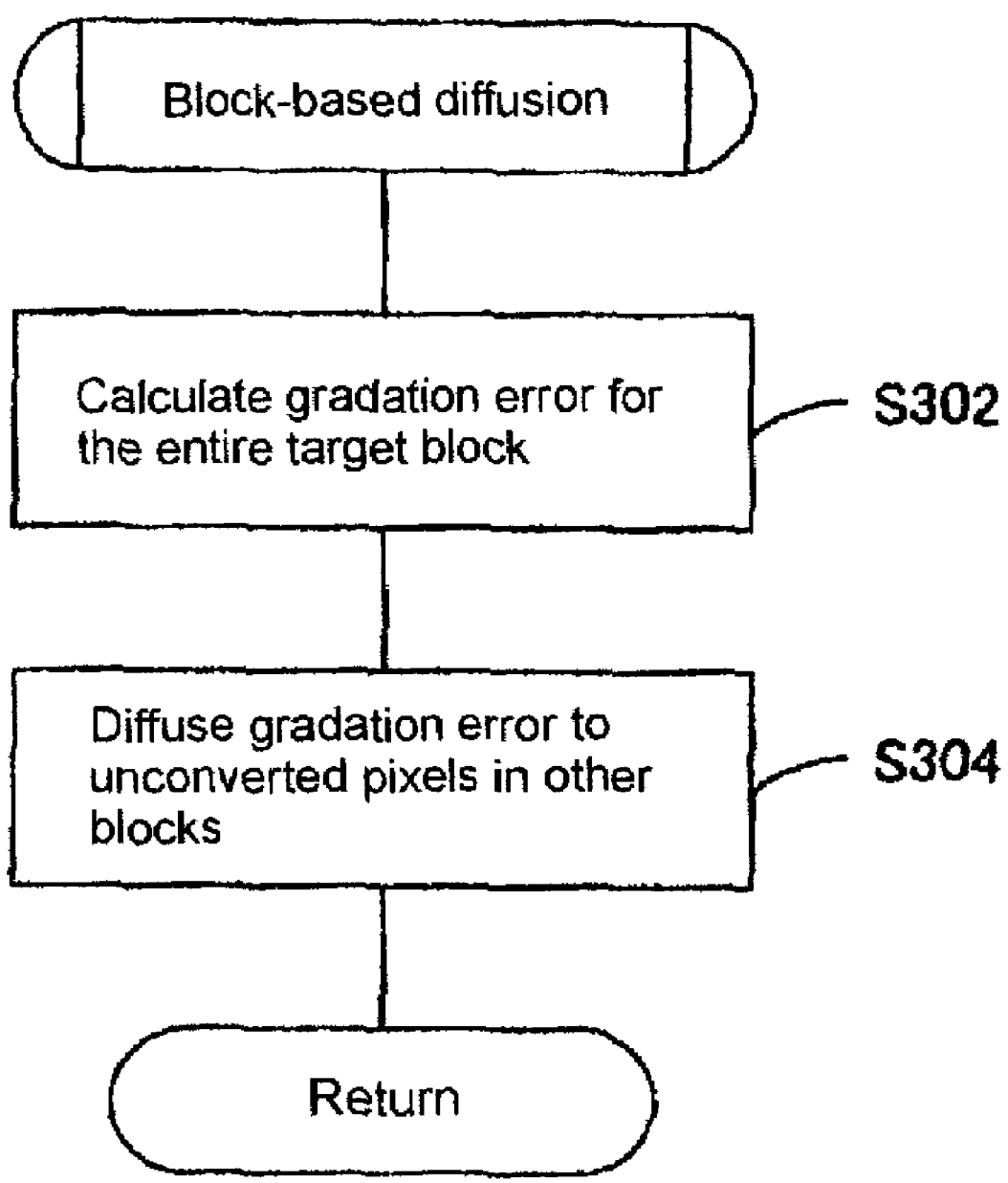
FIG. 10 is a flowchart showing a block-based diffusion.
Figure 11:
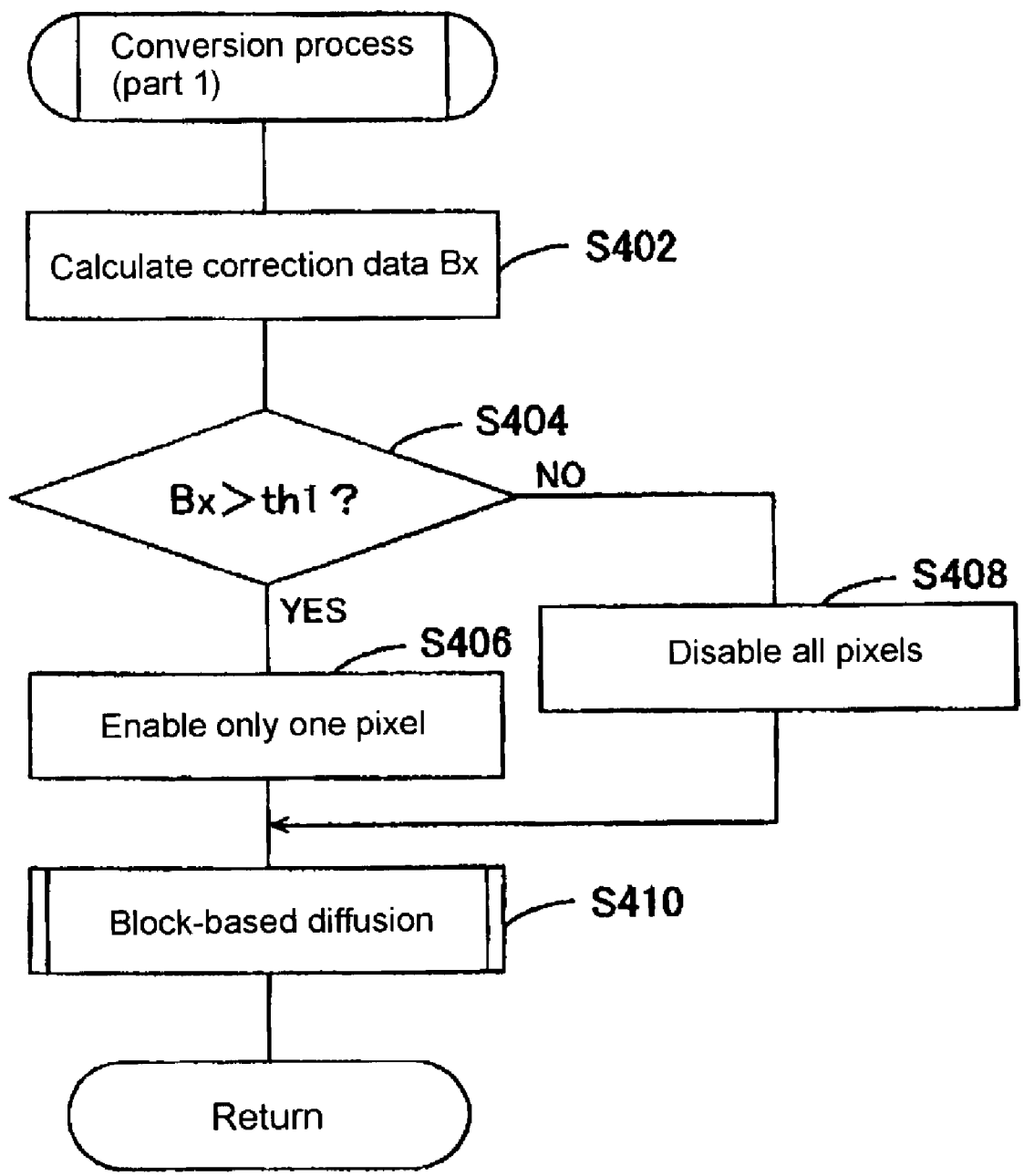
FIG. 11 is a flowchart showing a conversion process (part 1)

At step S210, the process disables all pixels in the target block to form no dot. That is to say, the converted image data in the target block contains all pixels set to 0s and is assumed to form no dot. The process performs the block-based diffusion for error diffusion in units of blocks (step S212 in FIG. 10) and advances to step ST238. When all gradation values are set to 0s for each pixel in the target block, the conversion process at step S216 (part 1 in FIGS. 10 and 11) does not take place, making it possible to accelerate the image data conversion.

At step S214, the process determines whether or not the sum S is greater than the reference value D1. The reference value D1 is predetermined as a boundary value for determining whether or not the high image quality can be maintained in an area with a small image data gradation value after the image data conversion in units of blocks. The reference value D1 is appropriately determined in accordance with the type of image data and the like. If the sum S is greater than the reference value D1 (S>D1), the process advances to step S218 assuming that a specified block process condition is not satisfied in the area with the small image data gradation value. On the other hand, if the sum S is smaller than or equal to the reference value D1 (S≦D1), the process advances to step S218 assuming that the block process condition is satisfied. A high-brightness area in the image corresponds to the area satisfying the condition $0<S \leq D1$ in the image data.

The process performs step S216 when the block process condition is determined to be true. At step S216, the process diffuses an error in units of blocks and performs the conversion process (part 1) to convert the image data at a time, and then advances to step S238.

The process performs step S218 when the block process condition is determined to be false. At step S218, the process determines whether or not the sum S is greater than the specified pixel-specific process reference value D2 according to the present invention. The reference value D2 is predetermined as a boundary value for determining whether or not the high image quality can be maintained in an area with a small image data gradation value after the image data conversion in units of blocks. The reference value D2 is appropriately determined in accordance with the type of image data and the like. Therefore, the reference value D2 is set to be greater than the reference value D1. If the sum S is greater than the reference value D2 (S>D2), the process advances to step S222 assuming that a specified block process condition is not satisfied. On the other hand, if the sum S is smaller than or equal to the reference value D2 ($S \leq D2$), the process advances to step S220 assuming that the block process condition is satisfied.

Figure 12:
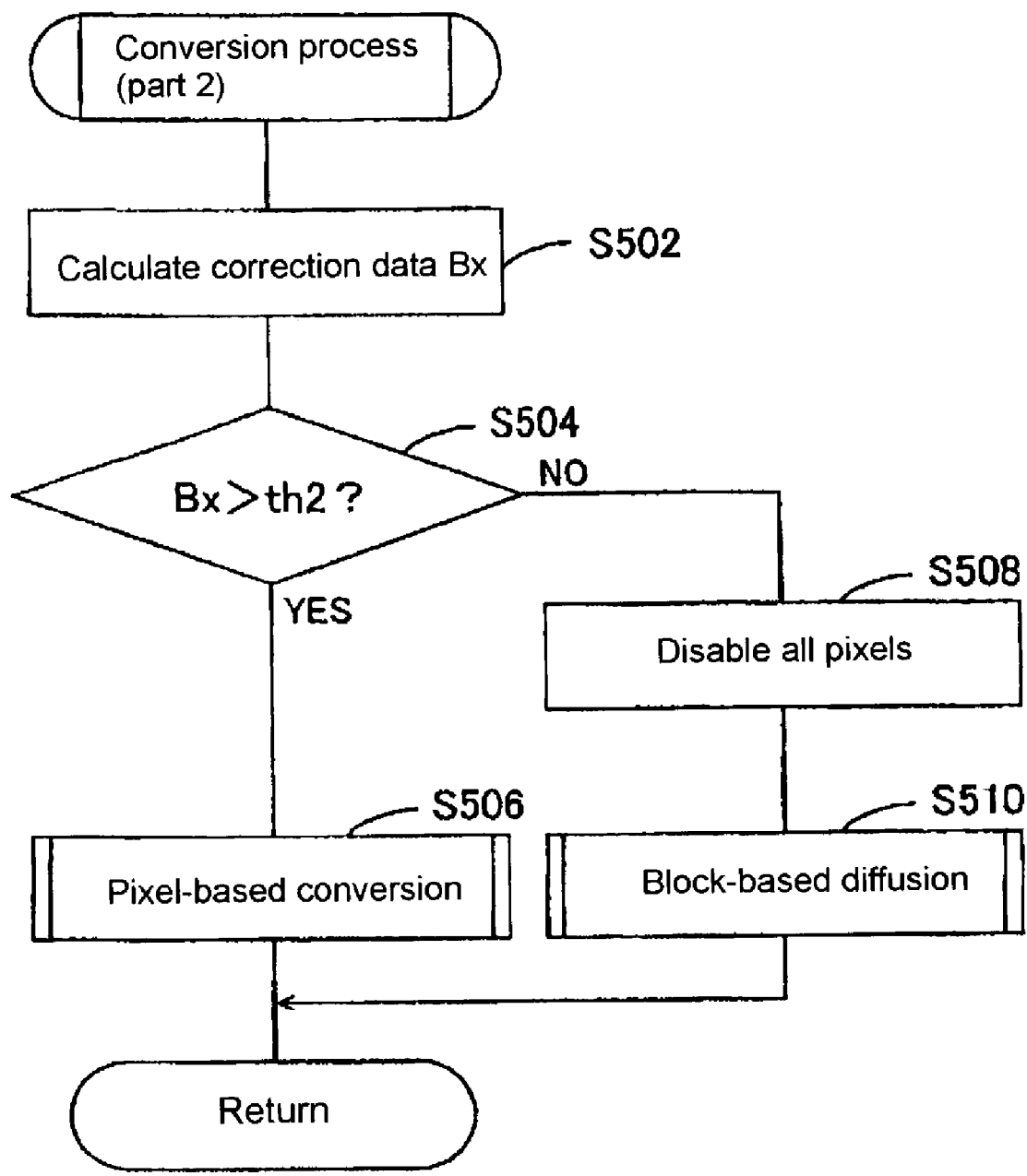
FIG. 12 is a flowchart showing a conversion process (part 2)
Figure 13:
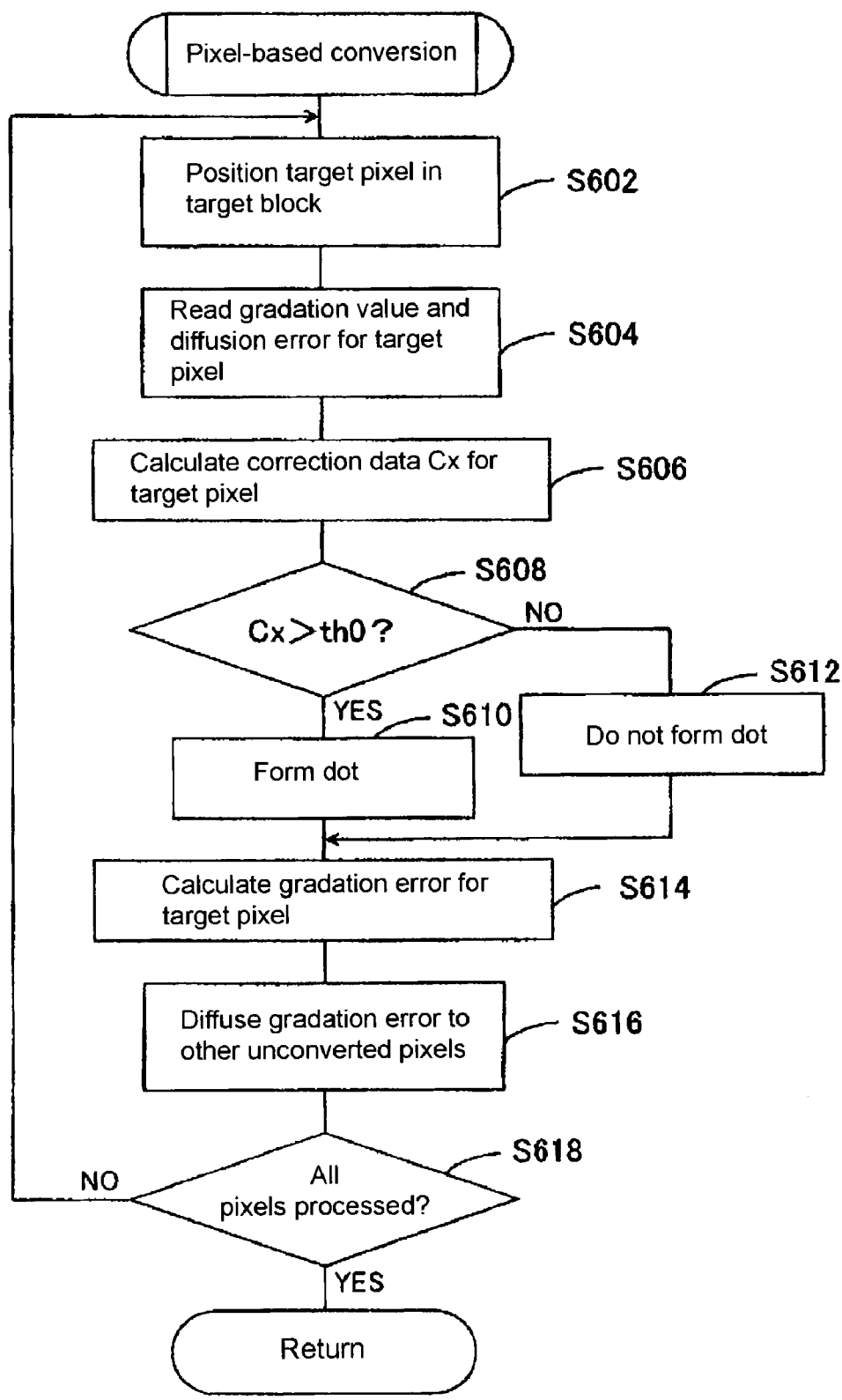
FIG. 13 is a flowchart showing a pixel-based conversion.

The process performs step S220 when the block changeover condition is determined to be true. At step S220, the process determines whether or not to form a dot in the target block based on each pixel's gradation value in the target block and diffusion errors from the other pixels. Depending on whether or not to form a dot, the process diffuses an error in units of blocks or pixels and performs the conversion process (part 2 in FIGS. 10, 12, and 13) to convert the image data, and then advances to step S238.

The process performs step S222 when the block changeover condition is determined to be false. At step S222, the process determines whether or not the sum S is greater than the second pixel-specific process reference value D3 according to the present invention. The reference value D3 is predetermined as a boundary value for determining whether or not the high image quality can be maintained in an area with a large image data gradation value after the image data conversion in units of blocks. The reference value D3 is appropriately determined in accordance with the type of image data and the like. The reference value D3 is set to be greater than the reference value D2. If the sum S is greater than the reference value D3, the process advances to step S226. If the sum S is smaller than or equal to the reference value D3 ($S \leq D3$), the process advances to step S224. When an area in the image data satisfies the condition $D2 \leq S < D3$, the area provides intermediate brightness in the image. It may be preferable to determine whether or not the sum S is greater than or equal to the reference value D3 at step S222.

At step S224, the process does not determine whether or not to form a dot in the target block or form a dot for all pixels therein. The process diffuses an error in units of pixels and converts image data in units of pixels, and then advances to step S238.

At step S226, the process determines whether or not the sum S is greater than the specified reference value D4. The reference value D4 is predetermined as a boundary value for determining whether or not the high image quality can be maintained in an area with a large image data gradation value after the image data conversion in units of blocks. The reference value D4 is appropriately determined in accordance with the type of image data and the like. Therefore, the reference value D4 is set to be greater than the second pixel-specific process reference value D3. If the sum S is greater than the reference value D4 (S>D4), the process advances to step S230 assuming that a specified block process condition is satisfied in an area with a large image data gradation value. On the other hand, if the sum S is smaller than or equal to the reference value D4 ($S \leq D4$), the process advances to step S228 assuming that a specified second block changeover condition is satisfied.

Figure 14:
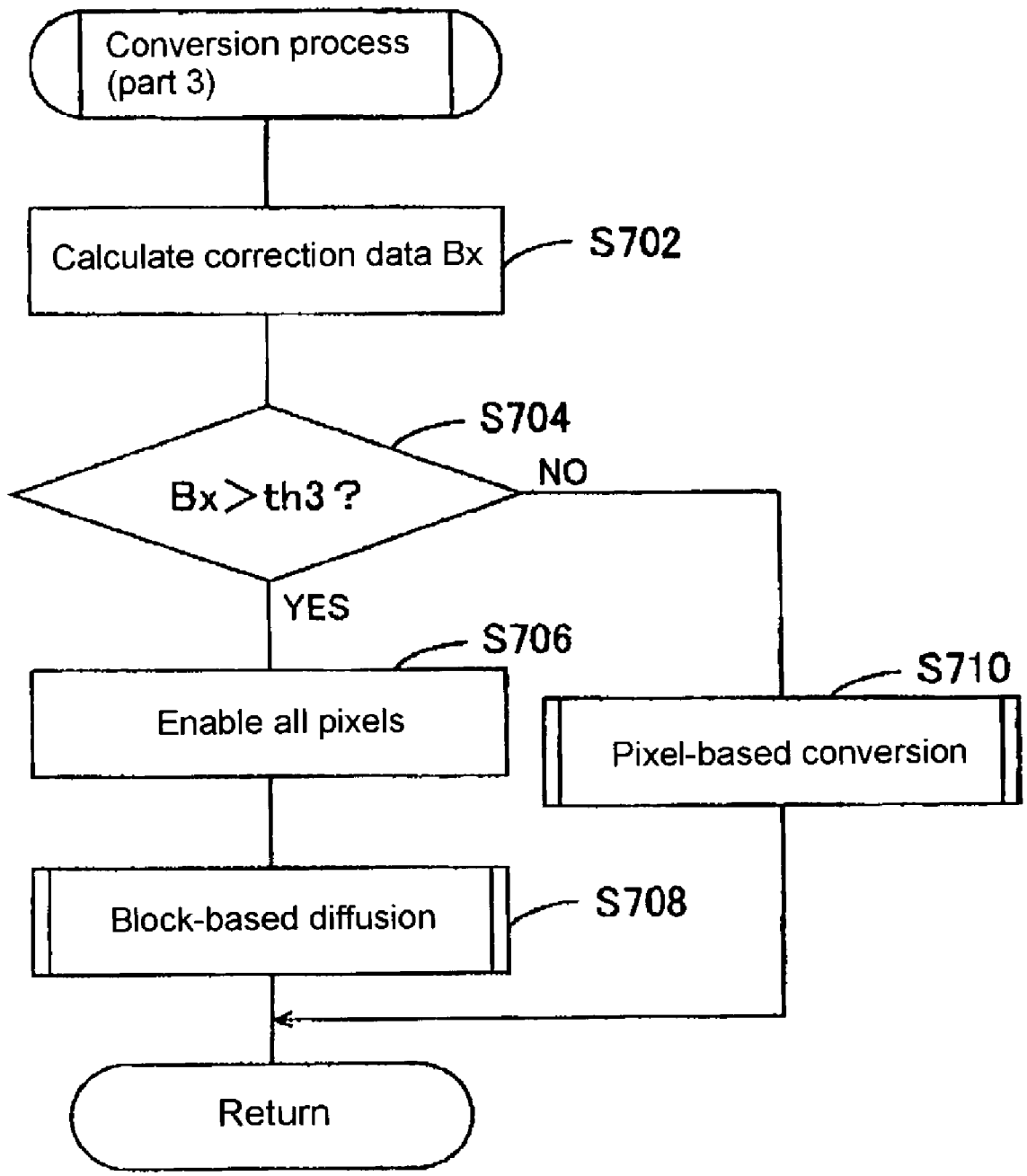
FIG. 14 is a flowchart showing a conversion process (part 3)

The process performs step S228 when the second block changeover condition is determined to be true. At step S228, the process determines whether or not to form a dot for all pixels in the target block based on each pixel's gradation value in the target block and diffusion errors from the other pixels. Depending on whether or not to form a dot for all pixels, the process diffuses an error in units of blocks or pixels and performs the conversion process (part 3 in FIGS. 10, 13, and 14) to convert the image data, and then advances to step S238.

Figure 15:
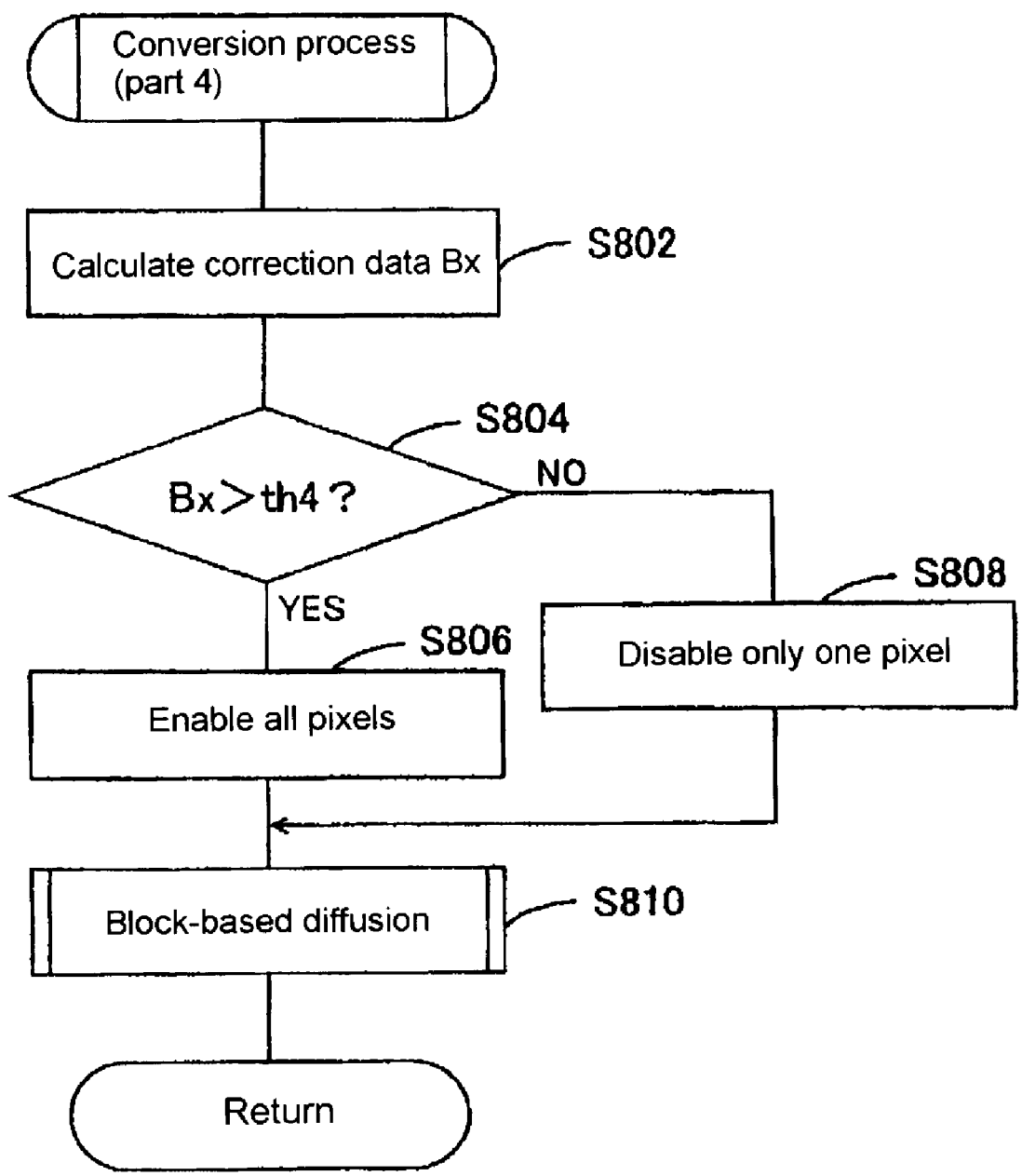
FIG. 15 is a flowchart showing a conversion process (part 4)

The process performs step S230 when the block process condition is determined to be true. At step S230, the process determines whether or not the sum S matches the specified reference value D5. The reference value D5 is equivalent to a value obtained by multiplying 255 by the number of pixels in a block. When the block comprises 2×2 pixels, the reference value D5 is 4×255=1020. Each pixel's gradation value ranges from 0 to 255. Accordingly, the sum S equals the reference value D5 only when all gradation values are set to 255 for each pixel in the target block. Accordingly, the condition becomes true if all gradation values are set to 255 for each pixel in the target block with respect to each of CMYK. The process then advances to step S234. On the other hand, the condition becomes false if just one gradation value is set to 254 or smaller for each pixel. The process then advances to step S232. At step S232, the process diffuses an error in units of blocks and performs the conversion process (part 4 in FIGS. 10 and 15) to convert the image data at a time, and then advances to step S238.

At step S234, on the other hand, the process enables all pixels in the target block to form a dot. That is to say, the converted image data in the target block contains all pixels set to 255 and is assumed to form a dot. As will be discussed in more detail below, the process performs the block-based diffusion for error diffusion in units of blocks (step S236) and advances to step S238. When all gradation values are set to 255 for each pixel in the target block, the conversion process at step S232 (part 4) does not take place, making it possible to accelerate the image data conversion.

At step S238, it is determined whether or not the conversion process terminates for all blocks in the image data. When there remains an unconverted block, the process returns to step S202. When there is a block to the right of the most recent target block, that block is positioned to be the target block. When no block remains to the right of the most recent target block, the left-most block on a row of blocks below is assumed to be the target block. In this manner, the above-mentioned image data conversion is repeated. When all blocks have been converted, the gradation count conversion process terminates. Thereafter, the interlace process at step S125 in FIG. 4 is performed to send image data represented by presence or absence of dot formation to the printer 20.

The image data conversion for the target block is selected as follows depending on the sum S calculated from gradation values for each pixel in the target block.

Disabling all pixels and then block-based diffusion when S=0
  Conversion process (part 1) when 0<S≦D1
  Conversion process (part 2) when D1<S≦D2
  Pixel-based conversion when D2<S≦D3
  Conversion process (part 3) when D3<S≦D4
  Conversion process (part 4) when D4<S<D5
Enabling all pixels and then block-based diffusion when S=D5

Here, the block process condition is true when 0<S≦D1 or D 4<S. At steps S202 through S208, S214, and S226, the process collects a specified number of neighboring pixels to form a block. Based on a gradation value of each pixel in the target block to convert image data, the process implements the block process determination function to determine whether or not a specified block process condition is satisfied.

The following example shows how to convert image data at a time by performing the error diffusion in units of blocks.

Figure 7:
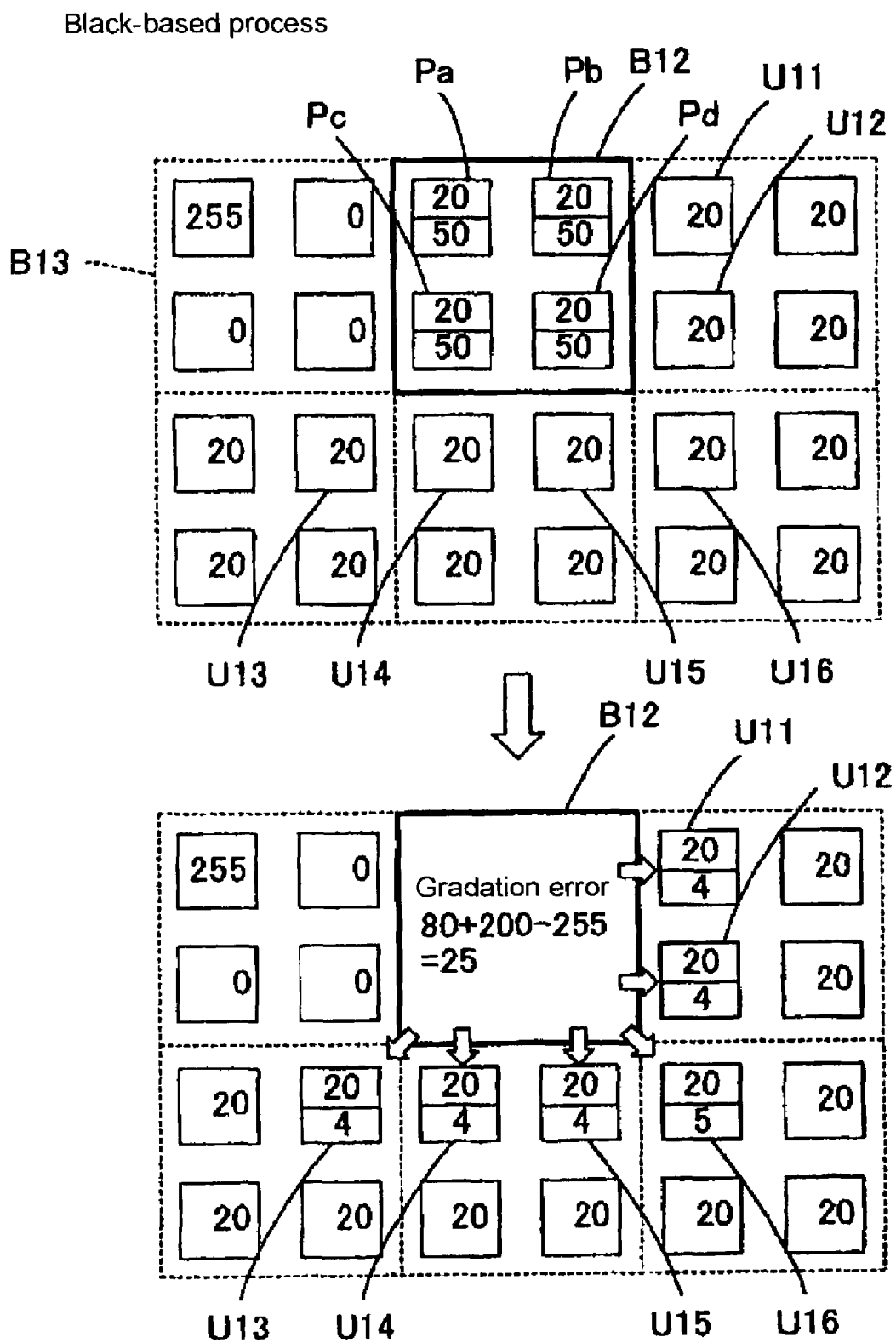
FIG. 7 explains how image data is converted while an error is diffused in units of blocks.

FIG. 7 explains how image data is converted while an error is diffused in units of blocks. The converted image data is stored in a specified area of the RAM 13. For ease of explanation, the converted image data is described for a pixel where the conversion process has terminated.

The upper part of FIG. 7 shows that the image data conversion process accompanied by the error diffusion is complete up to a block B13 to the left of the target block B12. The example of FIG. 7 assumes that the target block B12 is a high-brightness area in the image. Each of the pixels Pa, Pb, Pc, and Pd in the target block B12 stores gradation value 20 (described in the upper half of each pixel). Gradation error 50 (described in the lower half of each pixel) is diffused from the other blocks. As a process example, the above-mentioned block process condition is assumed to be true when the sum S of gradation values for the pixels Pa, Pb, Pc, and Pd is smaller than or equal to the threshold value 100. It is assumed that a dot is formed for only one pixel in the target block B12 when the total sum of gradation values and diffusion errors for all the pixels in the target block is greater than 150. Of course, these threshold values are just examples and can be set to various values.

The block process condition becomes true since the sum of gradation values for the pixels in the target block B12 is 20+20+20+20=80. A dot is formed for only one pixel in the target block B12 since the sum of diffusion errors for the pixels is 50+50+50+50=200. The sum of gradation values for the pixels and the diffusion errors in the target block B12 is 80+200=280. As indicated with the block B13 at the left end, the embodiment forms a dot at the pixel Pa at the upper left of the target block B12. That is to say, the image data for the pixel Pa is set to 255, and the image data for the remaining pixels Pb, Pc, and Pd is set to 0.

In this manner, the conversion process is simplified by forming a dot only for the pixel at a specified position in the target block, speeding up the image data conversion. When a dot is to be formed only for one pixel in the target block B12, the dot maybe formed for the pixel Pb, Pc, or Pd. Of course, it may be preferable to form a dot by selecting a pixel having the largest gradation value in the target block or randomly selecting a pixel therefrom.

A gradation error for the entire target block is found by subtracting the sum of gradation values for the pixels in the target block B12 after the image data conversion from the sum of gradation values and diffusion errors for the pixels in the target block B12. The example in FIG. 7 shows 80+200=280 as the sum of gradation values and diffusion errors for the pixels in the target block B12. Therefore, the gradation error results in 25 by subtracting the sum 255 of gradation values for the pixels in the target block B12 after conversion from that result 280. The gradation error for the entire target block is diffused to unconverted pixels in the other blocks. FIG. 7 shows that the gradation error is diffused to six unconverted pixels U11 through U16 adjacent to the target block B12. With reference to the target block B12, the unconverted pixel U11 is positioned to the upper left of the block at the right; U12 to the lower left of the same block; U13 to the upper right of the block at the lower left; U14 to the left of the block below; U15 to the upper right of the same block; and U16 to the upper left of the block at the lower right. Pixels are already converted in the blocks at the upper left, at the top, and at the left of the target block. The gradation error is not diffused to these pixels.

According to the embodiment, the gradation error is almost evenly diffused to the unconverted pixels in the other blocks. The above-mentioned example shows gradation error 25 for the entire target block B12. Since there are six unconverted pixels in the other blocks, 25 is divided by 6 to yield 4 by rounding for diffusion to the unconverted pixels. If an aliquant part of the gradation error is 6, the process adjusts the gradation error to be diffused to the unconverted pixel U16 so that a match is made between the sum of gradation errors diffused to the unconverted pixels U11 through U16 and the gradation error for the entire target block B12. As a result, as shown at the bottom of FIG. 7, gradation error 4 is diffused to the unconverted pixels U11 through U15 and gradation error 5 is diffused to the unconverted pixel U16.

In this manner, it is possible to convert image data for pixels in the target block at a time by diffusing a gradation error for the entire target block to unconverted pixels outside the target block.

Figure 8:
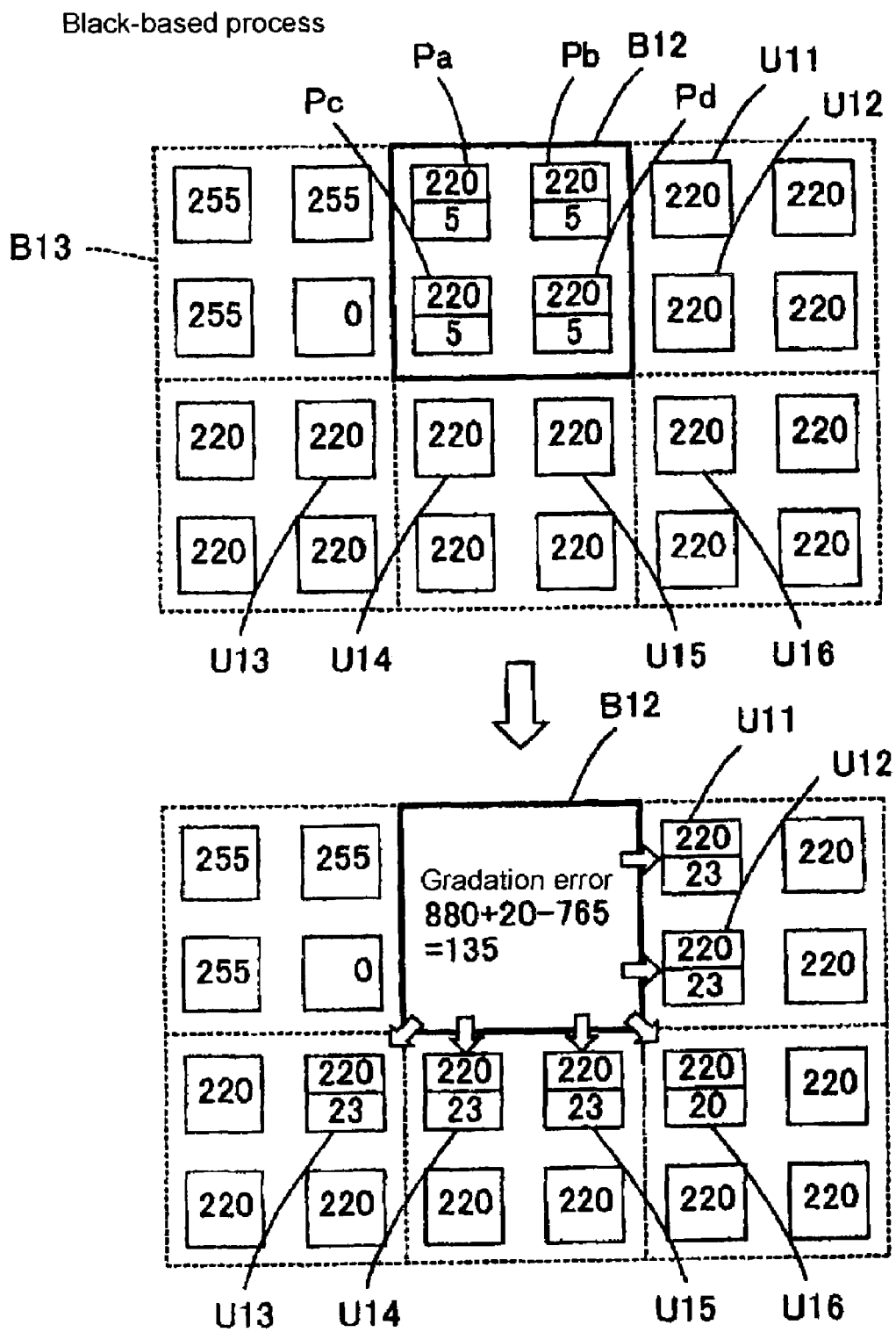
FIG. 8 explains how image data is converted while an error is diffused in units of blocks.

The same principle can be applied to convert image data in units of blocks even when the target block B12 is a low-brightness area in the image. FIG. 8 explains how image data is converted by diffusing an error in units of blocks when the target block B12 is a low-brightness area in the image.

The example in FIG. 8 shows that gradation value 220 (described in the upper half of each pixel) is stored in each of pixels Pa, Pb, Pc, and Pd in the target block B12. According to the example, gradation error 5 (described in the lower half of each pixel) is diffused from the other blocks. As a process example, the above-mentioned block process condition is assumed to be true when the sum S of gradation values for the pixels Pa, Pb, Pc, and Pd is greater than the threshold value 870. It is assumed that no dot is formed for only one pixel in the target block B12 when the total sum of gradation values and diffusion errors for all the pixels in the target block is smaller than or equal to 920. Of course, these threshold values are just examples and can be set to various values.

The block process condition becomes true since the sum of gradation values for the pixels in the target block B12 is 220+220+220+220=880. No dot is formed for only one pixel in the target block B12 since the sum of diffusion errors for the pixels is 5+5+5+5=20. The sum of gradation values for the pixels and the diffusion errors in the target block B12 is 880+20=900. As indicated with the block B13 at the left end, the embodiment forms no dot at the pixel Pd at the lower right of the target block B12. That is to say, the image data for the pixels Pa, Pb, and Pc is set to 255, and the image data for the pixel Pd is set to 0.

In this manner, the image data conversion can be simplified even when the target block B12 is a low-brightness area in the image. Of course, it is possible to form no dot for only one pixel in the target block B12 through various patterns such as forming no dot for only the pixel Pa, Pb, or Pc.

As mentioned above, a gradation error for the entire target block is found by subtracting the sum of gradation values for the pixels in the target block B12 after the image data conversion from the sum of gradation values and diffusion errors for the pixels in the target block B12. The example in FIG. 8 shows 880+20=900 as the sum of gradation values and diffusion errors for the pixels in the target block B12. Therefore, the gradation error results in 135 by subtracting the sum 765 (255×3) of gradation values for the pixels in the target block B12 after conversion from that result 900. The gradation error for the entire target block is diffused to unconverted pixels in the other blocks. According to the embodiment, the gradation error is almost evenly diffused to unconverted pixels in the other blocks even if the area has low brightness. According to the above-mentioned example, since there are six unconverted pixels in the other blocks, 135 is divided by 6 to yield 23 by rounding for diffusion to the unconverted pixels. If an aliquant part of the gradation error is 6, the process adjusts the gradation error to be diffused to the unconverted pixel U16 so that a match is made between the sum of gradation errors diffused to the unconverted pixels U11 through U16 and the gradation error for the entire target block B12. As a result, as shown at the bottom of FIG. 8, gradation error 23 is diffused to the unconverted pixels U11 through U15 and gradation error 20 is diffused to the unconverted pixel U16.

In this manner, it is possible to convert image data for pixels in the target block at a time by diffusing a gradation error for the entire target block to unconverted pixels outside the target block even if the area has low brightness.

On the other hand, the following example shows how to convert image data by performing the error diffusion in units of pixels.

Figure 9:
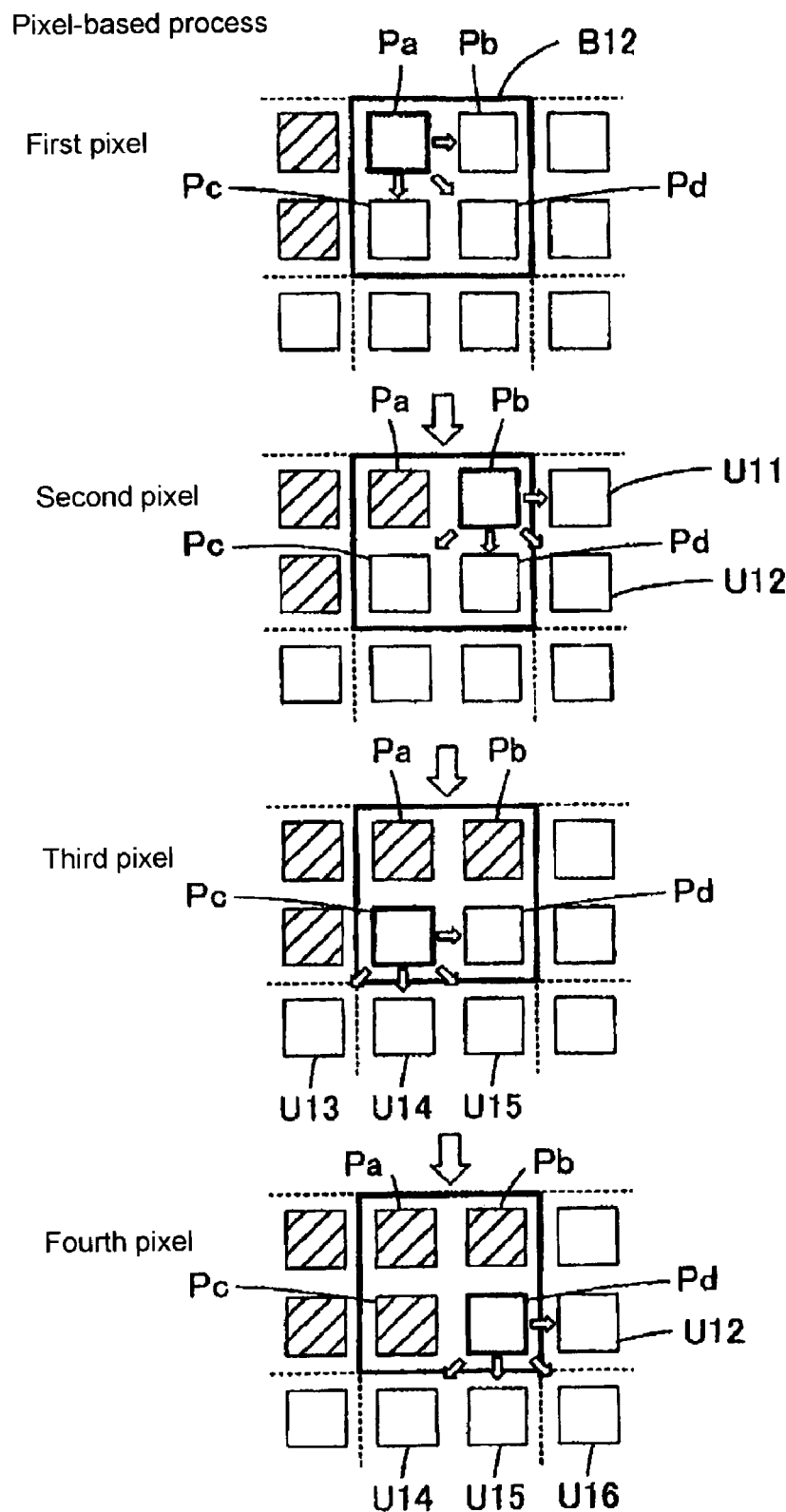
FIG. 9 explains how image data is converted while an error is diffused in units of pixels.

FIG. 9 explains how image data is converted while an error is diffused in units of pixels. A shaded pixel indicates that the image data conversion is complete for that pixel.

The embodiment converts image data for pixels in the target block B12 while diffusing gradation errors for the pixels therein in the order of pixels Pa, Pb, Pc, and Pd. Here, an unconverted pixel may be located in the target block B12 or in another block.

First, it is determined whether or not to form a dot for the first pixel Pa based on the gradation values and gradation errors from the other pixels. The image data after conversion is set to 255 or 0. The gradation error of the pixel Pa is diffused to the other unconverted pixels, i.e., to the unconverted pixel Pb at the right of the pixel Pa, to the unconverted pixel Pc below, and to the unconverted pixel Pd at the lower right. Also during a pixel-based conversion-process, the gradation error is almost evenly diffused to three unconverted pixels Pb, Pc, and Pd. In FIG. 9, a small white arrow illustrates diffusion of the gradation error.

Likewise, it is determined whether or not to form a dot for the second pixel Pb. The image data after conversion is set to 255 or 0. The gradation error of the pixel Pb is almost evenly diffused to the unconverted pixel Pc at the lower left of the pixel Pb, to the unconverted pixel Pd below, and to the unconverted pixel U11 at the right, and the unconverted pixel U12 at the lower right outside the target block B12.

Likewise, the image data after conversion is set to 255 or 0 for the third pixel Pc. The gradation error of the pixel Pc is almost evenly diffused to the unconverted pixel Pd at the right of the pixel Pc, and to the unconverted pixel U13 at the lower left, to the unconverted pixel U14 below, and the unconverted pixel U15 at the lower right outside the target block B12.

Likewise, the image data after conversion is set to 255 or 0 for the fourth pixel Pd. The gradation error of the pixel Pd is almost evenly diffused to the unconverted pixel U12 at the right of the pixel Pd, to the unconverted pixel U14 at the lower left, to the unconverted pixel U15 below, and the unconverted pixel U16 at the lower right outside the target block B12.

In this manner, it is possible to diffuse a gradation error of each pixel in the target block to the other unconverted pixels based on the pixel's gradation value and diffusion error to convert image data for the pixels in the target block.

There are available various techniques for diffusing a gradation error to the other unconverted pixels in addition to the method of diffusing the gradation error of each pixel in the target block as shown in FIG. 9. For example, it may be preferable to convert the image data by diffusing a gradation error of the pixels Pa, Pb, and Pc to only unconverted pixels in the target block B12 and diffusing only the gradation error of the pixel Pd to an unconverted pixel in the other block. Further, it may be preferable to provide different rates of diffusing the gradation error depending on unconverted pixel positions. Of course, image data can be converted in various sequences not only in the order of the pixels Pa, Pb, Pc, and Pd, but also in the order of the pixels Pa, Pc, Pb, and Pd, for example.

While the embodiment defines a pixel partition according to the present invention by grouping pixels in the target block on a pixel basis, it may be preferable to form the pixel partition by grouping pixels in the target block in units of two pixels or more. For example, the pixel partition can be formed of two pixels horizontally by one pixel vertically. In this case, image data for the pixels Pa and Pb in FIG. 9 may be converted at a time by diffusing the gradation error for the entire of the pixels Pa and Pb to unconverted pixels except these pixels based on the gradation value and the diffusion error of the pixels Pa and Pb. Then, image data for the pixels Pc and Pd may be converted at a time by diffusing the gradation error for the entire of the pixels Pc and Pd to unconverted pixels except these pixels based on the gradation value and the diffusion error of the pixels Pc and Pd.

Conventionally, an area satisfying the above-mentioned block process condition is assumed to ensure high image brightness capable of maintaining the high image quality even after the image data conversion in units of blocks. The determination of whether or not to satisfy the block process condition is based on the gradation value and diffusion error of all pixels in the target block. When it is determined that the block process condition is satisfied, a process is performed to convert the image data for pixels in the target block at a time. When it is determined that the block process condition is not satisfied, a process is performed to unconditionally convert the image data for each of pixels in the target block. When no dot is formed in the target block, however, the same gradation error is diffused from the target block to the other blocks and no dot is formed anyway irrespectively of whether the conversion process is performed in units of pixels or blocks. The same applies to the case where a dot is formed for all pixels in the target block. The same gradation error is diffused from the target block to the other blocks and a dot is formed for all the dots anyway irrespectively of whether the conversion process is performed in units of pixels or blocks.

Even when the block process condition is determined to be false as shown in FIG. 3, the present invention determines whether or not to form a dot in the target block, or whether or not to form a dot for all pixels in the target block based on the gradation value and diffusion error of each pixel in the target block. Image data is converted in units of pixels or blocks according to a determination result. That is to say, image data is converted in units of blocks when no dot is formed in the target block or a dot is formed for all pixels therein. Otherwise, image data is converted in units of pixels. As a result, it becomes possible to further accelerate the conversion process from image data generated from an image represented in multiple gradations of dot matrix pixels to image data represented by presence or absence of dot formation through the use of the error diffusion method. Moreover, it becomes possible to further accelerate the conversion process while maintaining the high image quality not only in an area with the small gradation value for image data, but also in an area with the large gradation value.

(2) Second Embodiment

The second embodiment of the present invention will now be described. The description about the same portions as in the first embodiment uses the same reference numerals and figures.

Figure 16:
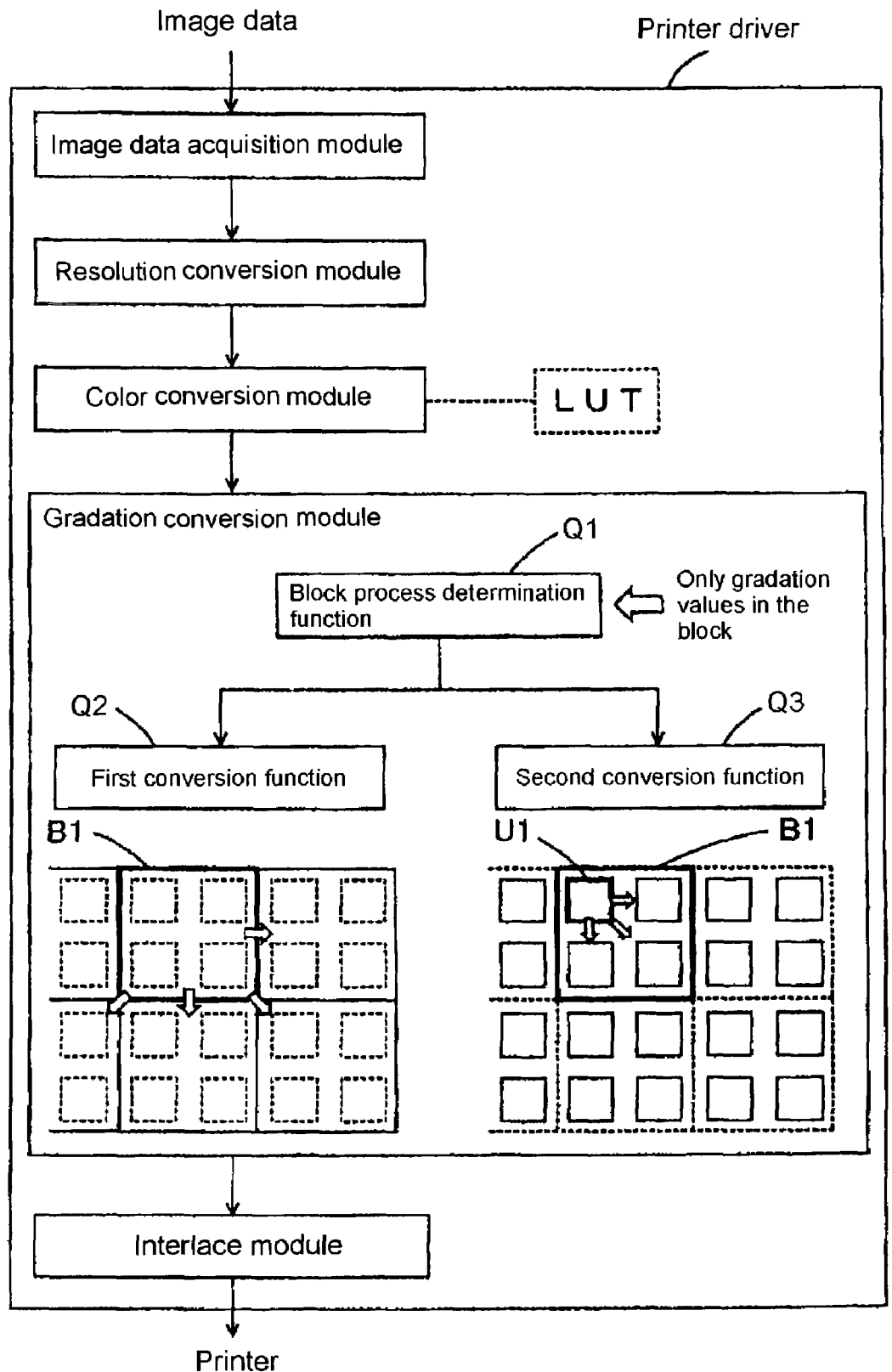
FIG. 16 schematically shows a printer driver configuration.

FIG. 16 schematically shows a printer driver configuration.

The image data processing program comprises a block process determination function Q1, a first conversion function Q2, and a second conversion function Q3. The functions Q1 through Q3 allow the PC 10, to function as the block process determination unit, the first conversion unit, and the second conversion unit according to the present invention, respectively.

The determination function Q1 forms a block by grouping 2×2 neighboring pixels and determines whether or not to satisfy a specified block process condition based on gradation values for pixels in the target block B1 to convert image data. If it is determined that the block process condition is true, the first conversion function Q2 converts image data for pixels in the target block B1. If it is determined that the block process condition is false, the second conversion function Q3 converts image data for pixels in the target block B1. Based on the gradation values and diffused gradation errors (hereafter referred to as diffusion errors) for pixels in the target block B1, the first conversion function Q2 diffuses a gradation error for the entire target block B1 to unconverted pixels outside the target block B1 and converts the image data for pixels in the target block B1 at a time. That is to say, the first conversion function Q2 converts image data in units of blocks.

On the other hand, the second conversion function Q3 implements a conversion process in units of pixels smaller than blocks without grouping pixels in the entire block except when no dot is formed in the target block B1 or a dot is formed for all pixels in the target block B1. When not implementing the pixel-based conversion process, the second conversion function Q3 implements the block-based conversion process in the same manner as the first conversion function Q2. During a pixel-based conversion process, the second conversion function Q3 diffuses gradation errors for pixels in the target block B1 to the other unconverted pixels correspondingly to each pixel therein based on the gradation value and the diffusion error for each pixel and converts the image data for the pixels in the target block B1. FIG. 16 shows only the pixel-based conversion process corresponding to the function Q3. The target block B1 contains the target pixel U1 that is enclosed in a thick line.

Conventionally, it is determined whether or not to satisfy a given condition based on gradation values and diffusion errors for all pixels in the target block. When it is determined that the block process condition is true, a process is performed to convert image data for pixels in the target block at a time. When it is determined that the block process condition is false, a process is performed to convert image data for respective pixels in the target block. As shown in the upper part of FIG. 17, however, image data is converted in units of blocks or pixels depending on diffusion error sizes in each block even if respective blocks show the same sum of gradation values for the pixels therein. A small square in the figure shows each pixel. In each pixel, the upper part exemplifies a gradation value before conversion; the lower part exemplifies a diffusion error. The example here assumes value 150 as a threshold for the sum of gradation values and diffusion errors for pixels in the target block. For ease of explanation, the block changeover condition is not considered.

The upper part of FIG. 17 shows that gradation values and diffusion errors for the pixels in the block B101 or B103 are summed up to 120 which is smaller than the threshold value 150. In this case, the block process condition becomes true according to the prior art, converting image data in units of blocks. On the other hand, gradation values and diffusion errors for the pixels in the block B102 are summed up to 280 which is greater than the threshold value 150. In this case, the block process condition becomes false according to the prior art, converting image data in units of pixels. As a result, different dot patterns are formed depending on whether the block is processed in units of blocks or pixels. An unintended design may be generated.

As shown in the lower part of FIG. 17, the present invention determines whether or not the block process condition is satisfied only based on gradation values for all pixels in the target block and accordingly selects a block-based or pixel-based conversion process to prevent an unintended design from appearing. The lower part of the figure assumes value 100 as a threshold for the sum of only gradation values for pixels in the target block. Only gradation values for the pixels in the block B104 or B106 are summed up to 80 which is smaller than the threshold value 100. In this case, the block process condition according to the present invention is satisfied to convert the image data in units of blocks as conventionally practiced. Further, only gradation values for the pixels in the block B105 are also summed up to 80 which is smaller than the threshold value 100. Therefore, the block process condition according to the present invention is also satisfied to convert the image data in units of blocks not as conventionally practiced, providing a faster conversion process than the prior art.

When target blocks show the same sum of gradation values for the pixels in each target block, only one of the block-based and pixel-based processes is performed to convert the image data for pixels in the target block independently of the size of a gradation error diffused to the target block. Therefore, this prevents occurrence of an unintended design depending on whether the conversion process is performed in units of blocks or pixels. In addition, it is possible to prevent the image quality from degrading when the block-based conversion process is performed due to a small diffusion error for an area that requires the pixel-based conversion process. In addition, it is possible to prevent a processing speed from decreasing when the pixel-based conversion process is performed due to a large diffusion error for an area that can maintain the high image quality after execution of a block-based conversion process.

Accordingly, it is possible to fast obtain an image with higher image quality by converting the image data through the use of the error diffusion method. Moreover, the same effect is available when image data is converted on a block basis not only in an area having a small gradation value for the image data, but also in an area with a large gradation value.

(3) Third Embodiment

The third embodiment of the present invention will now be described. The description about the same portions as in the first and second embodiments uses the same reference numerals and figures.

Figure 18:
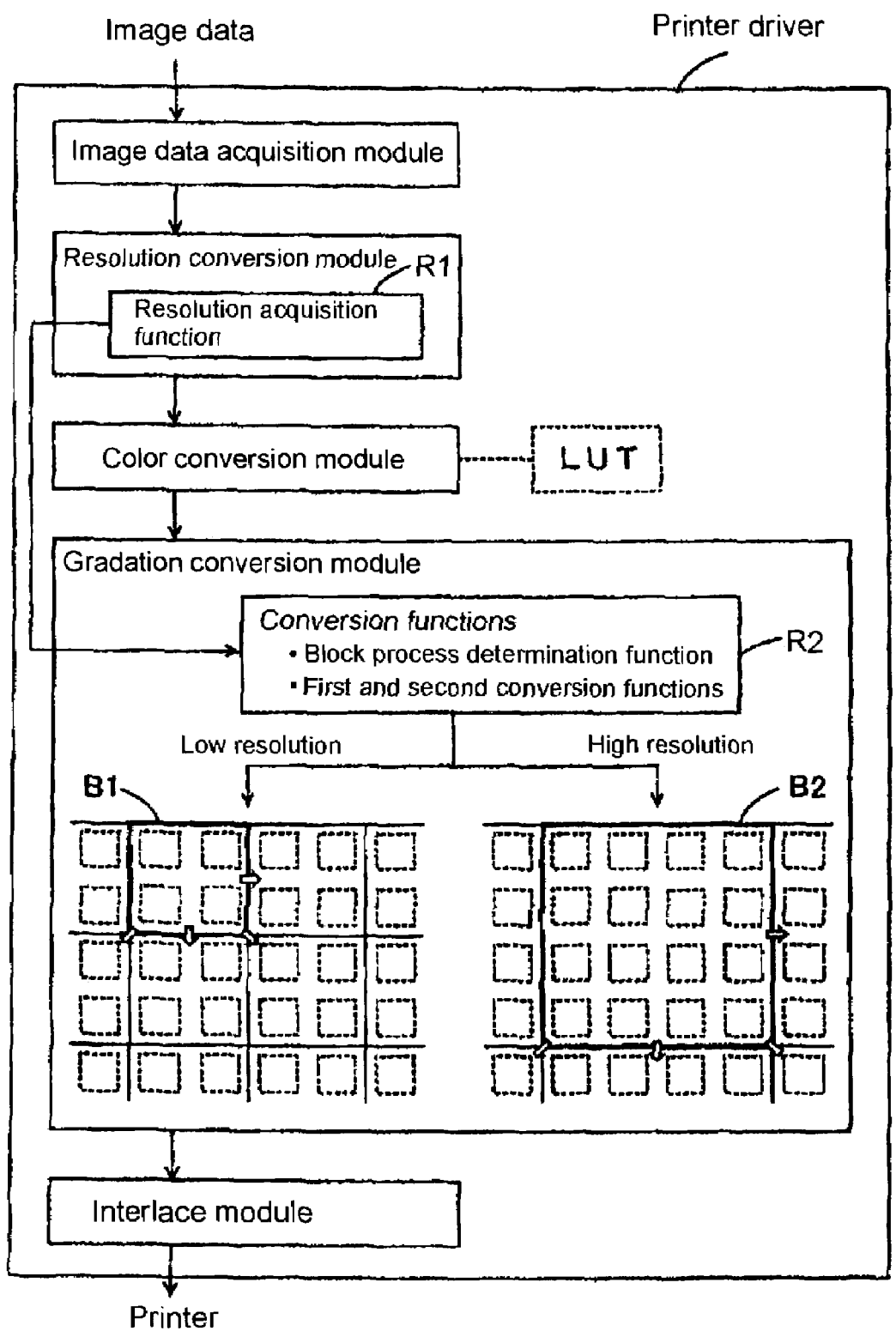
FIG. 18 schematically shows a printer driver configuration.

FIG. 18 schematically shows the printer driver configuration.

The image data processing program mainly comprises a resolution acquisition function R1 and a conversion function R2. The functions R1 and R2 allow the PC 10 to function as the resolution acquisition unit and the conversion unit according to the present invention, respectively.

The resolution acquisition function R1 is included in the resolution conversion module and obtains the resolution to be specified for the printer 20. The conversion function R2 identifies a conversion partition comprising one or more neighboring pixels corresponding to the resolution obtained by the function R1. The conversion function R2 can convert image data at a time by diffusing a gradation error for the entire target conversion partition to unconverted pixels outside the conversion partition based on a gradation value and a diffused gradation error (hereafter referred to as a diffusion error) for each pixel in the target conversion partition for image data conversion. As the obtained resolution increases, the conversion partition is configured to have an increased number of pixels. When the resolution is relatively low such as 720×360 dpi, for example, the conversion partition is configured to comprise 2×2 neighboring pixels. It is possible to convert image data in a given conversion partition B1 at a time. When the resolution is relatively low such as 1440×720 dpi, the conversion partition is configured to comprise 4×4 neighboring pixels. It is possible to convert image data in a given conversion partition B2 at a time. FIG. 18 shows the target conversion partitions B1 and B2 enclosed in thick lines.

When the resolution is relatively low, it may be preferable to form the conversion partition out of one pixel and to convert the image data correspondingly to respective target pixels.

The embodiment speeds up the image data conversion while maintaining the high image quality. When the conversion partition comprises a plurality of pixels, the image data is converted at a time in the conversion partition only if a specified block process condition becomes true in the conversion partition. If the condition is false, the image data is converted for each pixel in the conversion partition. In order to implement this process, the conversion function R2 has a block process determination function R21, and first and second conversion functions R22 and R23. The functions R21 through R23 allow the PC 10 to function as the block process determination unit, the first conversion unit, and the second conversion unit according to the present invention, respectively.

Figure 19:
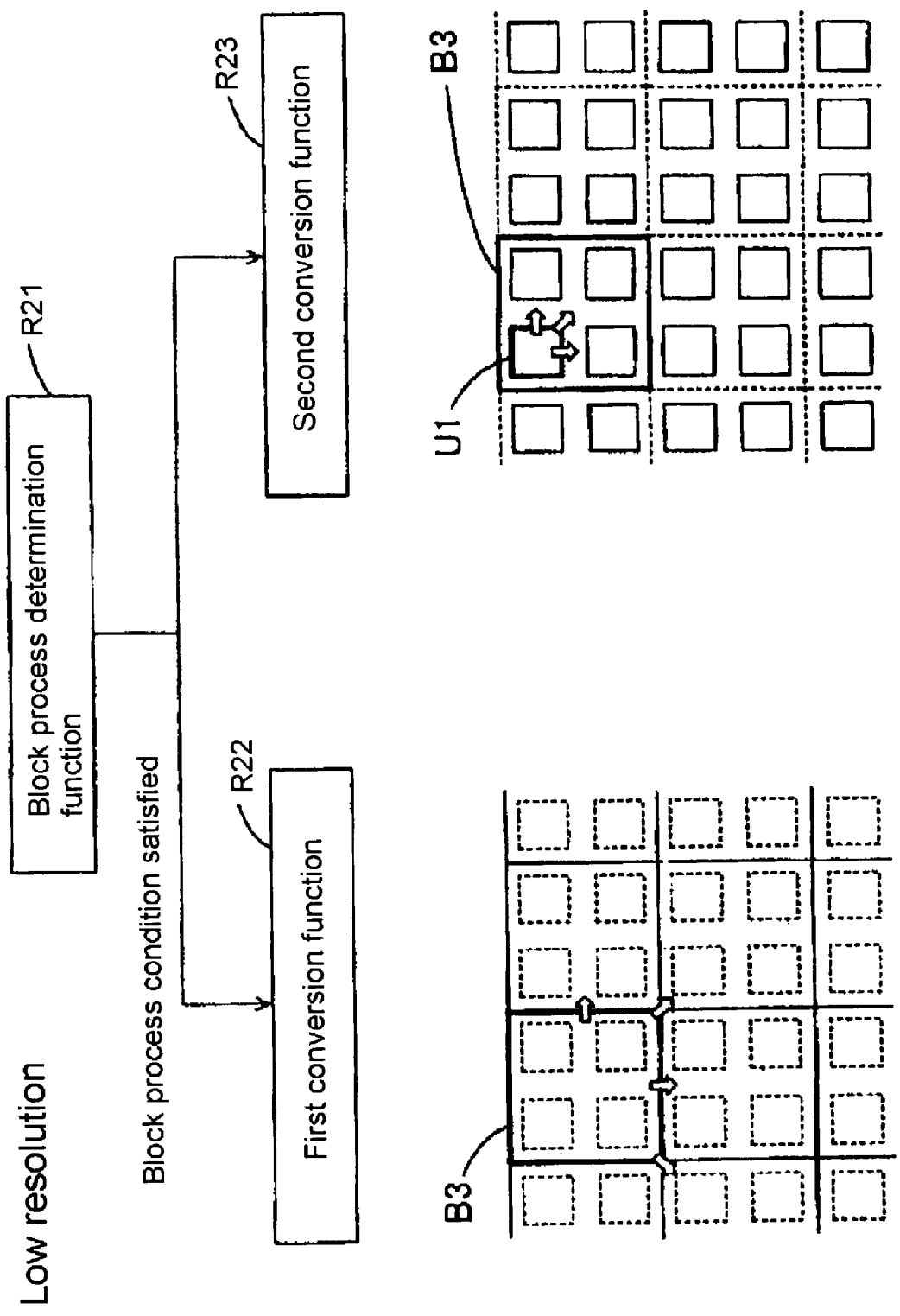
FIG. 19 schematically shows processes implemented by functions P21 through P23 at a low resolution.

At a low resolution, the block process determination function R21 identifies 2×2 pixels to be a block (conversion partition) and determines whether or not the specified block process condition is true based on a gradation value for each pixel in the target block. If the condition is determined to be true, the first conversion function R22 converts the image data for pixels in a target block B3. If the condition is determined to be false, the second conversion function R23 converts the image data for pixels in a target block B3. The first conversion function R22 diffuses a gradation error for the entire target block B3 to unconverted pixels in the other blocks outside the target block B3 based on the gradation value and diffusion error for each pixel in the target block B3 and implements a block-based image data conversion process that converts image data for pixels in the target block B3. On the other hand, the second conversion function R23 diffuses the gradation error for the pixel to the other unconverted pixels based on the gradation value and diffusion error for each pixel in the target block B3 to convert the image data for the pixels in the target block B3. That is to say, the entire block is subject to the image data conversion process in units of pixels smaller than blocks without grouping the pixels. FIG. 19 shows the target pixel U1 enclosed on a thick line in the target block B3.

Figure 20:
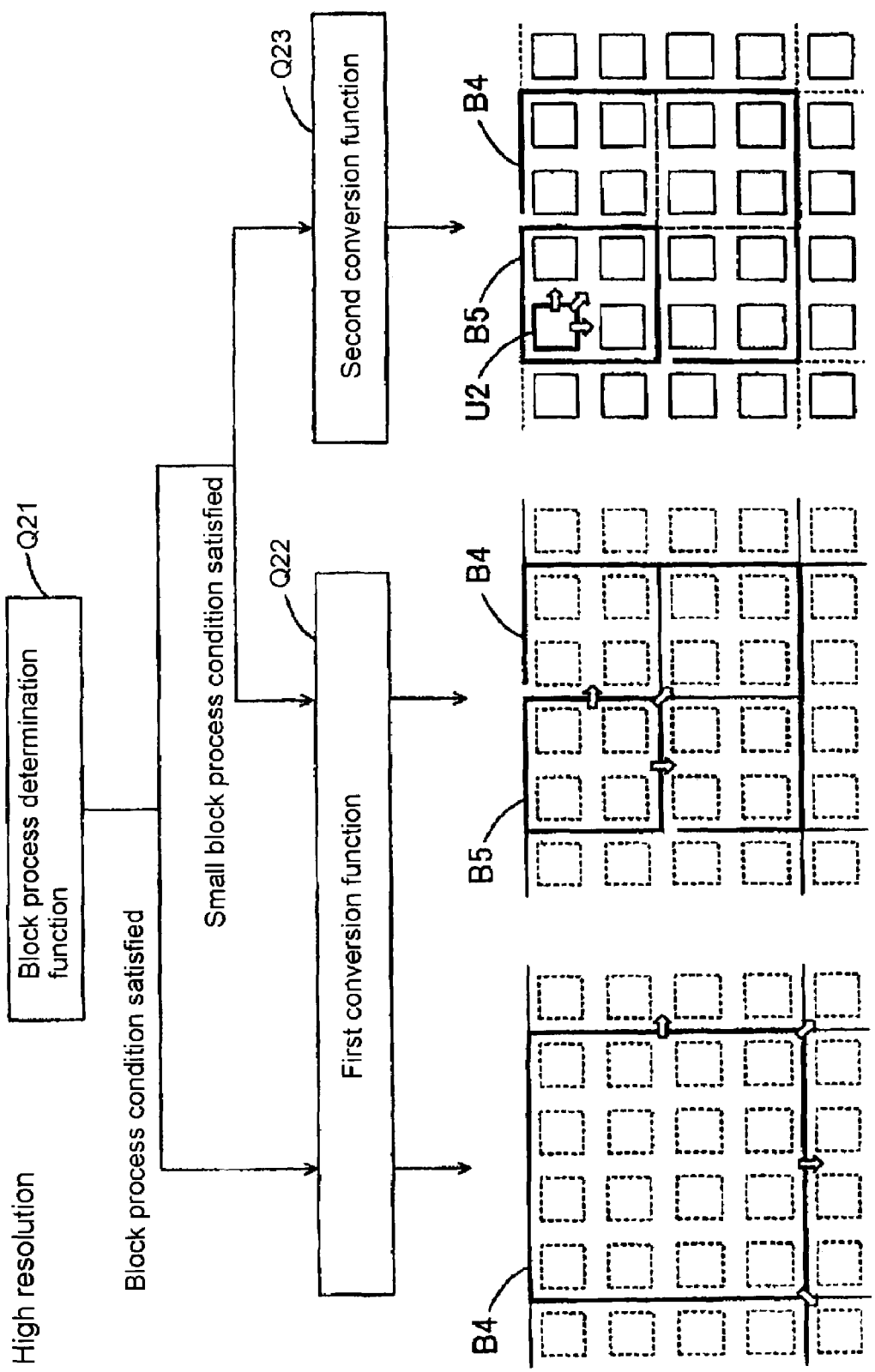
FIG. 20 schematically shows a process implemented by functions P21 through P23 at a high resolution.
Figure 21:
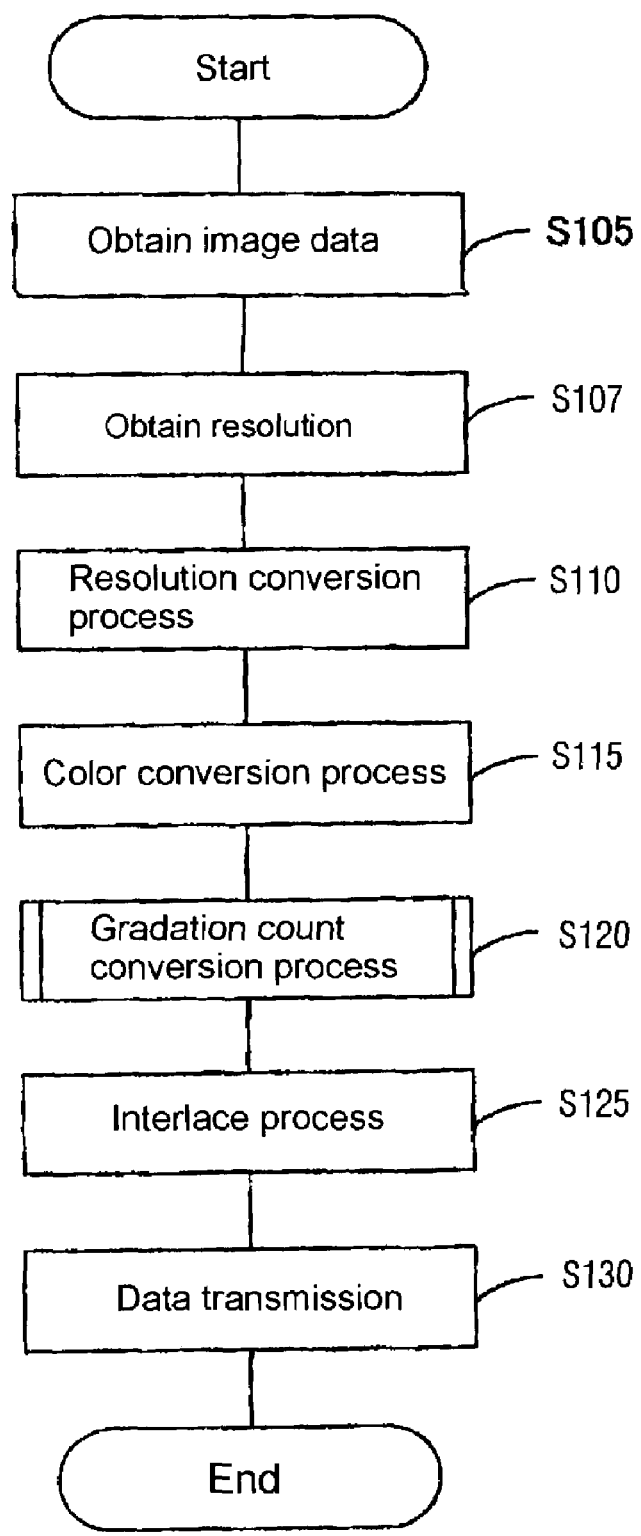
FIG. 21 is a flowchart showing a process the printer driver allows the PC to implement.

Further, the image data conversion is accelerated while maintaining the high image quality as follows. When the block process condition is false in the conversion partition, a small block is formed by dividing the pixels in the conversion partition. When a specified small block process condition becomes true in the small block, the image data can be converted at a time in the small block. FIG. 20 schematically shows a process implemented by functions P21 through P23 at a high resolution.

At a high resolution, the block process determination function R21 identifies 4×4 pixels to be a block (conversion partition) and likewise determines whether or not the specified block process condition is true. If the condition is determined to be true, the first conversion function R22 converts the image data for pixels in a target block B4. If the condition is determined to be false, the function forms a small block by dividing the target block B4 into 2×2 pixels and determines whether or not the specified small block process condition is satisfied based on the gradation value for each pixel in the target small block B5. If the condition is determined to be true, the first conversion function R22 converts the image data for pixels in the small block B5. If the condition is determined to be false, the second conversion function R23 converts the image data for pixels in the small block B5. FIG. 20 shows the target pixel U2 enclosed on a thick line in the target block B5. If the small block process condition is determined to be true, the first conversion function R22 diffuses the gradation error for the entire small block B5 to unconverted pixels outside the small block B5 based on the gradation value and diffusion error for each pixel in the small block B5 and converts the image data in units of small blocks to convert the image data for pixels in the small block B5.

Only when the resolution is 1440×720 dpi, the embodiment determines that a specified small block changeover condition is satisfied.

A small black may or may not be evenly divided in the target block.

According to the flowchart, the resolution conversion module obtains the resolution for printout on the printer 20 (S107). When the APL contains information about the resolution selection, the module determines the resolution based on that information. When the APL does not contain information about the resolution selection, the module obtains the default resolution, e.g., 720×360 dpi. The module displays a print interface screen (not shown) and accepts various selections and entries on the screen for selecting print modes and printout medium types. Corresponding to the specified selections and entries, the module can determine and obtain the resolution.

Figure 22:
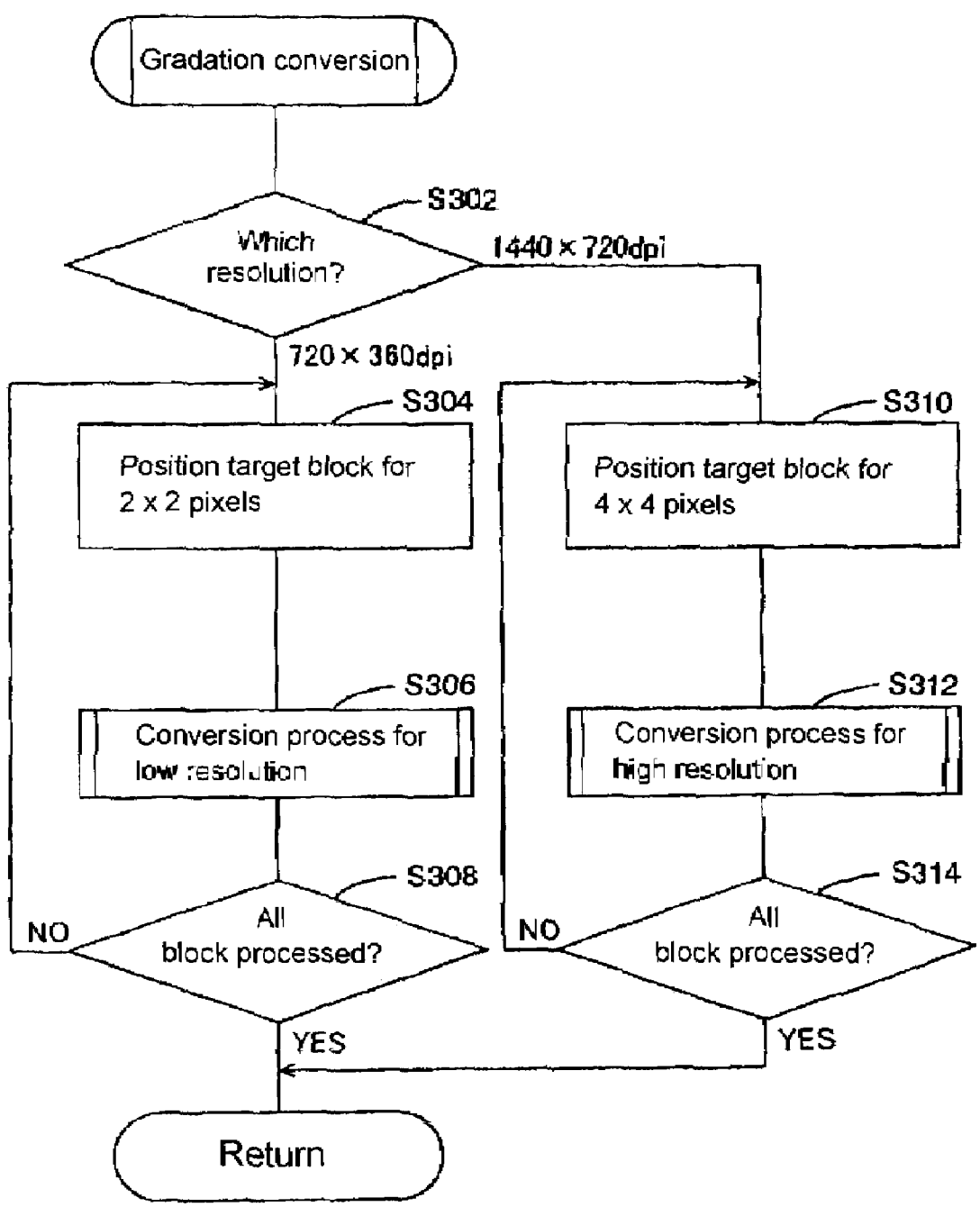
FIG. 22 is a flowchart showing a gradation count conversion process.

With reference to the flowchart in FIG. 22, the following describes a gradation count conversion process the image data processing apparatus performs. Since the image data before conversion contains CMYK-based gradation values, the flowchart in FIG. 22 should show the process for each of CMYK. However, this is omitted for ease of explanation. The RAM 13 stores not only the image data before conversion, but also an area to store gradation errors diffused from pixels and an area to store the converted image data.

Since the resolution for image printout is obtained at the above-mentioned step S107, the process branches in accordance with that resolution (S302). According to the embodiment, the process executes steps S304 through S308 for the low resolution of 720×360 dpi. The process executes steps S310 through S314 for the high resolution of 1440×720 dpi.

Figure 23:
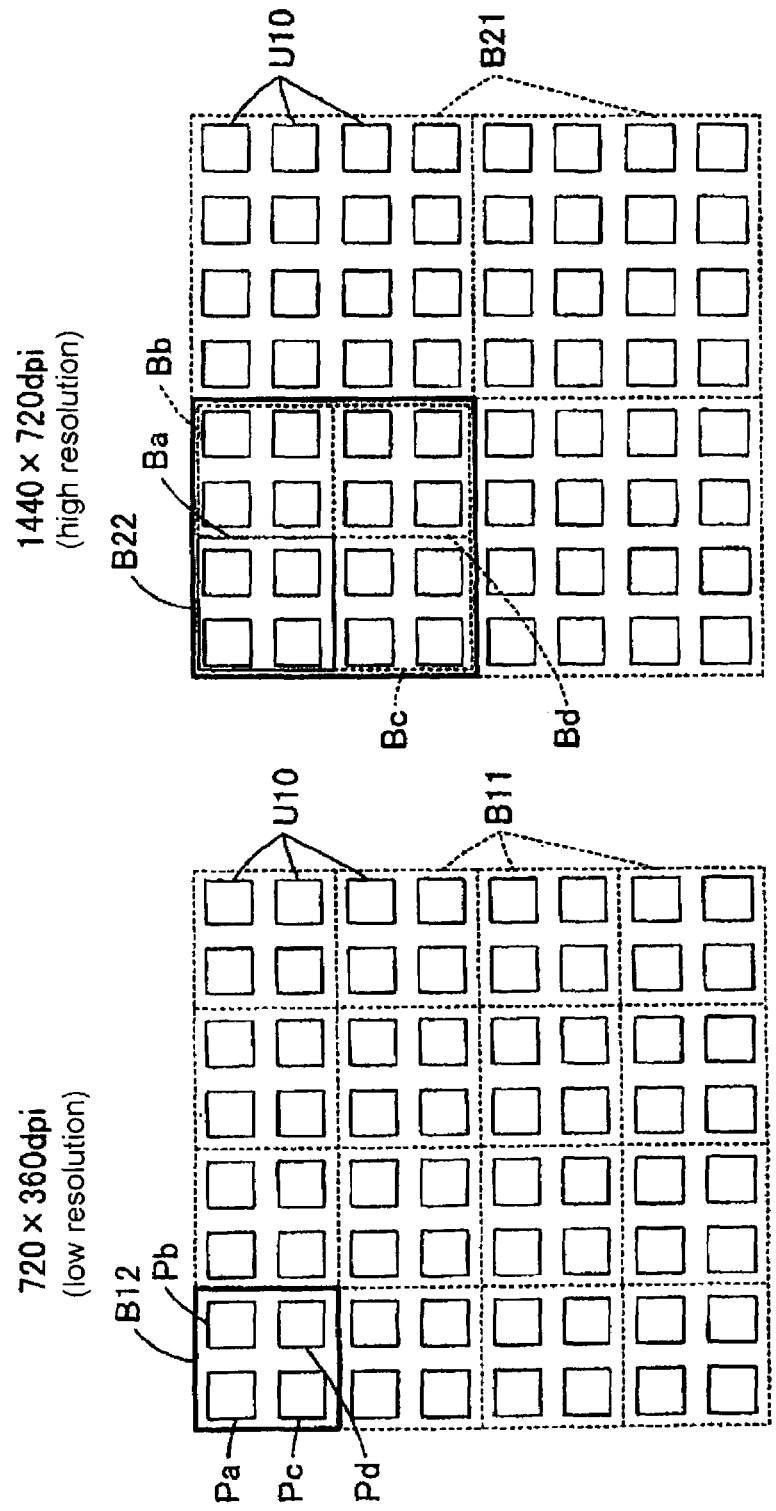
FIG. 23 schematically shows how to position a target block.

At the low resolution, a block is formed by grouping 2×2 neighboring pixels to position a target block for image data conversion. FIG. 23 schematically shows how to position the target block. The image data before conversion is CMYK data that is generated from an image represented in 256 gradations of dot matrix pixels U10. FIG. 23 illustrates each pixel U10 with a small square. It is assumed that a horizontal direction corresponds to the right and left of the figure and a vertical direction corresponds to the top and the bottom thereof. As shown on the left of FIG. 23, one block B11 is assumed to comprise four pixels, i.e., two pixels vertically and two pixels horizontally at the low resolution. In FIG. 23, the block B11 is indicated with a dotted line surrounding four pixels. The block B11 is used as a unit for converting image data. As shown with a thick line, any block B11 is defined as the target block B12. According to the embodiment, a sequence of image data conversion begins with the top left block B11 and sequentially proceeds to the top right block B11, then a row of blocks below, from the block B11 at the left end to the block B11 at the right end, then likewise a row of blocks below, from the block B11 at the left end to the block B11 at the right end, and so on. The sequence ends with the block B11 at the bottom right. Of course, the image data can be converted in any sequence.

The block configuration is not limited to two pixels horizontally by two pixels vertically but may be three pixels horizontally by three pixels vertically or a plurality of pixels arranged horizontally in a row. Further, the block may be a rectangle comprising, e.g., two pixels horizontally by four pixels vertically or a total of four pixels comprising a reference pixel, an adjacent pixel to the right, another adjacent pixel below, and yet another adjacent pixel to the bottom left.

After the target block is positioned, the error diffusion method is used to perform a conversion process for low resolution (S306) that converts the image data in the target block of 2×2 pixels. In order to prevent the image quality from degrading, the conversion process for low resolution determines whether the target block B12 is positioned in a bright area, i.e., a highlighted area with high brightness in the image, in a dark area with low brightness, or in an area with intermediate brightness. The conversion process takes place in accordance with a determination result.

After the conversion process for low resolution is performed, it is determined whether or not the conversion process is complete for all blocks in the image data (S308). If there is a block for which the conversion process is not performed, the process returns to step S304. If there is a block to the right of the previous target block, this block is assumed to indicate the position of the target block. If there is no block to the right of the previous target block, a block immediately to the lower left thereof is assumed to be the target block. The conversion process for low resolution is repeated for all blocks until the conversion process terminates.

Thereafter, the interlace process is performed at the above-mentioned step S125 to transmit the image data represented by presence or absence of dot formation to the printer 20 for printing the image at 720×360 dpi.

At the high resolution, on the other hand, a block is formed by grouping 4×4 neighboring pixels to position a target block for image data conversion. As shown on the right of FIG. 23, one block B11 is assumed to comprise 16 pixels, i.e., four pixels vertically and four pixels horizontally at the high resolution. In FIG. 23, the block B21 is indicated with a dotted line surrounding 16 pixels. The block B11 is used as a unit for converting image data. As shown with a thick line, any block B21 is defined as the target block B22. A sequence of image data conversion begins with the top left block B21 and ends up with the block B11 at the right end in the same manner as for the block B11 comprising 2×2 pixels. The sequence may differ from that for the block B11 comprising 2×2 pixels.

As the printout resolution increases, the embodiment increases the number of pixels in the block as a conversion partition. For this purpose, the number of pixels in the block is determined in proportion to the resolution. When an image is printed at 1440×720 dpi, for example, the number of dots per unit area becomes four times greater than the resolution of 720×360 dpi. Accordingly, the number of pixels becomes 4×4=16. This is just an example, namely setting the number of pixels in the block to a value in proportion to the resolution. The block may comprise 3×3 or 5×5 pixels at the resolution of 1440×720 dpi.

After the target block is positioned, the error diffusion method is used to perform a conversion process for high resolution (S312) that converts the image data in the target block of 4×4 pixels. The conversion process for high resolution also determines whether the target block is positioned in a highlighted area in the image, in a dark area, or in an area with intermediate brightness. In addition, the process determines whether the target block in the intermediate area is positioned at the center, to the highlighted side, or to the dark side. The conversion process takes place in accordance with a determination result. When the target block is positioned in an area with the intermediate brightness, the small block process condition is assumed to be true. Pixels in the target block are divided to form small blocks. FIG. 23 exemplifies small blocks Ba through Bd each comprising 2×2 pixels. The image data is converted in a targeted small block (hereafter referred to as a small target block) comprising 2×2 pixels. A specified small block changeover condition is determined to be true only at the high resolution. The process determines whether or not the small block process condition is satisfied and changes the block size accordingly to convert the image data.

After the conversion process for high resolution is performed, it is determined whether or not the conversion process is complete for all blocks in the image data (S314) like the conversion process for low resolution. If there is an unconverted block, a new target block is specified. The conversion process for high resolution is repeated for all blocks until the conversion process terminates. Thereafter, the interlace process is performed at the above-mentioned step S125 to transmit the image data represented by presence or absence of dot formation to the printer 20 for printing the image at 1440×720 dpi.

(4) Fourth Embodiment

The fourth embodiment of the present invention will now be described. The description about the same portions as in the first through third embodiments uses the same reference numerals and figures.

Figure 24:
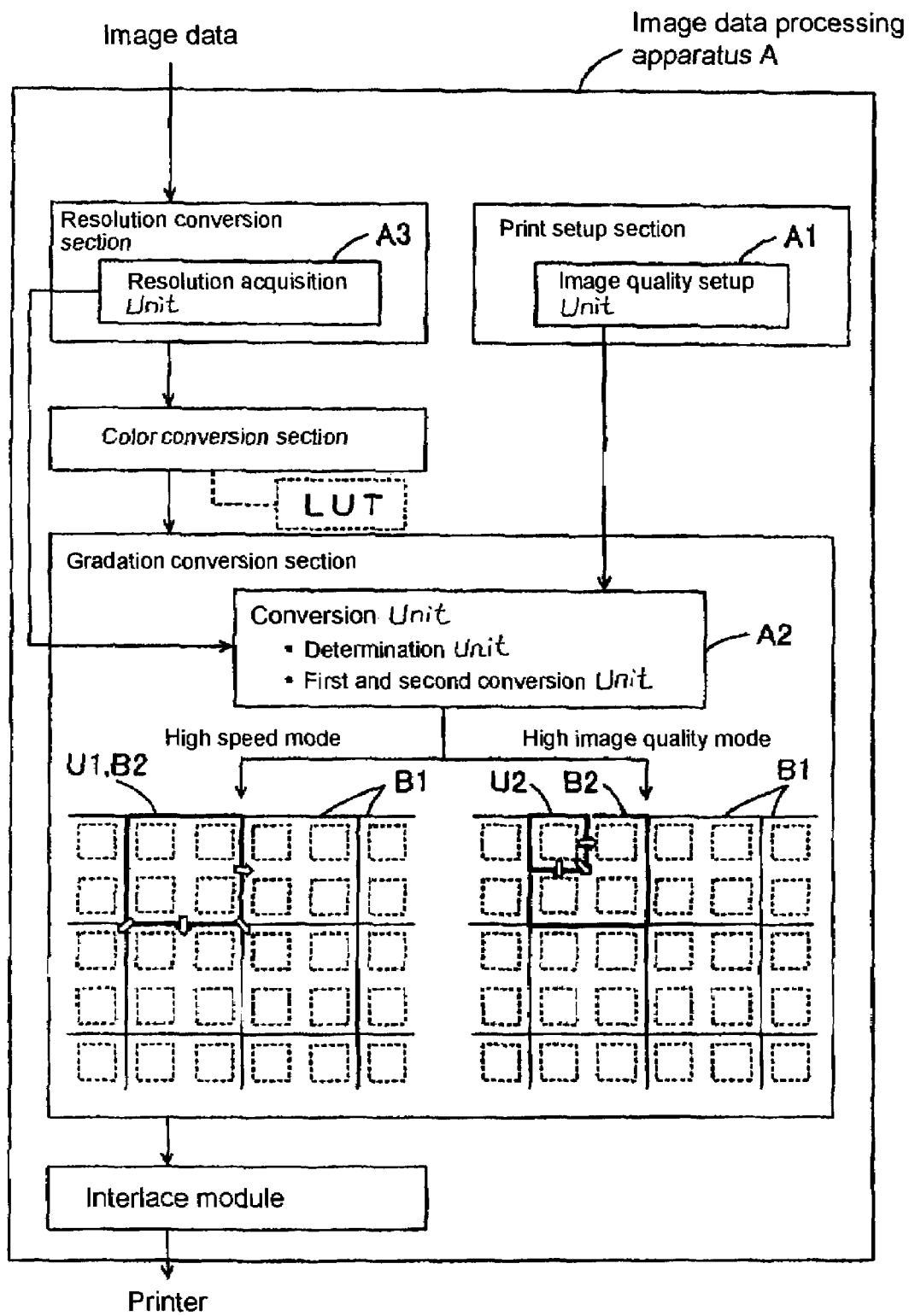
FIG. 24 schematically shows a configuration of the image data processing apparatus.

FIG. 24 schematically shows a configuration of the image data processing apparatus comprising the hardware and the printer driver in cooperation with each other as mentioned above. The printer driver has various modules and can convert image data with cooperative operations while implementing specified functions under control of the function control module (not shown). Each part of the image data processing apparatus is configured correspondingly to each module of the printer driver.

The resolution conversion section is supplied with image data and converts the image data in accordance with the resolution of the printer 20. Image data to be supplied is generated from an image represented in multiple gradations of dot matrix pixels and is available in various types. For example, the image data may comprise RGB defined in the SRGB color space or may comprise brightness (Y component), B color difference (U component), and R color difference (V component) in the YUV color system. Each component of the image data may be set to any number of gradations such as 256 or 1024 gradations. According to definitions of sRGB, the YUV color system, and the like, the image data is converted into RGB data comprising gradation data of 256 gradations (integers 0 to 255) for each of RGB in the wide RGB color space. Based on this image data, a color conversion section, the gradation count conversion process, and an interlace process section convert the image data into CMYK image data for output to the printer 20 and send the converted image data to the printer 20. Based on the converted image data, the printer 20 forms dots of color ink on printout paper (medium) to print a color image.

An image data processing apparatus A has print A1 through A3.

The image quality setup unit A1 is included in a print setup module and accepts input of the image quality setup information about image quality setting of an image to be output to the printer 20. The image data processing apparatus is provided with four print modes: an ultra-high quality mode, a high quality mode, a normal mode, and a high speed mode corresponding to resolutions. The image quality setup unit A1 accepts an operation input for selecting a print mode and supplies parameters representing that print mode as the image quality setup information. Accordingly, a user of the image data processing apparatus can select the image quality of an image to be output to the printer 20 by entering a print mode selection from the PC 10.

The resolution acquisition unit A3 is included in the resolution conversion module and obtains the resolution to be set for the printer 20.

The conversion unit A2 composes a conversion partition from one or more neighboring pixels in accordance with the image quality setup information supplied by the image quality setup unit A1. The conversion unit A2 diffuses a gradation error for the entire target conversion partition to unconverted pixels outside the conversion partition based on a gradation value (hereafter also referred to as a conversion partition gradation value) and a diffusion error for each pixel in the target conversion partition for image data conversion and converts the image data at a time. The example in FIG. 24 shows a conversion partition U1 comprising 2×2 pixels when the high speed mode is selected; and a conversion partition U2 comprising one pixel when the high quality mode is selected. In this case, the high speed mode provides a larger conversion partition size than the high quality mode, speeding up the image data conversion.

The conversion partition is configured to be made of a specified number of neighboring pixels corresponding to the CMYK color depth.

Figure 25:
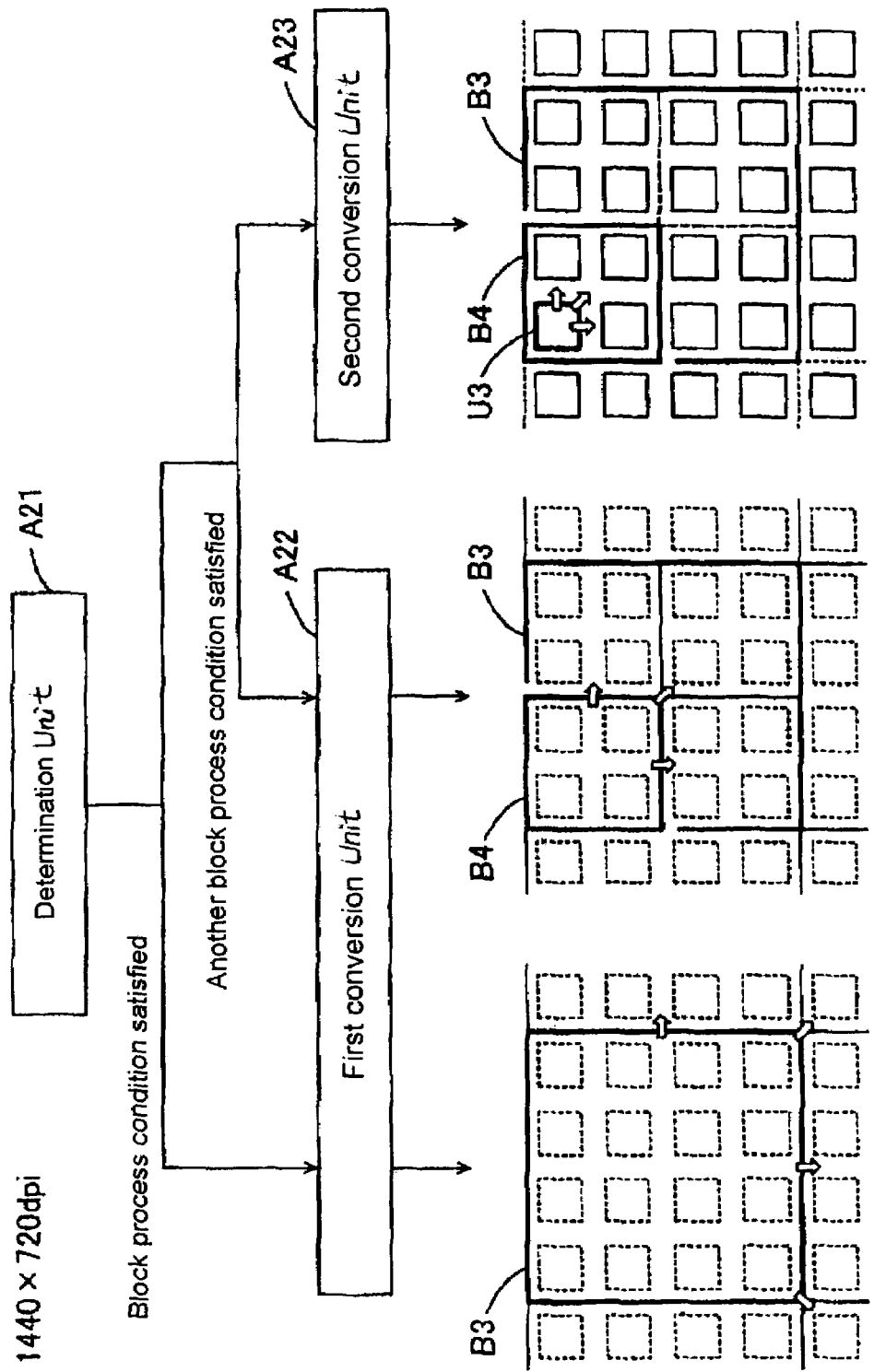
FIG. 25 schematically shows a configuration of a conversion unit.

Further, in order to accelerate the conversion while maintaining the high image quality, the conversion unit A2 forms a block (block B1 in the example) comprising two or more neighboring pixels according to the resolution. Only when a specified block process condition is satisfied in a target block (block B2 in the example) for image data conversion, the conversion unit A2 converts the image data at a time in that block. When the specified block process condition is not satisfied, the conversion unit A2 converts the image data for each pixel partition comprising a set of pixels in the block. In order to implement this process, the conversion unit A2 has print A21 through A23 as shown in FIG. 25.

The determination unit A21 forms a block comprising two or more neighboring pixels according to the resolution obtained by the resolution acquisition unit A3. The determination unit A21 determines whether or not the block process condition is true based on the gradation value of the target block B3 for image data conversion. The example in FIG. 25 shows the conversion partition when the resolution is set to 1440×720 dpi. The target block B3 is configured to comprise 4×4 pixels. As the obtained resolution increases, the block is configured to have an increased number of pixels. When the resolution is relatively low, e.g., 720×360 dpi, the block is configured to comprise 2×2 neighboring pixels. When the resolution is relatively high, e.g., 2880×1440 dpi, the block is configured to comprise 8×8 neighboring pixels. When the resolution is low, the conversion partition may comprise only one pixel. Image data for the target pixel may be converted in units of pixels.

When the block process condition is determined to be true, the first conversion unit A22 uses the target block B3 as the target conversion partition. The first conversion unit A22 diffuses a gradation error for the entire target block B3 to unconverted pixels outside the target block B3 and performs a block-based conversion process to convert the image data for the entire target block B3. When the block process condition is not determined to be true, the second conversion unit A23 uses a pixel partition U3 as the conversion partition. The pixel partition U3 is smaller than the block formed by dividing pixels in the target block B3. The second conversion unit A23 can diffuse a gradation error for the pixel partition U3 to the other unconverted pixels based on a gradation value and a diffusion error for each pixel in the pixel partition U3 and convert the image data for pixels in the target block B3. According to the embodiment, the pixel partition U3 comprises one pixel. That is to say, a pixel-based conversion process is performed.

Further, in order to accelerate the conversion while maintaining the high image quality, the determination unit A21 further divides pixels in the target block B3 into small blocks out of which the target block B4 is determined for image data conversion. Based on the gradation value of the target block B4, the determination unit A21 determines whether or not a specified small block process condition (another block process condition) becomes true. When the resolution is 1440×720 dpi, the target block B3 of 4×4 pixels is divided into small blocks of 2×2 pixels. When the small block process condition is determined to be true, the first conversion unit A22 uses the target block B4 as the target conversion partition and converts the image data for the entire target block B4. When the small block process condition is not determined to be true, the second conversion unit A23 diffuses a gradation error for the pixel partition U3 to the other unconverted pixels based on a gradation value and a diffusion error for each pixel partition U3 and converts the image data for the target block B4.

A small black in the block may or may not be evenly divided.

Figure 26:
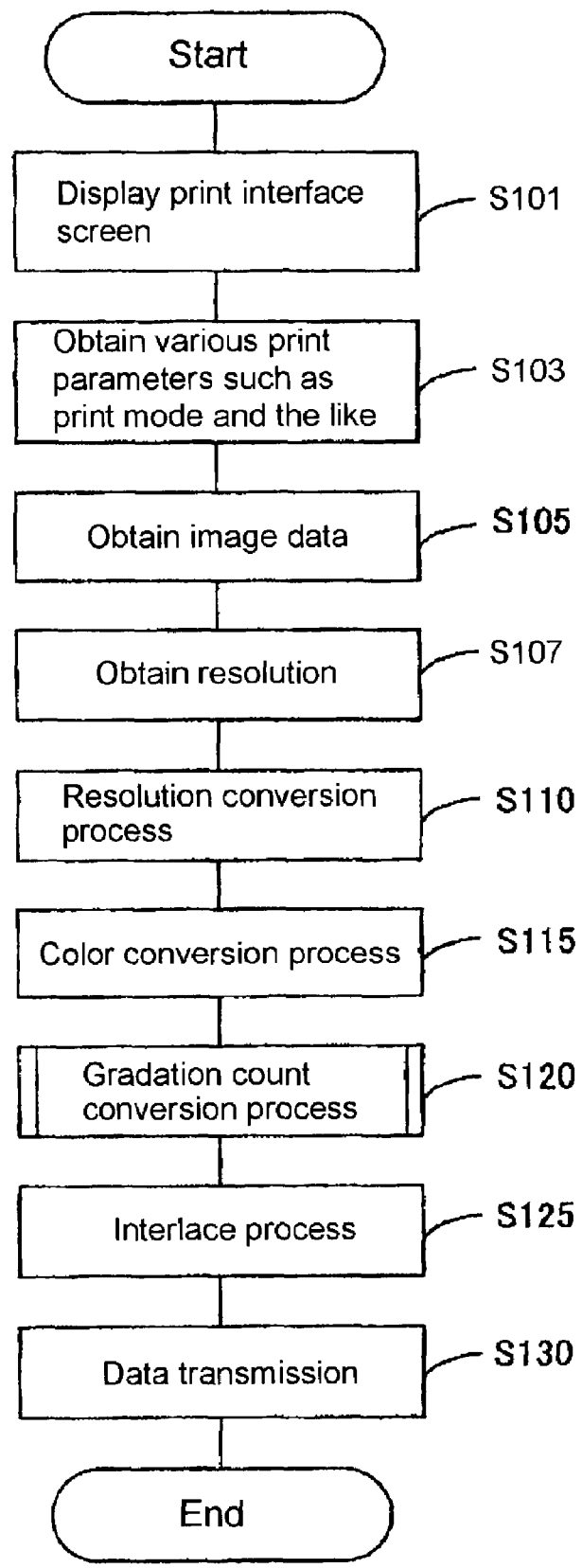
FIG. 26 is a flowchart showing a process the image data processing apparatus performs.

FIG. 26 is a flowchart showing a process the image data processing apparatus performs. The CPU 11 of the PC 10 executes this process flow.

Figure 27:
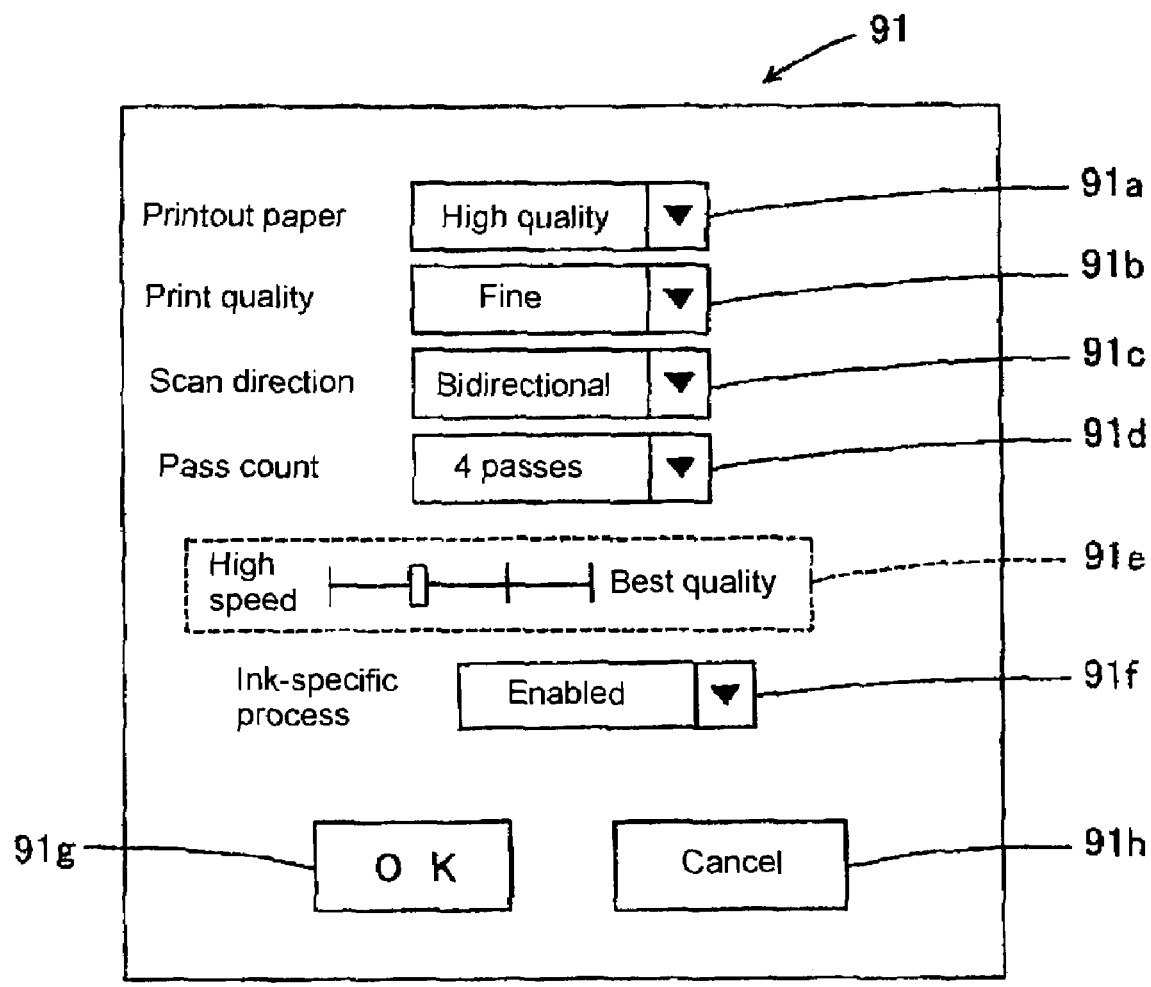
FIG. 27 shows an area on a print interface screen.

The APL has an APL-specific print function. When the APL-specific print function selects a print menu displayed on the display 17a, the image data processing program starts to display the print interface screen (step S101). FIG. 27 shows an area 91 on the print interface screen. The area 91 is provided with various selection fields 91a through 91f and buttons 91g and 91h.

The printout paper selection field 91a allows the selection of media types such as normal paper and high quality paper, e.g., through the use of a mouse 16b. The print quality selection field 91b allows the selection of image printout qualities such as photo and fine. The scan direction selection field 91c allows the selection of whether a dot should be formed unidirectionally or bidirectionally during horizontal scanning of a print head. The pass count selection field 91d allows the selection of the number of scans to form a line of dots in the horizontal scanning direction.

The scan direction selection field 91e allows the selection of any of print modes through the use of the mouse 16b. In FIG. 27, there are four levels of print modes ranging from the high speed mode at the left end and to the best quality mode at the right end. After the above-mentioned selection fields 91a through 91d are selected, the program performs a process to determine a recommended print mode and displays the level of the selected print mode.

The ink-specific process selection field 91f allows the selection of whether or not to change the image data conversion according to ink colors. More specifically, the ink-specific process selection field 91f allows the selection of YES or NO. When YES is selected, the number of pixels is increased for only the Y conversion partition among the other colors of conversion partitions.

When the OK button 91g is clicked with the mouse 16b, the program obtains various print parameters such as print modes from the selection fields (S103). Since the parameter representing the print mode provides the image quality setup information, the process at steps S101 through S103 constitutes the image quality setup unit that accepts input of the image quality setup information.

The program obtains the image data thereafter (S105). When the data includes information about selection of the resolution for image printout, the program also obtains that information.

The resolution conversion section then obtains the resolution for print out on the printer 20 (S107). At this time, when the APL contains information about the resolution selection, the resolution conversion section determines the resolution based on that information. When the APL does not contain information about the resolution selection, the resolution conversion section selects the default resolution (e.g., 720×360 dpi). It may be preferable to determine the resolution according to the contents selected on the print interface screen. Along with the process at steps S101 through S103, the process at S107 constitutes there solution acquisition unit for obtaining the resolution specified for the printer.

Thereafter, the program performs a resolution conversion process (S110) to convert the obtained image data resolution into the resolution for printout on the printer 20.

Figure 28:
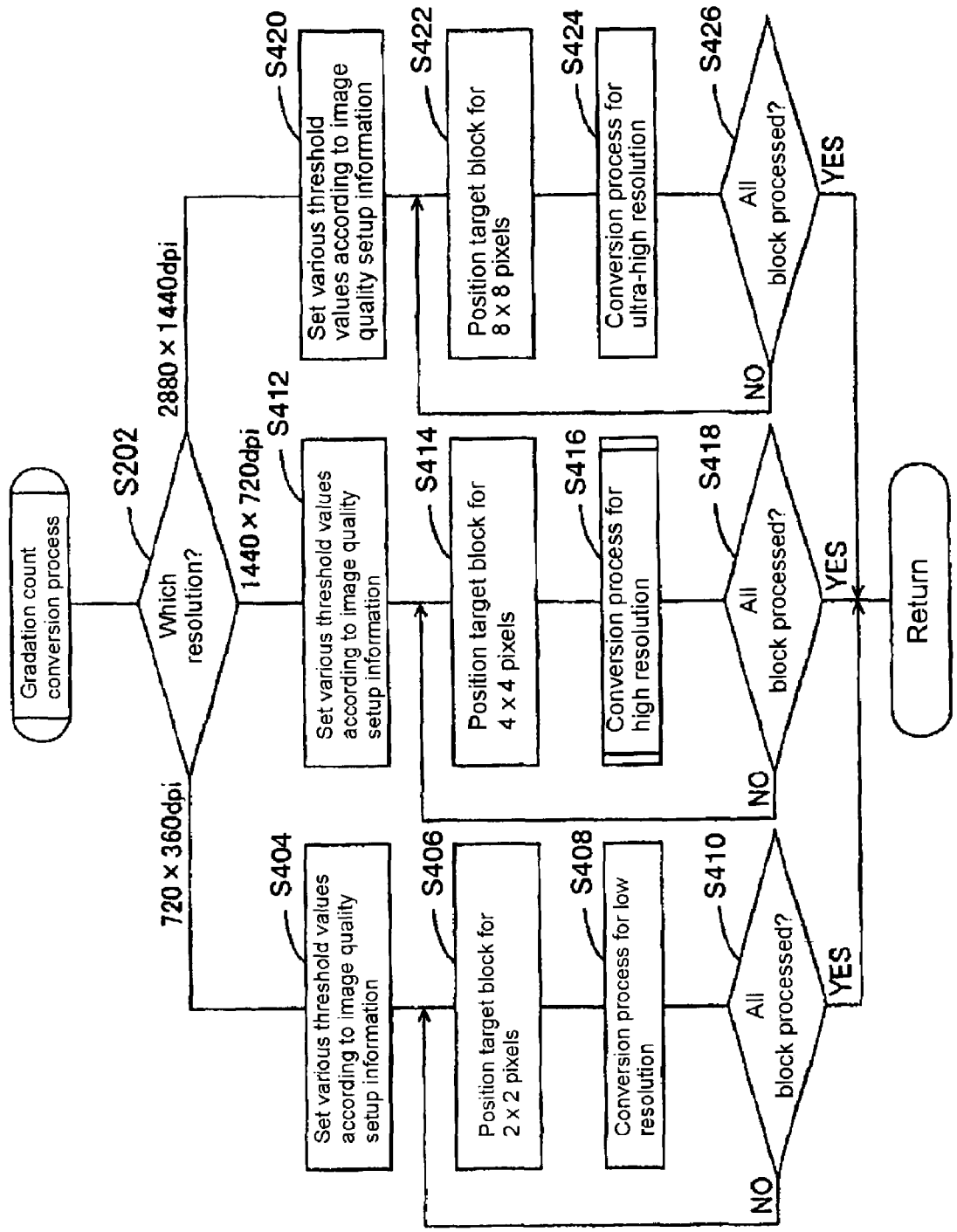
FIG. 28 is a flowchart showing a gradation count conversion process.

Referring now to the flowchart in FIG. 28, the following describes the gradation count conversion process the image data processing apparatus performs. Since the image data before conversion contains CMYK-based gradation values, the flowchart in FIG. 22 should show the process for each of CMYK. However, this is omitted for ease of explanation. The RAM 13 stores not only the image data before conversion, but also an area to store gradation errors diffused from pixels and an area to store the converted image data.

First, the process branches in accordance with the resolution obtained at S107 (S402). According to the embodiment, the process advances to S404 at the low resolution of 720×360 dpi, to S412 at the high resolution of 1440×720 dpi, and to S420 at the ultra-high resolution of 2880×1440 dpi.

At the beginning of each process after the branch, the process sets the corresponding threshold value (S404, S412, and S420) for determining the conversion partition in accordance with the image quality setup information entered at S103. As will be discussed in more detail below, the process references a low resolution threshold value table T1 at the low resolution as shown in FIG. 29; a high resolution threshold value table T2 at the high resolution; and an ultra-high resolution threshold value table T3 at the ultra-high resolution. In this manner, the process sets a plurality of threshold values corresponding to the parameters representing the print modes as the image quality setup information. When the ink-specific process is selected on the print interface screen, the process references yellow data indicated with a dotted line in FIG. 29 to set the threshold value only for the Y image data. The yellow data is omitted from the tables T2 and T3.

Figure 30:
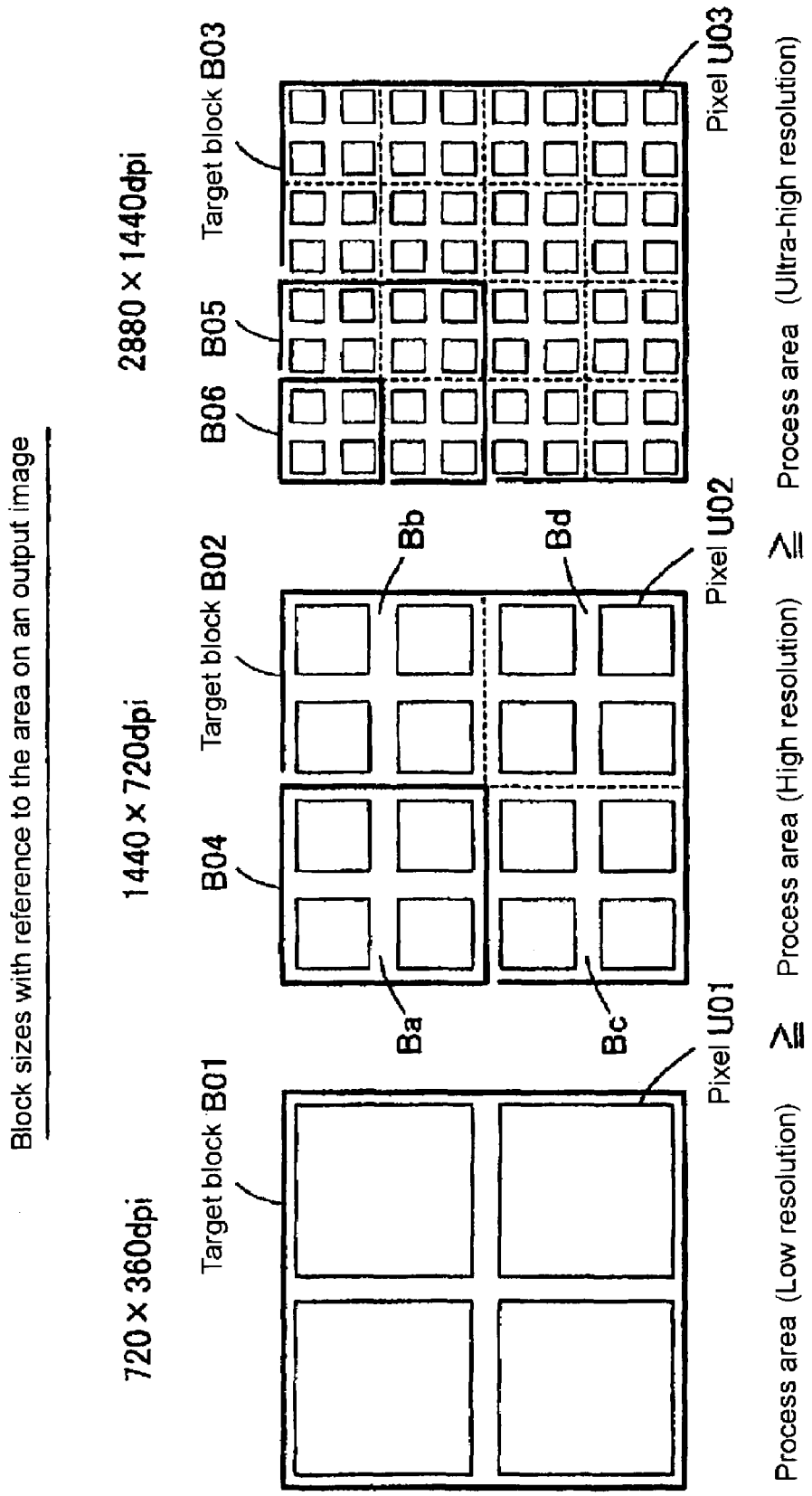
FIG. 30 schematically shows target blocks.

The process defines a block by grouping 2×2 neighboring pixels at the low resolution, by grouping 4×4 neighboring pixels at the high resolution, and by grouping 8×8 neighboring pixels at the ultra-high resolution to position target blocks for image data conversion (S406, S414, and S422). FIG. 30 schematically shows the target blocks. Though the horizontal resolution is twice as high as the vertical resolution, FIG. 30 depicts pixels U101 through U03 square. The pixels U101 through U03 and target blocks B01 through B03 are diagramed so that output images provide the same area at different resolutions. That is to say, the 1-pixel area at the high resolution is a quarter of the 1-pixel area at the low resolution. The 1-pixel area at the ultra-high resolution is one sixteenth of the 1-pixel area at the low resolution.

The image data before conversion is CMYK data that is generated from an image represented in 256 gradations of dot matrix pixels U01 through U03. All pixels are set to the same size as that of the target blocks B01 through B03. Any one of these blocks is defined as the target block. The entire block or each block is further divided into small blocks. The error diffusion method is then used for conversion on the basis of a small block or a pixel. According to the embodiment, many blocks that divide many pixels are arranged in units of target blocks B01 through B03 (FIG. 30) vertically and horizontally. A sequence of image data conversion begins with the top left block and sequentially proceeds to the top right block, then a row of blocks below, from the block at the left end to the block at the right end, and so on. The sequence ends with the block at the bottom right. Of course, the conversion process can follow any sequence and can be changed according to resolutions.

As the printout resolution increases, the embodiment increases the number of pixels in the block. It is assumed that a horizontal direction corresponds to the right and left of the figure and a vertical direction corresponds to the top and the bottom thereof. One block comprises two pixels horizontally by two pixels vertically, i.e., four pixels in total at 720×360 dpi; four pixels horizontally by four pixels vertically, i.e., 16 pixels in total at 1440×720 dpi; and eight pixels horizontally by eight pixels vertically, i.e., 64 pixels in total at 2880×1440 dpi. Accordingly, the number of pixels in the block is configured to be in proportion to the resolution. In addition to this configuration, of course, the block may comprise 3×3 or 5×5 pixels at 1440×720 dpi. The block configuration is not limited to the number of pixels arranged vertically and horizontally. For example, the block may comprise a plurality of pixels arranged horizontally in a row. The block may be a rectangle comprising, e.g., two pixels horizontally by four pixels vertically. Further, the block may comprise a total of four pixels comprising a reference pixel, an adjacent pixel to the right, another adjacent pixel below, and yet another adjacent pixel to the bottom left.

After the target block is positioned, the error diffusion method is used to perform a conversion process for low resolution in the target block of 2×2 pixels (S408), a conversion process for high resolution in the target block of 4×4 pixels (S416), or a conversion process for ultra-high resolution in the target block of 8×8 pixels (S424).

As will be discussed in more detail below, in order to prevent the image quality from degrading, the conversion process for low resolution determines whether the target block B12 is positioned in a bright area, i.e., a highlighted area with high brightness in the image, in a dark area with low brightness, or in an area with intermediate brightness. The conversion process takes place in accordance with a determination result. At the low resolution, for example, the error diffusion method is used to perform the conversion process on the basis of the entire target block B01 comprising 2×2 pixels or each pixel U01. At the high resolution, the conversion process is performed on the basis of the entire target block B02 comprising 4×4 pixels, the block B04 comprising 2×2 pixels in the target block B02, or each pixel U02. At the ultra-high resolution, the conversion process is performed on the basis of the entire target block B03 comprising 8×8 pixels, the block B05 comprising 4×4 pixels in the target block B03, the block B06 comprising 2×2 pixels in the target block B05, or each pixel U03.

After the resolution-based conversion process is performed, it is determined whether or not the conversion process terminates for all blocks of the image data (S410, S418, and S426). When there is a block that is not subject to the conversion process, the process returns to S406 at the low resolution, to S414 at the high resolution, or to S422 at the ultra-high resolution. When there is a block to the right of the previous target block, that block is positioned to be the target block. When there is no block to the right of the previous target block, a block at the bottom left is positioned to be the target block. The resolution-based conversion process is repeated until all the blocks are converted.

Thereafter, the interlace process is performed at S125 to transmit the image data represented by presence or absence of dot formation to the printer 20 for printing the image at the specified resolution.

Figure 31:
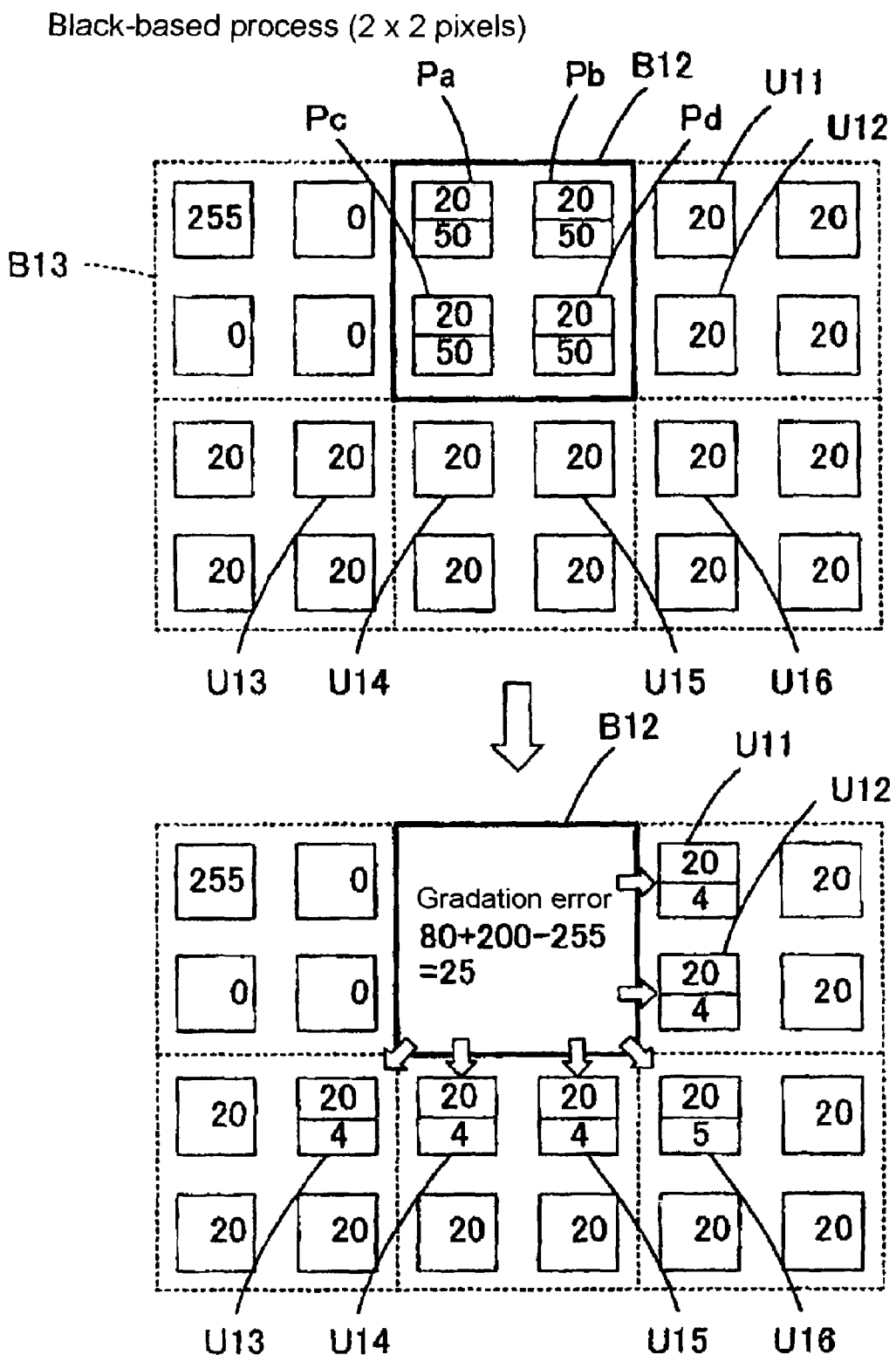
FIG. 31 explains how image data is converted while an error is diffused in units of 2×2 pixels.

FIG. 31 explains how image data is converted by diffusing an error in units of blocks comprising 2×2 pixels. The converted image data is stored in a specified area of the RAM 13. For ease of explanation, the converted image data represents a pixel for which the conversion process is complete.

The upper part of FIG. 31 shows that the image data conversion process accompanied by the error diffusion is complete up to a block B13 to the left of the target block B12. The example of FIG. 31 assumes that the target block B12 is a high-brightness area in the image. Each of the pixels Pa through Pd in the target block B12 stores gradation value 20 (described in the upper half of each pixel). Gradation error 50 (described in the lower half of each pixel) is diffused from the other blocks. As a process example, the block process condition is assumed to be true when the sum S1 of gradation values for the pixels Pa through Pd is smaller than or equal to the threshold value 100. It is assumed that a dot is formed for only one pixel in the target block B12 when the total sum of gradation values and diffusion errors for the target block B12 is greater than 150. Of course, the threshold can be set to any values.

The block process condition becomes true since the sum S1 of gradation values is 80. The sum of diffusion errors for the pixels is 200. The total sum of gradation values and diffusion errors is 80+200=280. Therefore, a dot is formed for only one pixel in the target block B12. As indicated with the block B13 at the left end, the embodiment forms a dot at the pixel Pa at the upper left of the target block B12. The gradation value for the pixel Pa is set to 255. The image data for the remaining pixels Pb through Pd is set to 0. In this manner, the conversion process is simplified by forming a dot only for the pixel at a specified position in the target block, speeding up the image data conversion. When a dot is to be formed only for one pixel, the dot may be formed for any of the pixels Pb through Pd. It may be preferable to form a dot by selecting a pixel having the largest gradation value in the target block or randomly selecting a pixel therefrom.

A gradation error for the entire target block is found by subtracting the sum of gradation values in the target block B12 after the image data conversion from the sum of gradation values and diffusion errors in the target block B12. The example in FIG. 31 shows 280 as the sum of gradation values and diffusion errors in the target block B12. Therefore, the gradation error results in 25 by subtracting the sum 255 of gradation values in the target block B12 after conversion from that result 280. The gradation error for the entire target block is diffused to unconverted pixels in the other blocks. FIG. 31 shows that the gradation error is diffused to six unconverted pixels U11 through U16 adjacent to the target block B12. Pixels are already converted in the blocks at the upper left, at the top, and at the left of the target block. The gradation error is not diffused to these pixels.

The gradation error is almost evenly diffused to unconverted pixels in the other blocks. According to the above-mentioned example, the gradation error for the entire target block B12 is 25. Since there are six unconverted pixels in the other blocks, 25 is divided by 6 to yield 4 by rounding for diffusion to the unconverted pixels. If an aliquant part of the gradation error is 6, the process adjusts the gradation error to be diffused to the unconverted pixel U16 so that a match is made between the sum of gradation errors diffused to the unconverted pixels U11 through U16 and the gradation error for the entire target block B12. As a result, gradation error 5 is diffused to the unconverted pixel U16.

There are available various techniques for diffusing the gradation error to unconverted pixels in the other blocks. For example, it maybe preferable to diffuse the gradation error for the entire target block to only one pixel in the block to the right, lower left, bottom, or lower right of the target block. Further, it may be preferable to diffuse the gradation error to an unconverted pixel not adjacent to the target block. Moreover, it may be preferable to vary the rate of diffusing the gradation error in accordance with the position of an unconverted pixel.

In this manner, image data can be converted at a time by diffusing the gradation error in units of blocks each comprising not only 2×2 pixels, but also 4×4 pixels or 8×8 pixels. The same principle can be applied to convert image data in units of blocks even when the target block B12 is a low-brightness area in the image.

Figure 32:
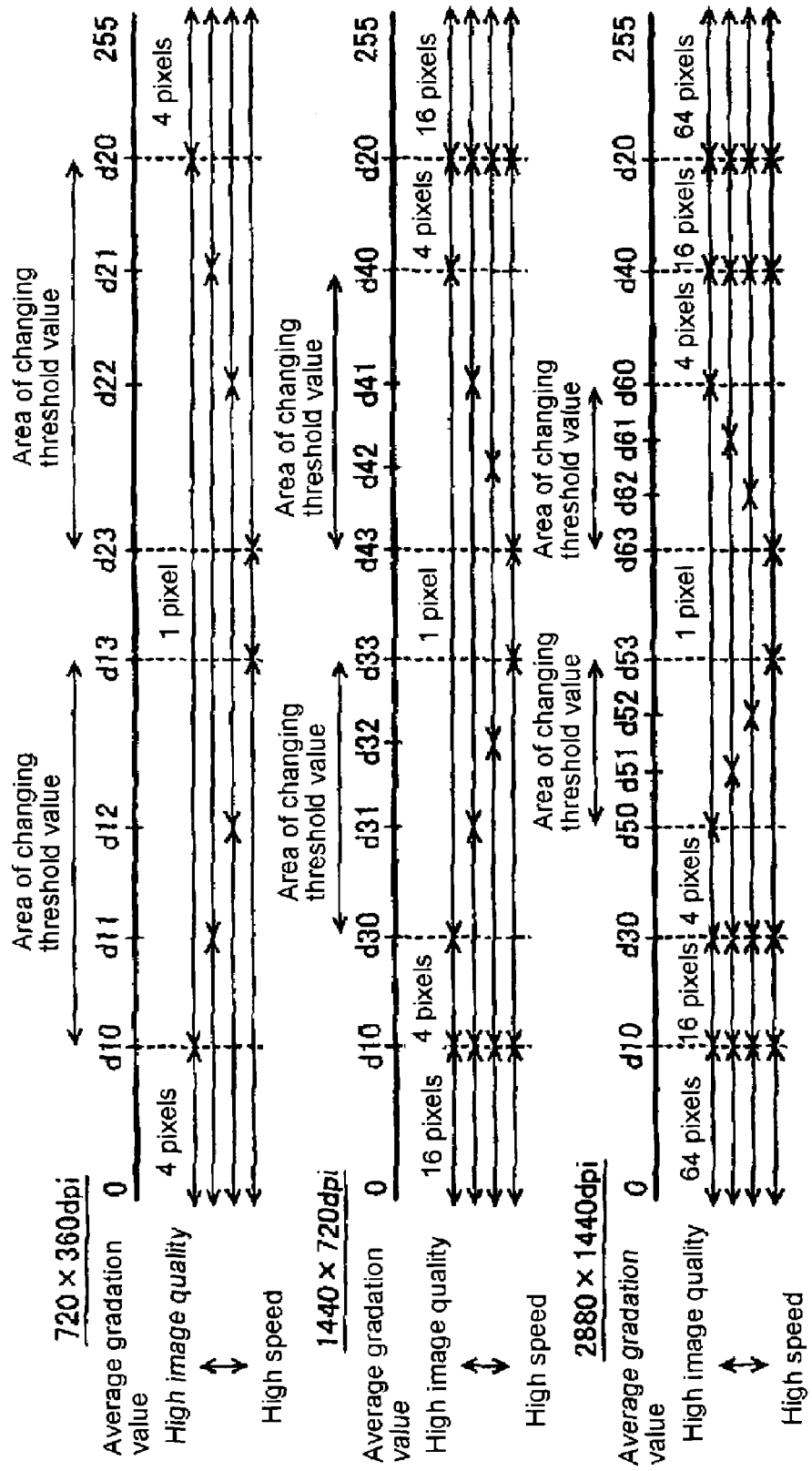
FIG. 32 shows relationship between a threshold value and the number of pixels in a conversion partition for each of different resolutions.

In some cases, image data is converted at a time by diffusing a gradation error for the entire block to unconverted pixels outside the block. In the other cases, pixels in the block are grouped into a small block or an area. Image data for the block is converted by diffusing a gradation error for that small block or area to the other unconverted pixels. In order to select these conversion processes, a plurality of threshold values are set at S404, S412, and S420 to determine a conversion partition that converts image data at a time based on the sum of gradation values (hereafter referred to as block gradation values) for pixels in the block. In this case, each threshold value is set with reference to the threshold value tables T1 through T3 corresponding to resolutions as shown in FIG. 29. FIG. 32 shows relationship between a threshold value stored in the threshold value table in FIG. 29 and the number of pixels in a conversion partition for each of different resolutions along an axis representing an average block gradation value. FIG. 33 shows this relationship in a table form. An actual conversion process uses the threshold value based on the sum of block gradation values. For ease of explanation, however, each threshold value in FIG. 32 is based on an average block gradation value.

As shown in FIG. 32, threshold values are set so as to match four levels corresponding to the image quality setup information for each resolution. For example, threshold values d10 and d20 are set in the best quality mode at 720×360 dpi. As shown in FIG. 33, the block process condition is determined to be true when average x of the block gradation value is smaller than or equal to (or may be smaller than) the threshold value d10 as a reference or when average x is greater than (or may be greater than or equal to) the threshold value d20 as another reference larger than the threshold value d10. That is to say, the conversion process is performed in units of 4 pixels when $0 \leq x \leq d10$ or $d20 < x \leq 255$. The conversion process is performed for each pixel when $d10 < x \leq d20$.

When the image quality setup information signifies a faster speed, a difference between both threshold values becomes smaller. When the print mode is set to the high quality mode that provides image quality at one grade lower than the ultra-high quality mode, threshold values are specified as d11 (d11>d10) and d21 (d21<d20). When the print mode is set to the normal mode that provides image quality at one grade lower than the high quality mode, threshold values are specified as d12 (d12>d11) and d22 (d22<d21). When the print mode is set to the high speed mode that provides the lowest image quality, threshold values are specified as d13 (d13>d12) and d23 (d23<d22). The block process condition is determined to be true when $0 \leq x \leq d11$ to d13 or d21 to $d23 < x \leq 255$.

As shown as an area of changing threshold value in FIG. 32, the threshold value changes within the range from the upper bound d10 to the lower bound d13 when the threshold value is used to select the 4-pixel or 1-pixel conversion partition in an area with the relatively low gradation. On the other hand, the threshold value changes within the range from the lower bound d23 to the upper bound d20 when the threshold value is used to select the 1-pixel or 4-pixel conversion partition in an area with the relatively high gradation. Setting the image quality to a higher speed decreases a difference between the threshold value for the area with the relatively low gradation and the threshold value for the area with the relatively high gradation. This increases an area capable of the conversion process in units of blocks out of gradation areas to which the image data can be applied. Accordingly, a simple configuration can be used to speed up the image data conversion as the image quality is set to a higher speed. It is possible to solve the problem that the conversion cannot be accelerated even though there is no need to print an image with high quality as conventionally practiced.

At 1440×720 dpi in the ultra-high mode, threshold values are specified as d30 (d30>d10) and d40 (d40<d20) in addition to the same threshold values d10 and d20 as for the resolution of 720×360 dpi. When $0 \leq x \leq d10$ or $d20 < x \leq 255$, where x is an average block gradation value, the block process condition is determined to be true to perform the conversion process on the basis of 16 pixels. When $d10 < x \leq d30$ or $d40 < x \leq d20$, another block process condition is determined to be true to perform the conversion process on the basis of 4 pixels. When $d30 < x \leq d40$, the conversion process is performed on the basis of one pixel.

When the image quality setup information indicates a faster speed at the high resolution, the embodiment decreases a difference between two threshold values for selecting the 4-pixel or 1-pixel conversion. In the high quality mode, threshold values are specified as d31 (d31>d30) and d41 (d41<d40). In the normal mode, threshold values are specified as d32 (d32>d31) and d42 (d42<d41). In the high speed mode, threshold values are specified as d33 (d33>d32) and d43 (d43<d42). When $0 \leq x \leq d10$ or $d20 < x \leq 255$, the block process condition is determined to be true. When $d10 < x \leq d31$ to d33 or d41 to $d43 < x \leq d20$, another block process condition is determined to be true.

Accordingly, the threshold value changes within the range from the lower bound d30 to the upper bound d33 when the threshold value is used to select the 4-pixel or 1-pixel conversion in an area with the relatively low gradation. The threshold value changes within the range from the lower bound d43 to the upper bound d40 when the threshold value is used to select the 1-pixel or 4-pixel conversion in an area with the relatively high gradation.

When the threshold values are used for selecting the 16-pixel or 4-pixel conversion partition at the high resolution, these threshold values are configured to be the same as the threshold values d10 and d20 for selecting the 4-pixel or 1-pixel conversion partition at the low resolution. As a result, an area of the conversion partition on an output image from the printer at the high resolution becomes smaller than or equal to an area of the conversion partition at the low resolution when an average block gradation value for 4×4 pixels at the high resolution equals an average block gradation value for 2×2 pixels at the low resolution, i.e., under the condition of the same amount of ink to be used.

When conversion partitions are compared in the ultra-high quality mode at the low resolution and in the high quality mode at the high resolution, the conversion partition comprises four pixels at the low resolution and 16 pixels at the high resolution in areas with gradations $0 \leq x \leq d10$ and $d20 < x \leq 255$. As shown in FIG. 30, it is found that conversion partition areas become the same on an output image.

The conversion partition comprises one pixel at the low resolution and four pixels at the high resolution in areas with gradations $d10<x\leq d33$ and $d43<x\leq d20$. Consequently, conversion partition areas also become the same on an output image. The conversion partition comprises one pixel at the low resolution and one pixel at the high resolution in areas with gradations $d33<x\leq d43$. A conversion partition area at the high resolution becomes smaller than that at the low resolution on an output image. As the resolution increases, the conversion process requires a longer process time. This is because the number of pixel per unit area increases. A user expects that the image quality at the high resolution should be equivalent to or higher than the image quality at the low resolution. Since various threshold values are specified as mentioned above, conversion processes are selected so as not to invert image qualities between resolutions. This makes it possible to keep the image quality at the high resolution at least equivalent to the ultra-high quality at the low resolution.

At 2880×1440 dpi in the ultra-high mode, threshold values are specified as d50 (d50>d30) and d60 (d60<d50) in addition to the same threshold values d10, d30, d40, and d20 as for the resolution of 1440×720 dpi. When $0\leq x\leq d10$ or $d20<x\leq 255$, where x is an average block gradation value, the block process condition is determined to be true to perform the conversion process on the basis of 64 pixels. When $d10<x\leq d30$ or $d40<x\leq d20$, another block process condition is determined to be true to perform the conversion process on the basis of 16 pixels. When $d30<x\leq d50$ or $d60<x\leq d40$, yet another block process condition is determined to be true to perform the conversion process on the basis of 4 pixels. When $d50<x\leq d60$, the conversion process is performed on the basis of one pixel.

When the image quality setup information indicates a faster speed at the high resolution, the embodiment decreases a difference between two threshold values for selecting the 4-pixel or 1-pixel conversion. That is to say, the threshold value changes within the range from d50 to d53 in an area with the relatively low gradation and changes within the range from d63 to d60 in an area with the relatively high gradation.

When the threshold values are used for selecting the 16-pixel or 4-pixel conversion partition at the ultra-high resolution, these threshold values are configured to be the same as the threshold values d30 and d40 for selecting the 4-pixel or 1-pixel conversion partition at the high resolution. As a result, an area of the conversion partition on an output image from the printer at the ultra-high resolution becomes smaller than or equal to an area of the conversion partition at the high resolution under the condition of the same amount of ink to be used. Accordingly, it is possible to keep the image quality at the ultra-high resolution at least equivalent to the ultra-high quality at the high resolution.

The above-mentioned various threshold values may be constant independently of the average or total of block gradation values or may change in accordance with the average or total of block gradation values.

Figure 34:
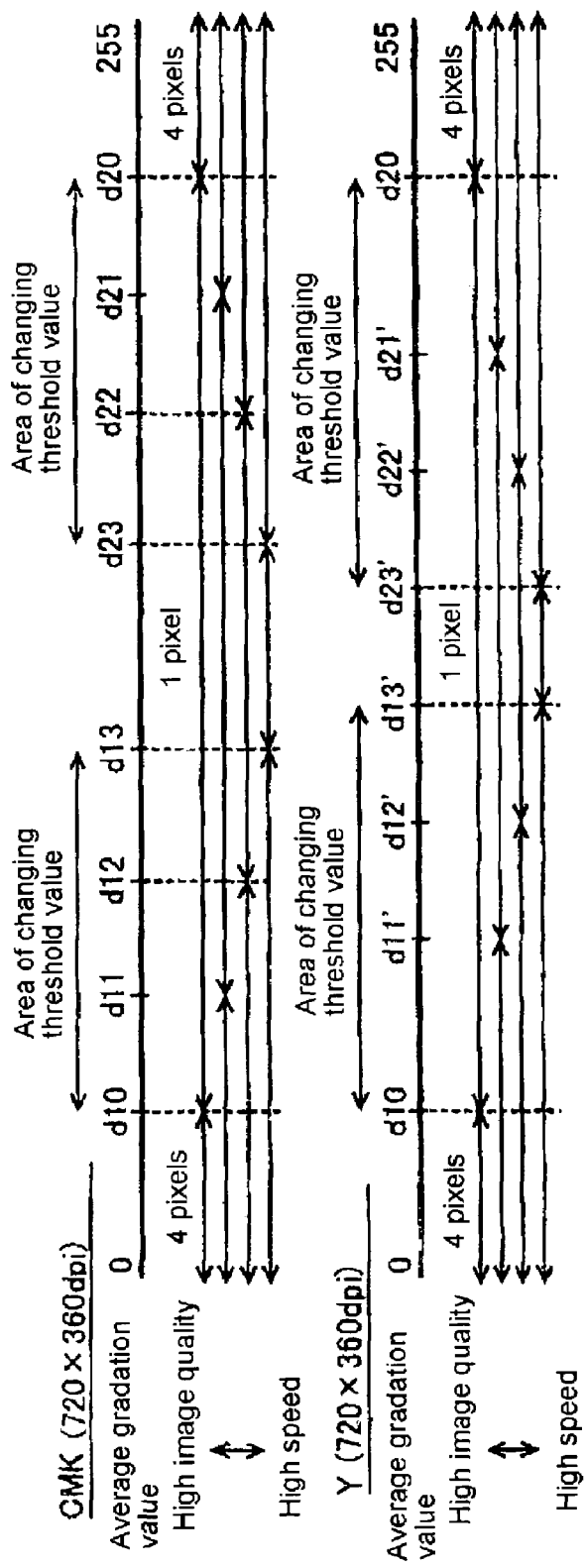
FIG. 34 shows the relationship between a threshold value and the number of pixels at a low resolution.

When the ink-specific process is selected on the print interface screen, the threshold value is specified for each of element ink colors CMYK. Then, the program defines the conversion partition comprising a specified number of neighboring pixels corresponding to the CMYK color depth. Further, the program diffuses a gradation error for the entire target conversion partition to unconverted pixels outside the conversion partition based on a gradation value and a diffusion error in the target conversion partition for image data conversion and converts the image data at a time. The embodiment sets only a Y threshold value by referencing yellow data from the resolution-specific threshold value tables T1 through T3 in FIG. 29. FIG. 34 shows relationship between a threshold value at the low resolution and the number of pixels in a conversion partition along an axis representing an average block gradation value.

As shown in FIG. 34, the ultra-high quality mode uses the same CMK and Y threshold values as d10 and d20. However, the high quality mode uses the threshold values d11 and d21 for CMK and threshold values d11' (d11'>d11) and d21' (d21'<d21) for Y. With respect to the 4-pixel conversion, the gradation area for Y is wider than that for CMK. The same applies to the normal mode and the high speed mode. Let us consider the condition that an average block gradation value for 2×2 pixels in Y equals an average block gradation value for 2×2 pixels in CMK. This means the same amount of ink to be used. Under this condition, the number of pixels in the conversion partition corresponding to the element color Y is configured to be greater than or equal to the number of pixels in the conversion partition corresponding to the element colors CMK. Of the element colors CMYK, Y is relatively light and CMK are relatively dark. Since Y is not noticeable compared to CMK, it is possible to further improve the process speed while maintaining the high image quality.

Different threshold values may be assigned to CMYK each. Under the condition of the same amount of ink to be used, threshold values may be specified so that the number of pixels in the conversion partition corresponding to CM are set to be greater than or equal to the number of pixels in the conversion partition corresponding to K, and at the same time, the number of pixels in the conversion partition corresponding to Y are set to be greater than or equal to the number of pixels in the conversion partition corresponding to CM. When the color ink used includes Lc (light cyan) and Lm (light magenta), threshold values may be specified assuming that light element colors are CMK and dark element colors are YLcLm.

I claim:

1. An image data processing apparatus which inputs image data generated from an image represented in multiple gradations of dot matrix pixels, diffuses a gradation error for each pixel to the other unconverted pixels, and converts the input image data to image data represented by presence or absence of dot formation, the apparatus comprising:

a block process determination unit for forming a block by grouping a specified number of neighboring pixels and determining whether or not a specified block process condition is satisfied on the basis of a gradation value for each pixel in a target block to convert the image data;

a first conversion unit for diffusing a gradation error for the entire target block to unconverted pixels outside the target block on the basis of the gradation value and the diffused gradation error for each pixel in the target block and converting image data for pixels in the target block at a time when the block process determination unit determines the block process condition to be true; and a second conversion unit for determining whether or not to form a dot in the target block on the basis of the gradation value and the diffused gradation error for each pixel in the target block when the block process determination unit determines the block process condition to be false, for converting image data for pixels in the target block while diffusing a gradation error for the pixel partition to the other unconverted pixels on the basis of the gradation value and the diffused gradation error for each pixel according to each pixel partition comprising grouped pixels in the target block when it is determined that a dot is to be formed in the target block, and for converting image data for pixels in the target block at a time while diffusing a gradation error for the entire target block to the other unconverted pixels outside the target block on the basis of the gradation value and the diffused gradation error for each pixel in the target block when it is determined that no dot is to be formed in the target block.

2. An image data processing method which inputs image data generated from an image represented in multiple gradations of dot matrix pixels, diffuses a gradation error for each pixel to the other unconverted pixels, and converts the input image data to image data represented by presence or absence of dot formation, the apparatus comprising:

a block process determination step of forming a block by grouping a specified number of neighboring pixels and determining whether or not a specified block process condition is satisfied on the basis of a gradation value for each pixel in a target block to convert the image data;

a first conversion step of, when the block process determination unit determines the block process condition to be true, diffusing a gradation error for the entire target block to unconverted pixels outside the target block on the basis of the gradation value and the diffused gradation error for each pixel in the target block and converting image data for pixels in the target block at a time; and a second conversion step of determining whether or not to form a dot in the target block on the basis of the gradation value and the diffused gradation error for each pixel in the target block when the block process determination step determines the block process condition to be false, of converting image data for pixels in the target block while diffusing a gradation error for the pixel partition to the other unconverted pixels on the basis of the gradation value and the diffused gradation error for each pixel according to each pixel partition comprising grouped pixels in the target block when it is determined that a dot is to be formed in the target block, and of converting image data for pixels in the target block at a time while diffusing a gradation error for the entire target block to the other unconverted pixels outside the target block on the basis of the gradation value and the diffused gradation error for each pixel in the target block when it is determined that no dot is to be formed in the target block.

3. A computer-readable medium having an image data processing program stored thereon, the image data processing program allowing a computer to implement a function which inputs image data generated from an image represented in multiple gradations of dot matrix pixels, diffuses a gradation error for each pixel to the other unconverted pixels, and converts the input image data to image data represented by presence or absence of dot formation, and the image data processing program comprising program instructions for causing a computer to implement:

a block process determination function of forming a block by grouping a specified number of neighboring pixels and determining whether or not a specified block process condition is satisfied on the basis of a gradation value for each pixel in a target block to convert the image data;

a first conversion function of, when the block process determination function determines the block process condition to be true, diffusing a gradation error for the entire target block to unconverted pixels outside the target block on the basis of the gradation value and the diffused gradation error for each pixel in the target block and converting image data for pixels in the target block at a time; and a second conversion function of determining whether or not to form a dot in the target block on the basis of the gradation value and the diffused gradation error for each pixel in the target block when the block process determination function determines the block process condition to be false, for converting image data for pixels in the target block while diffusing a gradation error for the pixel partition to the other unconverted pixels on the basis of the gradation value and the diffused gradation error for each pixel according to each pixel partition comprising grouped pixels in the target block when it is determined that a dot is to be formed in the target block, and for converting image data for pixels in the target block at a time while diffusing a gradation error for the entire target block to the other unconverted pixels outside the target block on the basis of the gradation value and the diffused gradation error for each pixel in the target block when it is determined that no dot is to be formed in the target block.

4. An image data processing apparatus which inputs image data generated from an image represented in multiple gradations of dot matrix pixels, diffuses a gradation error for each pixel to the other unconverted pixels, and converts the input image data to image data represented by presence or absence of dot formation, the apparatus comprising:

a block process determination unit for forming a block by grouping a specified number of neighboring pixels and determining whether or not a specified block process condition is satisfied on the basis of only a gradation value for each pixel in a target block to convert the image data;

a first conversion unit for diffusing a gradation error for the entire target block to unconverted pixels outside the target block on the basis of the gradation value and the diffused gradation error for each pixel in the target block and converting image data for pixels in the target block at a time when the block process determination unit determines the block process condition to be true; and a second conversion unit for being able to convert image data for pixels in the target block while diffusing a gradation error for the pixel partition to the other unconverted pixels on the basis of the gradation value and the diffused gradation error for each pixel according to each pixel partition comprising grouped pixels in the target block when the block process determination unit determines the block process condition to be false.

5. An image data processing method which inputs image data generated from an image represented in multiple gradations of dot matrix pixels, diffuses a gradation error for each pixel to the other unconverted pixels, and converts the input image data to image data represented by presence or absence of dot formation, the apparatus comprising:

a block process determination step of forming a block by grouping a specified number of neighboring pixels and determining whether or not a specified block process condition is satisfied on the basis of only a gradation value for each pixel in a target block to convert the image data;

a first conversion step of, when the block process determination unit determines the block process condition to be true, diffusing a gradation error for the entire target block to unconverted pixels outside the target block on the basis of the gradation value and the diffused gradation error for each pixel in the target block and converting image data for pixels in the target block at a time; and a second conversion step for being able to convert image data for pixels in the target block while diffusing a gradation error for the pixel partition to the other unconverted pixels on the basis of the gradation value and the diffused gradation error for each pixel according to each pixel partition comprising grouped pixels in the target block when the block process determination step determines the block process condition to be false.

6. A computer-readable medium having an image data processing program stored thereon, the image data processing program allowing a computer to implement a function which inputs image data generated from an image represented in multiple gradations of dot matrix pixels, diffuses a gradation error for each pixel to the other unconverted pixels, and converts the input image data to image data represented by presence or absence of dot formation, the image data processing program including program instructions for causing a computer to implement:

a block process determination function of forming a block by grouping a specified number of neighboring pixels and determining whether or not a specified block process condition is satisfied on the basis of only a gradation value for each pixel in a target block to convert the image data;

a first conversion function of, when the block process determination function determines the block process condition to be true, diffusing a gradation error for the entire target block to unconverted pixels outside the target block on the basis of the gradation value and the diffused gradation error for each pixel in the target block and converting image data for pixels in the target block at a time; and a second conversion function of being able to convert image data for pixels in the target block while diffusing a gradation error for the pixel partition to the other unconverted pixels on the basis of the gradation value and the diffused gradation error for each pixel according to each pixel partition comprising grouped pixels in the target block when the block process determination function determines the block process condition to be false.

7. An image data processing apparatus to generate image data to be supplied to an image output apparatus which outputs an image at a specified resolution by inputting image data generated from an image represented in multiple gradations of dot matrix pixels and diffusing a gradation error for each pixel to the other unconverted pixels and representing image data by presence or absence of dot formation, the apparatus comprising:

a resolution acquisition unit for obtaining the resolution; and a conversion unit for identifying a conversion partition comprising one or more neighboring pixels corresponding to the resolution obtained by the resolution acquisition unit and converting image data at a time by diffusing a gradation error for the entire target conversion partition to unconverted pixels outside the conversion partition on the basis of a gradation value and the diffused gradation error for each pixel in the target conversion partition for converting the image data.

8. The image data processing apparatus according to claim 7, wherein the conversion unit comprises:

a block process determination unit for forming a block comprising two or more neighboring pixels according to the resolution and determining whether or not a specified block process condition is satisfied on the basis of a gradation value for each pixel in a target block converting the image data;

a first conversion unit for diffusing a gradation error for the entire target block to unconverted pixels outside the target block on the basis of the gradation value and the diffused gradation error for each pixel in the target block and converting image data for pixels in the target block at a time when the block process determination unit determines the block process condition to be true; and a second conversion unit for being able to convert image data for pixels in the target block while diffusing a gradation error for the pixel partition to the other unconverted pixels on the basis of the gradation value and the diffused gradation error for each pixel according to each pixel partition comprising grouped pixels in the target block when the block process determination unit determines the block process condition to be false.

9. An image data processing method of generating image data to be supplied to an image output apparatus which outputs an image at a specified resolution by inputting image data generated from an image represented in multiple gradations of dot matrix pixels and diffusing a gradation error for each pixel to the other unconverted pixels and representing image data by presence or absence of dot formation, the apparatus comprising:

a resolution acquisition step of obtaining the resolution; and a conversion step of identifying a conversion partition comprising one or more neighboring pixels corresponding to the resolution obtained by the resolution acquisition step and converting image data at a time by diffusing a gradation error for the entire target conversion partition to unconverted pixels outside the conversion partition on the basis of a gradation value and the diffused gradation error for each pixel in the target conversion partition for converting the image data.

10. A computer-readable medium having an image data processing program stored thereon, the image data processing program allowing a computer to implement a function which generates image data to be supplied to an image output apparatus which outputs an image at a specified resolution by inputting image data generated from an image represented in multiple gradations of dot matrix pixels and diffusing a gradation error for each pixel to the other unconverted pixels and representing image data by presence or absence of dot formation, the image data processing program including program instructions for causing a computer to implement:

a resolution acquisition function of obtaining the resolution; and a conversion function of identifying a conversion partition comprising one or more neighboring pixels corresponding to the resolution obtained by the resolution acquisition function and converting image data at a time by diffusing a gradation error for the entire target conversion partition to unconverted pixels outside the conversion partition on the basis of a gradation value and the diffused gradation error for each pixel in the target conversion partition for converting the image data.

11. An image data processing apparatus which inputs image data generated from an image represented in multiple gradations of dot matrix pixels, diffuses a gradation error for each pixel to the other unconverted pixels, and generates image data for representing an output image from an image output apparatus according to presence or absence of dot formation, the apparatus comprising:
  an image quality setup unit for accepting input of image quality setup information about image quality setting of an image output from the image output apparatus; and
  a conversion unit for identifying a conversion partition comprising one or more neighboring pixels corresponding to the input image quality setup information and converting image data at a time by diffusing a gradation error for the entire target conversion partition to unconverted pixels outside the conversion partition on the basis of a gradation value and the diffused gradation error for each pixel in the target conversion partition for converting the image data.

12. The image data processing apparatus according to claim 11, wherein
  the image output apparatus is provided with a resolution acquisition unit for outputting an image at a specified resolution and obtaining the resolution; and
  the conversion unit configures the conversion partition comprising one or more neighboring pixels in accordance with the obtained resolution so that an area on the output image is smaller than or equal to the image as the resolution increases.

13. The image data processing apparatus according to claim 11, wherein the conversion unit comprises:
  a determination unit for forming a block comprising two or more neighboring pixels and determining whether or not a specified block process condition is satisfied on the basis of a gradation value for each pixel in a target block converting the image data;
  a first conversion unit for assuming the target block to be the target conversion partition and converting the image data for the entire target block at a time when the determination unit determines the block process condition to be true; and
  a second conversion unit for being able to convert image data for pixels in the target block while using a pixel partition comprising grouped pixels in the target block as the conversion partition and diffusing a gradation error for the pixel partition to the other unconverted pixels on the basis of the gradation value and the diffused gradation error for each pixel when the block process determination unit determines the block process condition to be false.

14. An image data processing method of inputting image data generated from an image represented in multiple gradations of dot matrix pixels, diffusing a gradation error for each pixel to the other unconverted pixels, and generating image data for representing an output image from an image output apparatus according to presence or absence of dot formation, the method comprising:
  an image quality setup step of accepting input of image quality setup information about image quality setting of an image output from the image output apparatus; and
  a conversion step of identifying a conversion partition comprising one or more neighboring pixels corresponding to the input image quality setup information and converting image data at a time by diffusing a gradation error for the entire target conversion partition to unconverted pixels outside the conversion partition on the basis of a gradation value and the diffused gradation error for each pixel in the target conversion partition for converting the image data.

15. A computer-readable medium having an image data processing program stored thereon, the image data processing program allowing a computer to implement a function which generates image data for representing an output image from an image output apparatus according to presence or absence of dot formation by inputting image data generated from an image represented in multiple gradations of dot matrix pixels and diffusing a gradation error for each pixel to the other unconverted pixels, the image data processing program including program instructions for causing a computer to implement:
  an image quality setup function of accepting input of image quality setup information about image quality setting of an image output from the image output apparatus; and
  a conversion function of identifying a conversion partition comprising one or more neighboring pixels corresponding to the input image quality setup information and converting image data at a time by diffusing a gradation error for the entire target conversion partition to unconverted pixels outside the conversion partition on the basis of a gradation value and the diffused gradation error for each pixel in the target conversion partition for converting the image data.

* * * * *